(12) United States Patent
Rosen

(10) Patent No.: US 9,645,548 B2
(45) Date of Patent: May 9, 2017

(54) SYSTEM, APPARATUS AND METHOD FOR EXTRACTING IMAGE CROSS-SECTIONS OF AN OBJECT FROM RECEIVED ELECTROMAGNETIC RADIATION

(71) Applicant: CellOptic, Inc., Rockville, MD (US)

(72) Inventor: Joseph Rosen, Omer (IL)

(73) Assignee: CELLOPTIC, INC., Rockville, MD (US)

( * ) Notice: Subject to any disclaimer, the term of this patent is extended or adjusted under 35 U.S.C. 154(b) by 0 days.

(21) Appl. No.: 14/331,720

(22) Filed: Jul. 15, 2014

(65) Prior Publication Data

US 2014/0327943 A1 Nov. 6, 2014

Related U.S. Application Data

(60) Continuation of application No. 14/083,044, filed on Nov. 18, 2013, now abandoned, which is a continuation of application No. 13/776,030, filed on Feb. 25, 2013, now abandoned, which is a division of application No. 12/524,725, filed as application No. PCT/US2007/002448 on Jan. 29, 2007, now Pat. No. 8,405,890.

(51) Int. Cl.
| | | |
|---|---|---|
| *G03H 1/26* | (2006.01) | |
| *G03H 1/02* | (2006.01) | |
| *G03H 1/04* | (2006.01) | |
| *G03H 1/08* | (2006.01) | |
| *G03H 1/00* | (2006.01) | |
| *G03H 1/06* | (2006.01) | |

(52) U.S. Cl.
CPC ............. *G03H 1/08* (2013.01); *G03H 1/0005* (2013.01); *G03H 1/0443* (2013.01); *G03H 1/06* (2013.01); *G03H 2001/0033* (2013.01); *G03H 2226/11* (2013.01)

(58) Field of Classification Search
CPC ...... G03H 1/0005; G03H 1/0443; G03H 1/08; G03H 1/06; G03H 2001/0033; G03H 2226/11
USPC .................................................. 359/9, 29, 35
See application file for complete search history.

(56) References Cited

U.S. PATENT DOCUMENTS

| | | | | |
|---|---|---|---|---|
| 4,164,788 A | * | 8/1979 | Jain ........................ | G06E 3/001 348/625 |
| 5,347,375 A | * | 9/1994 | Saito .................... | G03H 1/0476 359/35 |

(Continued)

FOREIGN PATENT DOCUMENTS

WO    2005/078522    8/2005

*Primary Examiner* — Jade R Chwasz
(74) *Attorney, Agent, or Firm* — Nixon & Vanderhye P.C.

(57) ABSTRACT

An apparatus and method to produce a hologram of a cross-section of an object includes an electromagnetic radiation assembly configured to receive a received electromagnetic radiation, such as light, from the object. The electromagnetic radiation assembly is further configured to diffract the received electromagnetic radiation and transmit a diffracted electromagnetic radiation. An image capture assembly is configured to capture an image of the diffracted electromagnetic radiation and produce the hologram of the cross-section of the object from the captured image. The hologram of the cross-section includes information regarding a single cross-section of the object.

3 Claims, 45 Drawing Sheets

(56) References Cited

U.S. PATENT DOCUMENTS 6,038,041 A * 3/2000 Poon .................. G02B 21/06
   250/559.4
6,411,406 B1    6/2002 Kreuzer
6,490,088 B1   12/2002 Rosen et al.

* cited by examiner

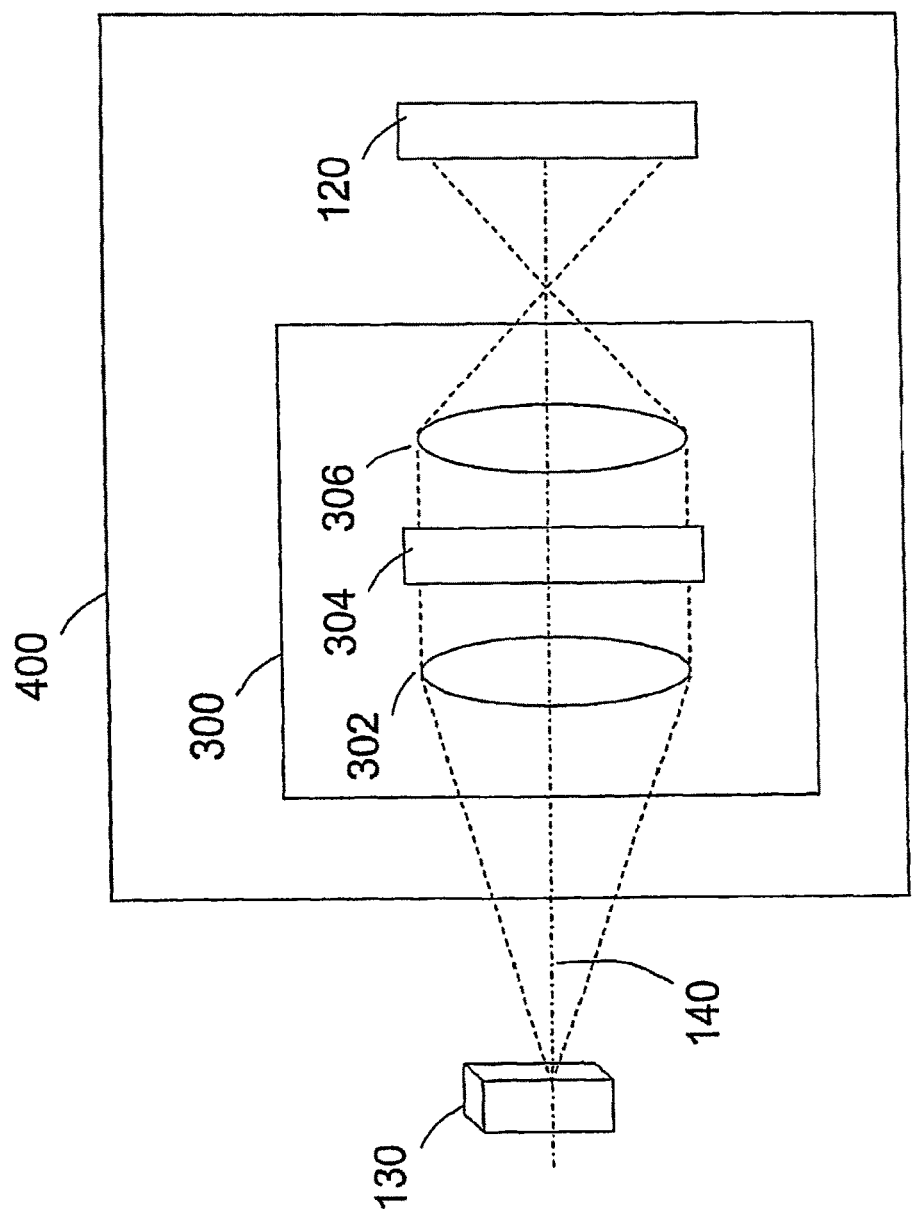

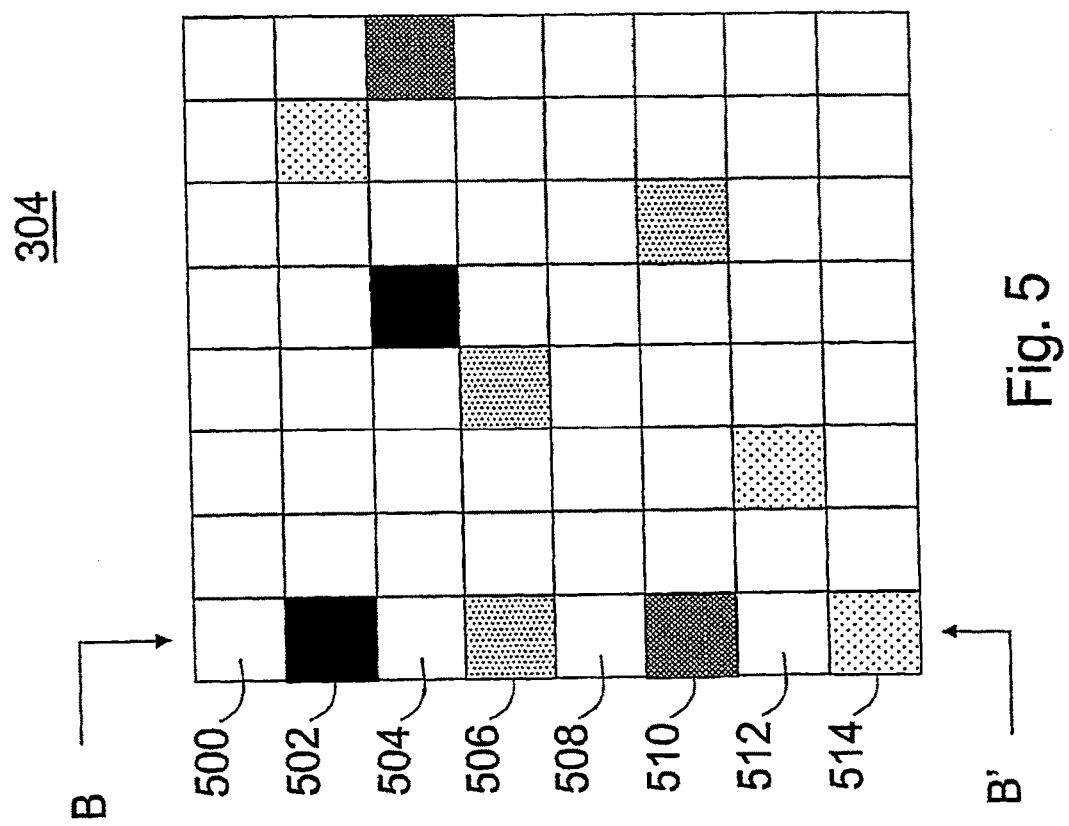

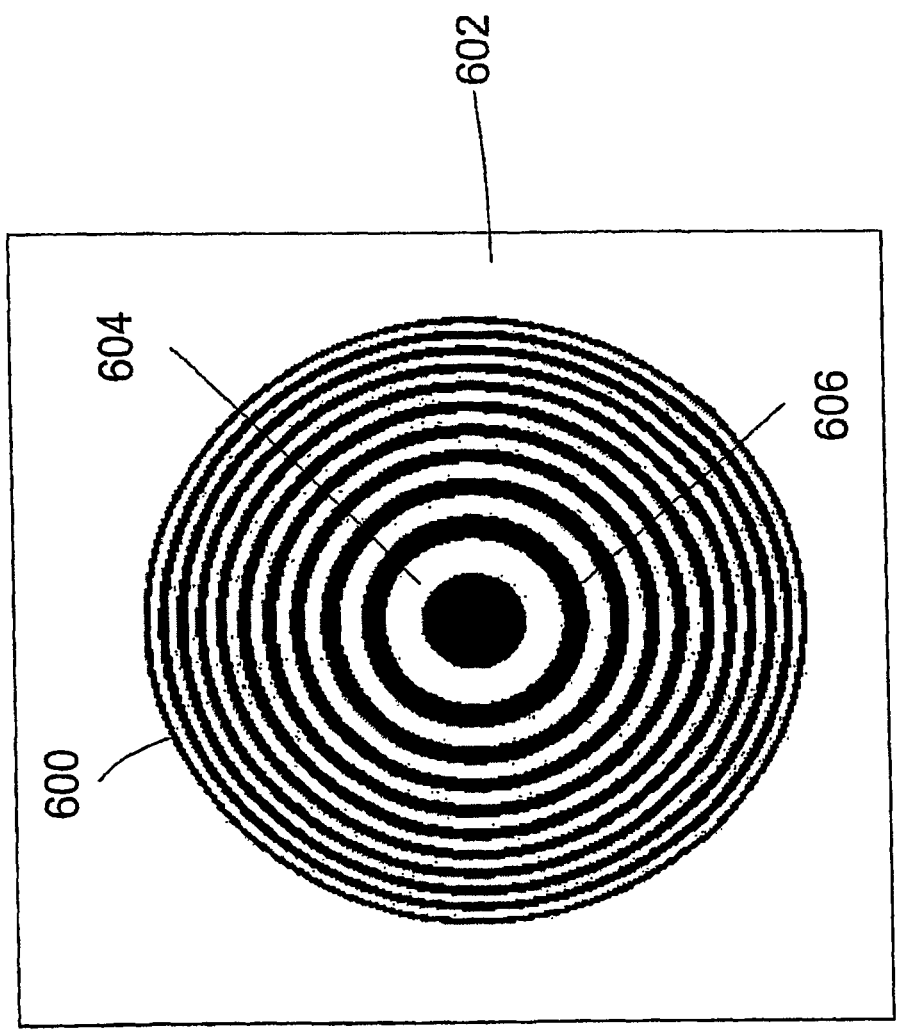

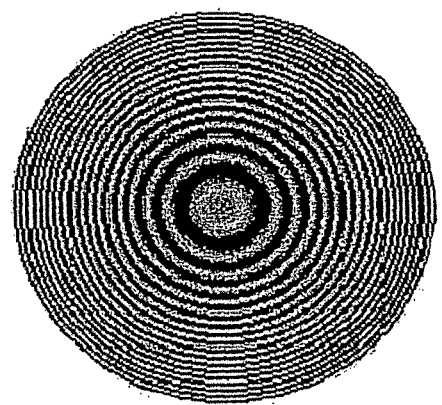
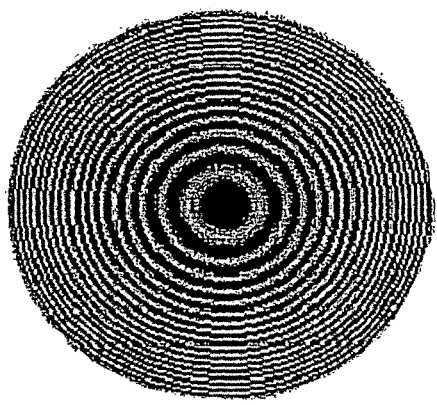
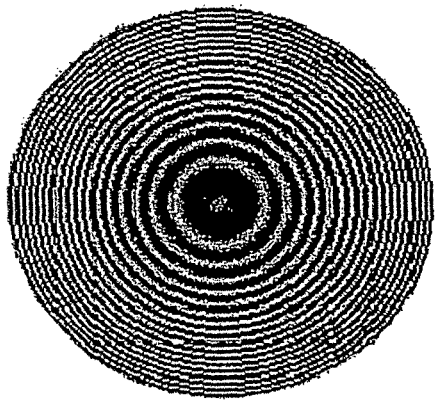
Fig. 9C

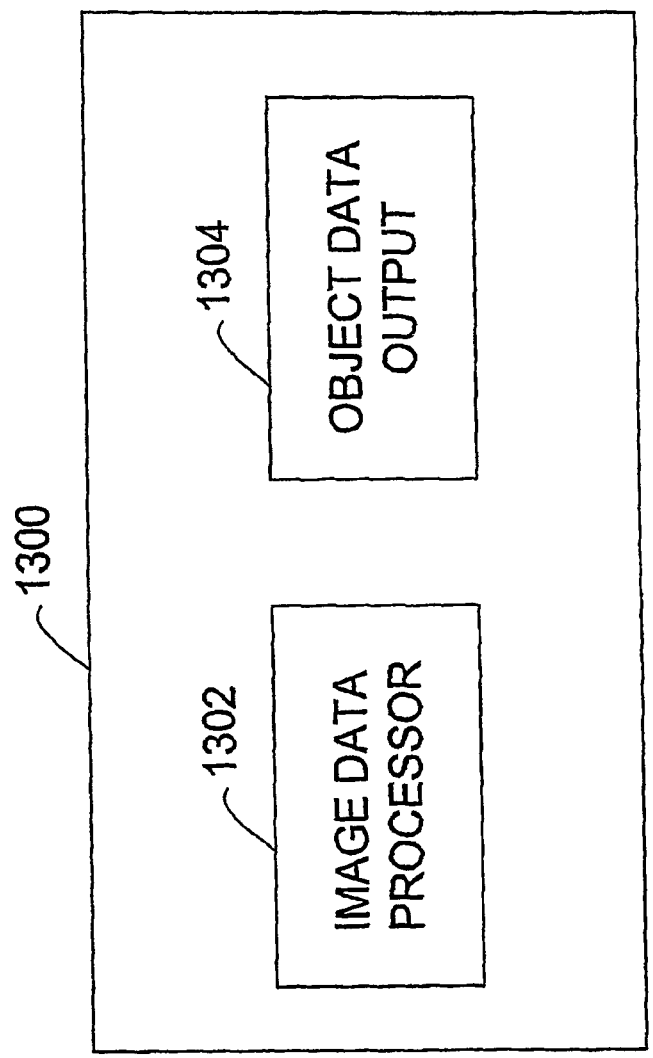

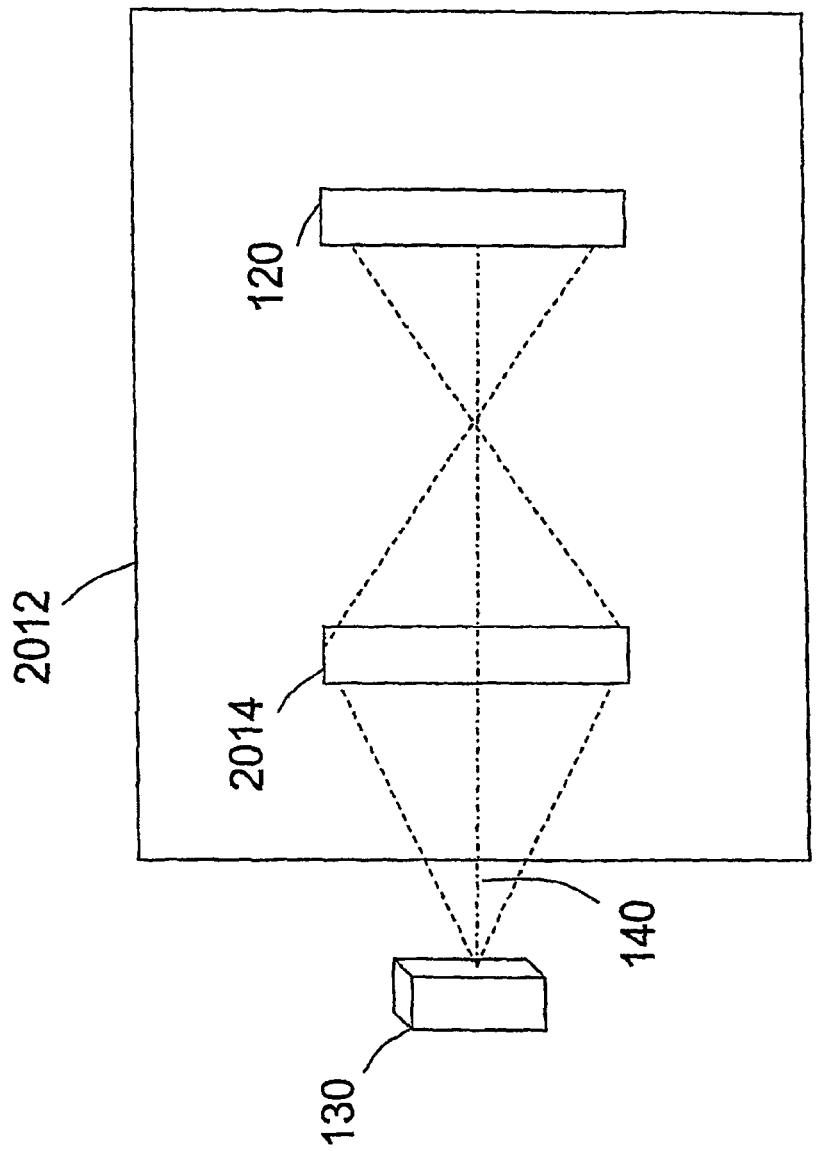

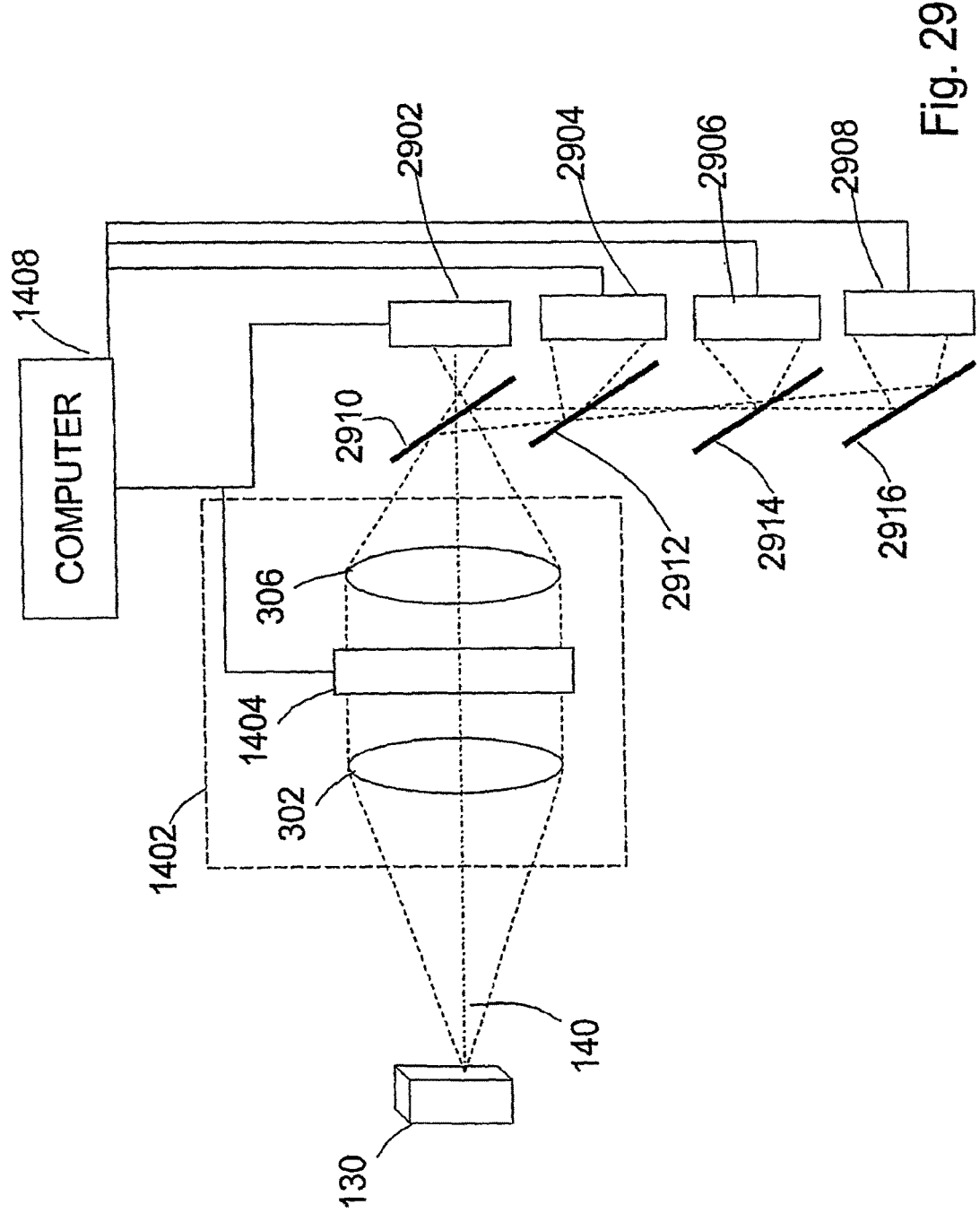

SYSTEM, APPARATUS AND METHOD FOR EXTRACTING IMAGE CROSS-SECTIONS OF AN OBJECT FROM RECEIVED ELECTROMAGNETIC RADIATION

CROSS-REFERENCE TO A RELATED APPLICATION

This application is a continuation application of U.S. patent application Ser. No. 14/083,044, filed Nov. 18, 2013, which is a continuation application of U.S. patent application Ser. No. 13/776,030, filed Feb. 25, 2013, which is a divisional application of U.S. patent application Ser. No. 12/524,725, filed Jul. 28, 2009, now U.S. Pat. No. 8,405,890, issued Mar. 26, 2013, which is a national stage application of International Patent Application No. PCT/US2007/002448, filed Jan. 29, 2007, and is related to International Patent Application No. PCT/US2006/027727, filed Jul. 18, 2006. All of these applications are incorporated herein by reference in their entirety.

BACKGROUND OF THE INVENTION

Field of the Invention

This invention relates to an apparatus for capturing electromagnetic radiation, such as light or other forms of electromagnetic radiation, from an object and extracting object geometric information from the received radiation, in the field of three-dimensional imaging and holography. The invention also relates to a system and method of performing those functions.

Discussion of the Background

Conventional techniques for capturing three-dimensional information from physical objects include holography, range-finding, and tomography. However, conventional techniques may disadvantageously require an active illumination source, or place limitations on a light source (e.g., may require coherent light, a point light source or a bandwidth limited light), place limitations on movement of the object or the sensing apparatus (e.g., require that the object and sensing device be stationary, or require that they be moved in a predetermined fashion), may require complex electromagnetic radiation assemblies (e.g., complex arrangement of mirrors and lenses), and may produce poor quality three-dimensional images having low resolution or low fidelity.

SUMMARY OF THE INVENTION

Accordingly, one object of this invention is to provide an apparatus configured to produce a hologram of a cross-section of an object, said apparatus comprising: an electromagnetic radiation assembly configured to receive a received electromagnetic radiation from the object, diffract the received electromagnetic radiation, and transmit a diffracted electromagnetic radiation; and an image capture assembly configured to capture an image of the diffracted electromagnetic radiation, and produce the cross-section of the object from the captured image, the hologram is including information regarding a single cross-section of the object.

Another object of this invention is to provide a novel apparatus, wherein several holograms of the object's cross-sections are captured and processed in serial or parallel way.

Another object of this invention is to provide a novel apparatus, wherein the electromagnetic radiation includes light.

Another object of this invention is to provide a novel apparatus, wherein the electromagnetic radiation apparatus includes only one radiation propagation axis and is configured to propagate electromagnetic radiation only along the radiation propagation axis in only one direction.

Another object of this invention is to provide a novel apparatus, wherein the electromagnetic radiation assembly includes plural electromagnetic radiation elements each having an axis of symmetry arranged along a same straight line.

Another object of this invention is to provide a novel apparatus, wherein the electromagnetic radiation assembly includes plural electromagnetic radiation elements each having a geometric center arranged along a same straight line.

Another object of this invention is to provide a novel apparatus, wherein the electromagnetic radiation received from the object and the electromagnetic radiation diffracted by the electromagnetic radiation assembly have a same radiation propagation axis.

Another object of this invention is to provide a novel apparatus, wherein the electromagnetic radiation received from the object includes incoherent light.

Another object of this invention is to provide a novel apparatus, wherein the electromagnetic radiation received from the object is produced by the object.

Another object of this invention is to provide a novel apparatus, wherein the electromagnetic radiation received from the object does not interfere with an electromagnetic radiation that is not received from the object to produce the hologram of the cross-section of the object.

Another object of this invention is to provide a novel apparatus, wherein the object and the apparatus are configured to remain stationary during the capture of the image.

Another object of this invention is to provide a novel apparatus, wherein each portion of the electromagnetic apparatus is configured to remain stationary during the capture of the image.

Another object of this invention is to provide a novel apparatus, wherein at least one of the object or the apparatus is configured to be in motion during the capture of the image.

Another object of this invention is to provide a novel apparatus, wherein the hologram of the cross-section is produced from a single captured image.

Another object of this invention is to provide a novel apparatus, wherein the hologram of the cross-section is produced from plural captured images.

Another object of this invention is to provide a novel apparatus, wherein the hologram of the cross-section includes a Fresnel hologram.

Another object of this invention is to provide a novel apparatus, wherein the hologram of the cross-section includes a random phase hologram.

Another object of this invention is to provide a novel apparatus, wherein a phase and intensity of the diffracted electromagnetic radiation is described by a convolution of the received electromagnetic radiation from object's cross section and a Fresnel Zone Plate.

Another object of this invention is to provide a novel apparatus, wherein a phase and intensity of the diffracted electromagnetic radiation is described by a convolution of the received electromagnetic radiation from object's cross section and a random phase function.

Another object of this invention is to provide a novel apparatus, wherein the electromagnetic radiation assembly is configured to transmit the electromagnetic radiation including a convolution of the received electromagnetic radiation and a complex transmission function including a linear summation of a first transformed pattern, a second transformed pattern and a third transformed pattern, the first transformed pattern including a first shifted concentric ring pattern, the second transformed pattern including a second shifted concentric ring pattern, and the third transformed pattern including a third shifted concentric ring pattern.

Another object of this invention is to provide a novel apparatus, wherein the electromagnetic radiation assembly is configured to transmit the electromagnetic radiation including a convolution of the received electromagnetic radiation and a complex transmission function including a linear summation of a first transformed pattern, and a second transformed pattern, the first transformed pattern including a first shifted random pattern, and the second transformed pattern including a second shifted random pattern.

Another object of this invention is to provide a novel apparatus, wherein each of the first, second and third shifted concentric ring patterns are shifted away from one another in a same plane of the electromagnetic radiation assembly.

Another object of this invention is to provide a novel apparatus, wherein each of the first, second and third shifted concentric ring patterns includes a Fresnel Zone Pattern or a portion of a Fresnel Zone Pattern.

Another object of this invention is to provide a novel apparatus, wherein the portion of the Fresnel Zone Pattern includes a Fresnel Zone Pattern having one or more rings removed, one or more extra rings added, one or more rings having a varied width, or one or more rings having a portion of the ring removed.

Another object of this invention is to provide a novel apparatus, wherein a phase of the Fresnel Zone Pattern or the portion of the Fresnel Zone Pattern in each of the first, second and third shifted concentric ring pattern is different.

Another object of this invention is to provide a novel apparatus, wherein a predetermined thickness and coefficients of absorption or reflectance of the electromagnetic radiation assembly is configured to control the phase and intensity of the diffracted light.

Another object of this invention is to provide a novel apparatus, wherein the electromagnetic radiation assembly is configured to control at least one of the phase or intensity of the transmitted electromagnetic radiation by varying a thickness of a material through which electromagnetic radiation passes.

Another object of this invention is to provide a novel apparatus, wherein the electromagnetic radiation assembly further comprises: a first electromagnetic radiation assembly configured to receive the received electromagnetic radiation from the object and transmit a first transformed electromagnetic radiation; a complex mask assembly configured to receive the first transformed electromagnetic radiation from the first electromagnetic radiation assembly, and transmit a complex masked electromagnetic radiation according to a complex transmission function; and a second electromagnetic radiation assembly configured to receive the complex masked electromagnetic radiation from the mask assembly, and transmit a second transformed electromagnetic radiation as the diffracted electromagnetic radiation.

Another object of this invention is to provide a novel apparatus, wherein the complex mask assembly further comprises: a mask controller configured to vary the complex transmission function of the electromagnetic radiation assembly over time, said mask controller configured to vary the complex transmission function to be based on a Fourier transform of a first Fresnel Zone Pattern at a first time, a Fourier transform of a second Fresnel Zone Pattern at a second time, and a Fourier transform of a third Fresnel Zone Pattern at a third time.

Another object of this invention is to provide a novel apparatus, wherein the image capture assembly further comprises: a timing controller configured to capture a first partial image at the first time, a second partial image at the second time, and a third partial image at the third time; and a summing unit configured to produce the hologram of the cross-section as a sum of the first partial image captured at the first time, the second partial image captured at the second time, and the third partial image captured at the third time.

Another object of this invention is to provide a novel apparatus, further comprising: an electromagnetic radiation separating assembly configured to separate the electromagnetic radiation received from the object into three object electromagnetic radiation portions each including a different frequency range; said first electromagnetic radiation assembly including three first electromagnetic radiation subassemblies each configured to receive one of the three object electromagnetic radiation portions, and respectively transmit first, second and third portions of the first transformed electromagnetic radiation; said mask assembly including first, second and third mask subassemblies respectively configured to receive the first, second and third portions of the first transformed electromagnetic radiation, and respectively transmit first, second and third complex mask transformed electromagnetic radiation; and said second electromagnetic radiation assembly including three second electromagnetic radiation subassemblies respectively configured to receive first, second and third complex mask transformed electromagnetic radiation, and respectively transmit first, second and third portions of transmitted electromagnetic radiation.

Another object of this invention is to provide a novel apparatus, wherein the first mask subassembly is configured to transmit the first complex mask transformed electromagnetic radiation based on a Fourier transform of a first Fresnel Zone Pattern, the second mask subassembly is configured to transmit the second complex mask transformed electromagnetic radiation based on a Fourier transform of a second Fresnel Zone Pattern, and the third mask subassembly is configured to transmit the third complex mask transformed electromagnetic radiation based on a Fourier transform of a third Fresnel Zone Pattern.

Another object of this invention is to provide a novel apparatus, wherein the image capture assembly includes at least one of a CCD, a CMOS light sensitive device, another electronic camera, a light sensitive emulsion, or another photosensitive device.

Another object of this invention is to provide a novel apparatus, wherein the electromagnetic radiation assembly consists of i) one diffractive electromagnetic radiation element and ii) one converging lens or mirror.

Another object of this invention is to provide a novel apparatus, wherein the electromagnetic radiation assembly consists of i) one diffractive electromagnetic radiation element and ii) two converging lenses or two mirrors.

Another object of this invention is to provide a novel apparatus, further comprising: an objective assembly arranged between the object and the electromagnetic radiation assembly and configured to collimate, focus, invert or modify the electromagnetic radiation from the object, prior to the received electromagnetic radiation being received at the electromagnetic radiation assembly.

Another object of this invention is to provide a novel apparatus, wherein the objective assembly includes at least one of an objective lens, a zoom lens, a macro lens, a microscope, a telescope, a prism, a filter, a monochromatic filter, a dichroic filter, a complex objective lens, a wide-angle lens, a camera, a pin-hole, a light slit, or a mirror.

Another object of this invention is to provide a novel apparatus, wherein the electromagnetic radiation apparatus includes a diffractive electromagnetic radiation element configured to produce an off-axis Fresnel Zone pattern when the diffractive element is illuminated by a coherent plane wave.

Another object of this invention is to provide a novel apparatus, wherein the electromagnetic radiation includes at least one of an x-ray radiation, a microwave radiation, an infrared light, a radio frequency signal or an ultraviolet light.

Another object of this invention is to provide a novel apparatus, wherein the electromagnetic radiation assembly and the image capture assembly do not include any reflective electromagnetic radiation elements.

Another object of this invention is to provide a novel apparatus configured to produce a hologram of a cross-section of an object, said apparatus comprising: an electromagnetic radiation assembly configured to receive a received electromagnetic radiation from the object along a radiation axis in an electromagnetic radiation receiving direction, transmit a transmitted electromagnetic radiation along the radiation axis in the electromagnetic radiation receiving direction, and interfere a first portion of the transmitted electromagnetic radiation with a second portion of the transmitted electromagnetic radiation the transmitted electromagnetic radiation; and an image capture assembly configured to capture an image of the transmitted electromagnetic radiation transmitted along the optical axis in the electromagnetic radiation receiving direction, and produce the hologram of the cross-section of the object from the captured image, wherein the radiation axis is a straight line, the hologram of the cross-section including information regarding a single cross-section of the object.

Another object of this invention is to provide a novel apparatus configured to produce a hologram of a cross-section of an object, said apparatus comprising: an electromagnetic radiation assembly configured to receive a received electromagnetic radiation from the object and transmit a transmitted electromagnetic radiation based on the received electromagnetic radiation, the transmitted electromagnetic radiation including the holograms of the object's cross-sections; and an image capture assembly configured to capture an image of the transmitted electromagnetic radiation and produce the hologram of the cross-section from the captured image, the hologram of the cross-section including information regarding a single cross-section of the object.

Another object of this invention is to provide a novel apparatus configured to produce a hologram of a cross section of an object, said apparatus comprising: an electromagnetic radiation assembly configured to receive a received electromagnetic radiation from the object, transmit a transmitted electromagnetic radiation based on the received electromagnetic radiation, and interfere a first portion of the transmitted electromagnetic radiation with a second portion of the transmitted electromagnetic radiation; and an opaque image capture assembly configured to capture an image of the transmitted electromagnetic radiation produced by the interference of at least the first and second portions of the transmitted electromagnetic radiation, and produce the hologram of the cross-section of the object from the captured image, wherein a center of the electromagnetic radiation assembly and a center of the image capture assembly are arranged along a same straight line.

Another object of this invention is to provide a novel apparatus configured to produce a hologram of a cross-section of an object, said apparatus comprising: an electromagnetic radiation assembly consisting of one diffractive electromagnetic radiation element and configured to receive a received electromagnetic radiation from the object and transmit a transmitted electromagnetic radiation based on the received electromagnetic radiation; and an image capture assembly configured to capture an image of the transmitted electromagnetic radiation, and produce the hologram of the cross-section of the object from the captured image.

Another object of this invention is to provide a novel apparatus configured to produce a hologram of a cross-section of an object, said apparatus comprising: an electromagnetic radiation assembly configured to receive a received electromagnetic radiation from the object, perform a transformation of the received electromagnetic radiation, and transmit the transformed received electromagnetic radiation, the transformation including a convolution of a function representing an intensity distribution of the received electromagnetic radiation and a concentric ring function; and an image capture assembly configured to capture an image of the transmitted electromagnetic radiation, and produce the hologram of the object from the captured image.

Another object of this invention is to provide a novel apparatus configured to produce a hologram of a cross-section of an object, said apparatus comprising: an electromagnetic radiation assembly configured to receive a received electromagnetic radiation from the object, perform a transformation of the received electromagnetic radiation, and transmit the transformed received electromagnetic radiation, the transformation including a convolution of i) an intensity distribution of the received electromagnetic radiation and ii) a function having regions of positive slope and negative slope when evaluated between a center of the optical assembly and an outer edge of the optical assembly; and an image capture assembly configured to capture an image of the transmitted electromagnetic radiation, and produce the hologram of the cross-section of the object from the captured image.

Another object of this invention is to provide a novel apparatus configured to produce a hologram of a cross-section of an object, said apparatus comprising: an electromagnetic radiation assembly configured to convolve i) a received electromagnetic radiation received from the object and ii) a curve having plural inflection points between a center of the optical assembly and an edge of the optical assembly, and transmit the convolved electromagnetic radiation; and an image capture assembly configured to capture an image of the convolved electromagnetic radiation, and produce the hologram of the cross-section of the object from the captured image.

Another object of this invention is to provide a novel apparatus configured to produce a hologram of a cross-section of an object, said apparatus comprising: an electromagnetic radiation assembly configured to receive a received electromagnetic radiation from the object, perform a transformation of the received electromagnetic radiation, and transmit the transformed received electromagnetic radiation, the transformation including a convolution of i) an intensity distribution of the received electromagnetic radiation and ii) a transformation function that is a linear combination of three partial transformation functions, each including a concentric ring pattern; and an image capture assembly configured to capture an image of the transmitted electromagnetic radiation, and produce the hologram of the cross-section of the object from the captured image.

Another object of this invention is to provide a novel apparatus configured to produce a hologram of a cross-section of a chemiluminescent object, said apparatus comprising: an electromagnetic radiation assembly configured to receive a received chemiluminescent radiation from the object, and transmit a transmitted electromagnetic radiation including the hologram of the cross-section of the object; and an image capture assembly configured to capture an image of the transmitted electromagnetic radiation, and produce the hologram of the cross-section of the object from the captured image.

Another object of this invention is to provide a novel apparatus configured to produce a hologram of a cross-section of an object, said apparatus comprising: an electromagnetic radiation assembly configured to receive a scattered electromagnetic radiation scattered by the object, which scatters a source electromagnetic radiation, and transmit a transmitted electromagnetic radiation based on the received scattered electromagnetic radiation, the transmitted electromagnetic radiation being independent of any source electromagnetic radiation that is not scattered by the object; and an image capture assembly configured to capture an image of the transmitted electromagnetic radiation and produce the hologram of the cross-section of the object from the captured image.

Another object of this invention is to provide a novel apparatus configured to produce a hologram of a cross-section of an object, said apparatus comprising: an electromagnetic radiation assembly configured to diffract an electromagnetic radiation received from the object; and an image capture assembly configured to capture an image of the diffracted electromagnetic radiation and produce the hologram of the cross-section of the object from the captured image.

Another object of this invention is to provide a novel apparatus configured to produce a hologram of a cross-section of an object, said apparatus comprising: plural electromagnetic radiation sources configured to radiate the object with plural electromagnetic radiation signals; an electromagnetic radiation assembly configured to receive a received electromagnetic radiation from the object and transform the received electromagnetic radiation, the received electromagnetic radiation including portions of the plural source electromagnetic radiation signals scattered by the object; and a capture assembly configured to capture an image of the transformed electromagnetic radiation and produce the hologram of the cross-section of the object from the captured image.

Another object of this invention is to provide a novel apparatus configured to produce a hologram of a cross-section of a fluorescent object, said apparatus comprising: an electromagnetic radiation assembly configured to receive a received fluorescent radiation from the object and transmit a transmitted electromagnetic radiation based on the received fluorescent radiation; and an image capture assembly configured to capture an image of the transmitted electromagnetic radiation and produce the hologram of the cross-section of the object from the captured image.

Another object of this invention is to provide a novel apparatus configured to produce a hologram of a cross-section of a black body radiation radiating object, said apparatus comprising: an electromagnetic radiation assembly configured to receive a received black body electromagnetic radiation from the object, and transmit a transmitted electromagnetic radiation based on the received black body electromagnetic radiation from the object; and an image capture assembly configured to capture an image of the transmitted electromagnetic radiation and produce the hologram of the cross-section of the object from the captured image.

Another object of this invention is to provide a novel apparatus configured to produce a hologram of a cross-section of an object, said apparatus comprising: an electromagnetic radiation assembly configured to receive a received electromagnetic radiation from the object, transmit a transmitted electromagnetic radiation based only on the received electromagnetic radiation from the object, and interfere a first portion of the transmitted electromagnetic radiation with a second portion of the transmitted electromagnetic radiation; and an image capture assembly configured to capture a fringe pattern produced by the interference of at least the first and second portions of the transmitted electromagnetic radiation and produce the hologram of the cross-section of the object from the fringe pattern.

Another object of this invention is to provide a novel electromagnetic radiation apparatus configured to produce a hologram of a cross-section of an object, said apparatus configured to receive a received electromagnetic radiation from the object, diffract the received electromagnetic radiation, and transmit a diffracted electromagnetic radiation including the hologram of the cross-section of the object.

Another object of this invention is to provide a novel apparatus configured to produce a hologram of a cross-section of a scene, said apparatus comprising: an electromagnetic radiation assembly configured to receive a received electromagnetic radiation from the scene, diffract the received electromagnetic radiation, and transmit a diffracted electromagnetic radiation; and an image capture assembly configured to capture an image of the diffracted electromagnetic radiation, and produce the hologram of the cross-section of the scene from the captured image.

Another object of this invention is to provide a novel apparatus configured to produce a hologram of a cross-section of an object, said apparatus comprising: an electromagnetic radiation assembly configured to receive a received electromagnetic radiation from the object, transform the received electromagnetic radiation, and transmit the transformed electromagnetic radiation including a fringe pattern; and an image capture assembly configured to capture an image of the fringe pattern and produce the hologram of the cross-section of the object from the captured fringe pattern.

Another object of this invention is to provide a novel apparatus configured to produce a hologram of a cross-section of an object, said apparatus comprising: an electromagnetic radiation assembly configured to receive a received electromagnetic radiation from the object and transform the received electromagnetic radiation; and an image capture assembly configured to capture the transformed electromagnetic radiation including the hologram of the cross-section of the object, said holograms includes fringe patterns produced by an interference of the received electromagnetic radiation with itself, and said holograms not including fringe patterns produced by an interference of the received electromagnetic radiation with any other electromagnetic radiation.

Another object of this invention is to provide a novel method for producing a hologram of a cross-section of an object, said method comprising steps of: receiving a received electromagnetic radiation from the object; transmitting a diffracted electromagnetic radiation based on the received electromagnetic radiation; capturing an image of the diffracted electromagnetic radiation; and producing the hologram of the cross-section of the object from the captured image.

Another object of this invention is to provide a novel apparatus, wherein the received electromagnetic radiation does not include coherent light.

Another object of this invention is to provide a novel apparatus, wherein the hologram of the cross-section includes information regarding only the single cross-section of the object.

Another object of this invention is to provide a novel apparatus, wherein the cross-section of the object includes an observable portion of the object that exists on a plane perpendicular to the direction of the received electromagnetic radiation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a block diagram of an embodiment of an optical apparatus that includes an optical assembly;

FIG. 5 is a detailed front view of another embodiment of a mask that includes a diffractive optical element (DOE) having an array of plural transform regions;

FIG. 6 is an example of a binary Fresnel Zone Pattern;

FIG. 9C is an example of a pattern on a CCD when a point object is present at the input;

FIG. 13 is a block diagram of an embodiment of a capture control unit that includes an image data processor that combines the electronic image data;

FIG. 20C is a block diagram of an example of an optical apparatus that does not require first and second transforming optical elements;

FIG. 29 is a block diagram of another embodiment of an optical apparatus;

DETAILED DESCRIPTION OF THE PREFERRED EMBODIMENTS

Conventional holographic techniques may include methods of capturing a hologram of an object by capturing an interference pattern that results when a first portion of a coherent laser light beam (e.g., reference beam) interferes with a second portion of the laser light beam reflected off the object (e.g., object beam). A three-dimensional image of the object may be viewed by appropriately illuminating the recorded interference pattern with the reference beam.

Figure 31:
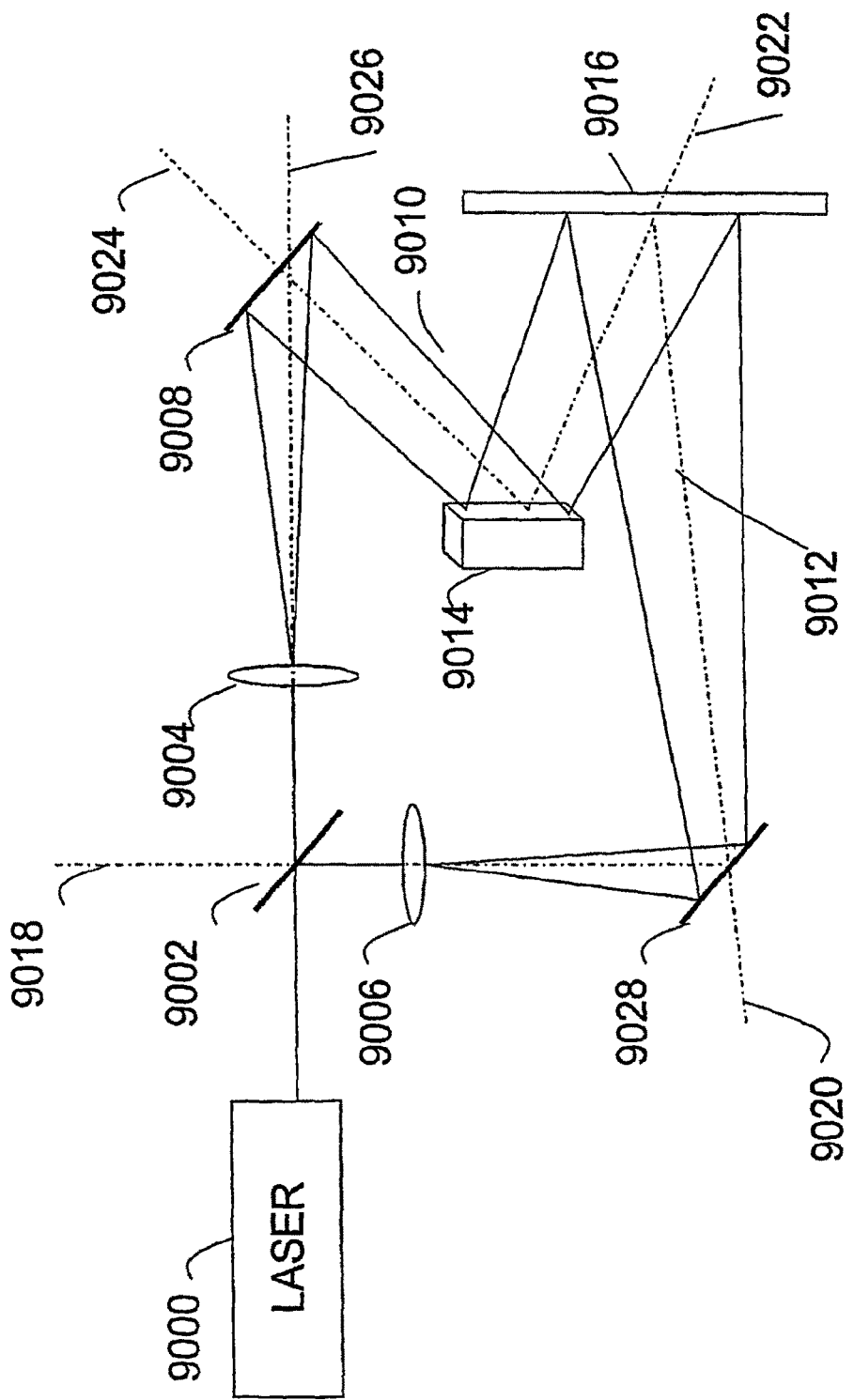
FIG. 31 is a block diagram of a conventional holographic system.

FIG. 31 is a block diagram of a conventional holographic system including a laser 9000 that shines a coherent laser light beam along a first optical axis 9026 through a partially reflective and transmissive mirror, such as a beam splitter 9002. A first portion of the split laser beam is guided by lens 9004 and mirror 9008 to illuminate the object 9014 with the object beam 9010 along a second optical axis 9024. A second portion of the split laser beam is reflected by the beamsplitter 9002 along a third optical axis 9018 and guided by lens 9006 and mirror 9028 to direct a reference beam 9012 along a fourth optical axis 9020 to an image capture device 9016 such as a photographic plate, a charge coupled device (CCD) or a complementary metal oxide semiconductor sensor (CMOS). The reference beam 9012 and the object beam 9010 reflected from the object 9014 along a fifth optical axis 9022 interfere with each other, producing an interference pattern that may be recorded as a hologram on the image capture device 9016.

Conventional holography solutions that produce a hologram by interfering two parts of a light source along different optical paths or optical axes may be very sensitive to any change in alignment of the optical paths or axes, because even minor changes in the length or direction of the optical paths or axes will change the phase relationship of the portions of light that interfere. Such a change will result in a change to the resulting interference pattern and hologram, and yield a distorted resulting image.

For example, in the holography system of FIG. 31, a factor such as motion, vibration, component deterioration or distortion, or thermal expansion, may cause a slight change in the length or direction of one or more of the first, second, third, fourth or fifth optical axes 9026, 9024, 9018, 9020 and 9022, respectively. Even a slight change in one of the axes may cause a corresponding change in the phase relationship of the reference beam 9012 and the light reflected from the object 9014 along the fifth optical axis 9010, thereby causing a significant change in the resulting interference pattern and hologram captured at the image capture device 9016.

Such a sensitivity to axial variation in conventional holographic systems may result in reduced resolution in the resulting three-dimensional information.

Various conventional attempts to address such a sensitivity to axial variation have had limited success. For example, attempts have included using massive platforms and shock absorbers to dampen vibration, high tolerance mechanical optical stages to reduce positioning errors, and optical and structural materials having reduced coefficients of thermal expansion to reduce thermal expansion effects. However, these attempts generally increase the cost, size and mass of conventional holography systems, and reduce system portability and availability.

In addition, conventional holography systems may require an active light source to illuminate the object and produce the reference and object beams. Active solutions that require illumination of the object by a particular light source may limit the applicability and usefulness of the conventional holography systems. For example, an active light source would not be useful in stealth military targeting holographic systems where it would be undesirable for the targeting device to give away its position by producing light or other electromagnetic radiation. Alternatively, an active radiation source would not be applicable in holographic systems that observe objects that produce their own light, such as a holographic system observing chemiluminescent, black body, or infrared illuminating objects. Such a holographic technique may be useful in observing objects such as ships by virtue of their ability to block the chemiluminescence of background emissions in certain bodies of water, such as the chemiluminescent Red Sea.

In addition, conventional holographic systems that rely on a coherent light source, such as a monochromatic laser, may be unable to capture color information from the object unless multi-line lasers or multiple lasers of different wavelengths are used. Systems such as those are likely to be very complex. Further, such systems may not be suitable for capturing three-dimensional information regarding objects that should not be illuminated with laser light (e.g., sensitive biological material).

Conventional holographic techniques using incoherent light to illuminate an object rely on a simplifying assumption that incoherent source objects may be considered to be composed of many individual light source points, each of which is self coherent, and each of which can therefore create an interference pattern with its mirrored image. For the purposes of this document, incoherent light is any temporally or spatially incoherent light for which any two electromagnetic fields emitted from a same location at two different times (in the case of temporal incoherence) or emitted from two different locations at the same time (in the case of spatial incoherence) do not create an interference grating or pattern when the two fields are summed together. Various methods of incoherent holography have been proposed using this principle, such as methods described in A. W. Lohmann, "Wavefront Reconstruction for Incoherent Objects," J. Opt. Soc. Am. 55, 1555-1556 (1964), G. Cochran, "New method of making Fresnel transforms," J. Opt. Soc. Am. 56, 1513-1517 (1966), P. J. Peters, "Incoherent holography with mercury light source," Appl. Phys. Lett. 8, 209-210 (1966), H. R. Worthington, Jr., "Production of holograms with incoherent illumination," J. Opt. Soc. Am. 56, 1397-1398 (1966), A. S. Marathay, "Noncoherent-object hologram: its reconstruction and optical processing," J. Opt. Soc. Am. A 4, 1861-1868 (1987), and G. Sirat, D. Psaltis, "Conoscopic holography," Optics Letters, 10, 4-6 (1985), each of which is incorporated herein by reference.

However, the conventional incoherent holographic techniques may require impractically high levels of light intensity. Thus, conventional incoherent holographic systems require active illumination of objects, and therefore may exhibit the resulting problems and limitations described above.

In addition, conventional incoherent holographic systems may rely on illuminating the object with a bandwidth limited source to reduce sensitivity to length differences in the plural optical path differences. For example, in a conventional incoherent holographic system acceptable variations in the relative length of optical paths may be limited to the inverse of the bandwidth multiplied by the light velocity. Thus, a predetermined light source having a limited bandwidth may be required, and the elimination of extraneous illumination may be necessary in conventional incoherent holographic systems.

Further, conventional incoherent holographic systems may require optical arrangements having plural optical axes similar to the example shown in FIG. 31. Thus, conventional incoherent holographic systems may also be susceptible to variations in direction or length of the optical axes, and attendant problems, as described above.

In addition, conventional holographic techniques involve splitting light into two channels using mirrors, which may have a low transfer efficiency, and then recombining the split light. The efficiency may be particularly low in the recombination where more than 50% of the power gets lost.

Further, in a conventional Fourier hologram, each object point is transformed to a linear grating throughout the entire image plane (e.g., throughout an entire CCD plane). Thus, in conventional incoherent methods of producing Fourier holograms, light from each object point must disadvantageously be intense enough to establish a high contrast grating or pattern over the entire image plane.

In addition, when viewed by human eyes, a conventional hologram may create an authentic illusion of viewing a realistic 3D scene. However, reconstructing the same hologram by a computer creates a virtual 3D space in which it may be difficult to know where exactly the image is in-focus, and what is the exact distance of each object from the camera. A conventional hologram may include only a 2D matrix and thus may not adequately represent all of the information contained in the 3D scene.

Tomographic methods have been proposed to overcome the limitations of conventional holographic techniques described above. Such tomographic methods may involve capturing plural images of an object from different points of view, for example by moving the object, or the camera, or both, in between successive images, and extracting three-dimensional object information by processing the successive images. Conventional tomographic methods are described in Y. Li, D. Aboukasis and J. Rosen, "Computer-generated holograms of three-dimensional realistic objects recorded without wave interference," Appl. Opt. 40, 2864-2870 (2001), and Y. Sando, M. Itoh, and T. Yatagai, "Holographic three-dimensional display synthesized from three-dimensional Fourier spectra of real existing objects," Opt. Lett 28, 2518-2520 (2003), each of which is incorporated herein by reference.

Tomographic methods may be slow, however, as they may require plural images to be captured before and after a relative perspective between the object and camera is changed and thus may not be able to capture objects which change during the time it takes to capture the multiple images. Alternatively, tomographic methods may require more expensive or physically large equipment that includes the ability to simultaneously capture images of the object from more than one perspective. Further, the methods may be impractical for distant objects or immovable objects for which it may be difficult to change a relative perspective from the camera. In addition, if the object is moving in an unpredictable way, it may be difficult to extract information from successive images without having another source of information regarding the shape or the movements of the object.

Range-finding methods involve measuring the distance between an apparatus and various points on a surface of an object, and constructing an image or model of the object based on the distances. Further, some range-finding methods may include a predetermined or controlled movement of the object or the apparatus to predictably change the view of the object from the apparatus over time. Thus, the conventional range-finding methods may also include the predictable change in the view of the object to determine an exterior three-dimensional shape of the object. Conventional range-finding methods include systems that illuminate points on an object with a laser, and measuring the amount of time required for the laser light to travel between the object and the laser source to determine a distance to the object based on the travel time. Related methods include "painting" an object with a laser stripe or grid and examining a deformation in the observed grid to determine geometric information of the object.

However, such range-finding methods require active illumination of the object by a coherent laser, and therefore are not suitable for incoherently illuminated objects or for fluorescent or luminescent emitting objects. When coherent light sources can be used, they have the attendant problems and limitations of active illumination and coherent light sources described above. Further, the methods may be difficult to perform if the object is moving in an unpredictable way, or if the object is very close to the laser source.

Other range-finding methods may include using a camera with a lens having a narrow depth of field and a calibrated automatic focusing system. The automatic focus system automatically adjusts the lens to focus on portions of the object, for example, by maximizing contrast in resulting images. Then, a range to the object is determined based on a mechanical position of the calibrated lens. However, such a calibrated focus technique may not be useful for objects having minimal optical contrast, or when objects or the apparatus is in motion. Further, the accuracy of such a system may be limited by the mechanical tolerances of the calibrated lens.

Another conventional method includes extracting an object distance from shadows in an image. For example, a conventional shadow method includes capturing an image of shadows produced when electromagnetic radiation (e.g., x-ray radiation or light) from an object is blocked by a mask with a concentric ring pattern such as a Fresnel Zone Pattern (FZP, a.k.a., Transmission Zone Plate, Zone Plate, Zone Pattern, Fresnel Zone Plate, etc. . . . ) placed between the object and an image plane.

For the purposes of this application, an FZP may be understood to be a two-dimensional pattern of alternating light and dark concentric rings in which a thickness (e.g., radial width) of successive rings is inversely proportional to the distance from the center of the rings. For example, the $n^{th}$ ring of an FZP may transition (i.e., from dark to light or light to dark) at a radius r described by the following equation (or by an approximation thereof):

$$r_n = \sqrt{nf\lambda}$$

where n is an integer, $\lambda$ is the wavelength of the applied light and f is the focal length of the FZP.

When used with scattered point light sources, such as stars, the relative positions of the centers of the shadows in the image may be extracted from the image, and distances to the corresponding point light sources may be calculated from the shadow center locations in the image. Such a method is described in L. Mertz and N. O. Young, "Fresnel transformations of images," in *Proceedings of Conference* on *Optical Instruments and Techniques*, K. J. Habell, ed. (Chapman and Hall, London 1961) p. 305, incorporated herein by reference.

However, such conventional shadow ranging methods have a limited usefulness for when the captured electromagnetic radiation has a wavelength comparable to the distance between the rings of the FZP, such as visible light. For example, the visible light may be diffracted by the edges of rings in the FZP causing shadows in the image to have poorly defined or smeared edges, thereby making it difficult or impossible to isolate the centers of resulting shadow patterns (e.g., see Mertz and Young at FIG. 2).

Conventional scanning holographic methods involve scanning an object by illuminating a surface of the object with a moving a pattern of Fresnel Zone Plates (FZPs), serially sensing the intensity of reflected or transmitted light from the object (i.e., a one dimensional intensity signal) as the pattern moves across the object, and integrating and processing the serially sensed light intensities to generate three-dimensional information of the object. In particular, a convolution between the object and the moving Fresnel Zone Patterns is used to extract three-dimensional information regarding the object. Conventional scanning holographic methods are described in Poon T.-C., "Three-dimensional image processing and optical scanning holography," ADVANCES IN IMAGING AND ELECTRON PHYSICS 126, 329-350 (2003), and G. Indebetouw, A. El Maghnouji, R. Foster, "Scanning holographic microscopy with transverse resolution exceeding the Rayleigh limit and extended depth of focus," J. Opt. Soc. Am. A 22, 892-898 (2005), each of which is incorporated herein by reference.

However, conventional scanning holographic methods require that a pattern be moved across the object while the location of the object is fixed, thereby limiting the usefulness of the method. Alternatively, the pattern may be fixed and the object moved across the pattern, resulting in similar limitations.

In addition, the scanning process may be a relatively slow process requiring mechanical movements. Thus, scanning is susceptible to problems produced by mechanical deterioration and inaccuracy, such as reduced resolution as described above.

Further, since scanning holographic methods serially capture a one-dimensional light intensity signal from the object and integrate the serial signal to extract three-dimensional information, such systems are highly susceptible to variations in the relative positions of the scanning apparatus and the object over the duration of the scan. For example, if such a system captures a first intensity during a first part of the scan, and a second intensity during a second part of the scan, any variation in the relative positions of the object and the scanning apparatus (or even minor changes in the internal arrangement of elements of the scanning apparatus) may adversely introduce variations into the captured second intensity, thereby reducing an accuracy, resolution and usefulness of the system.

In addition, scanning holographic systems are generally large and complex therefore they may not be suitable for applications requiring portability or low cost. Further, conventional scanning holographic systems may require an object to be illuminated by an interference pattern produced by interfering laser light, may include a very slow recording process that could take several minutes or more for each object capture, and the recording process may disadvantageously require significant mechanical movement of recording device components and/or the object during the recording process.

Referring now to the drawings, wherein like reference numerals designate identical or corresponding parts throughout the several views.

Figure 1:
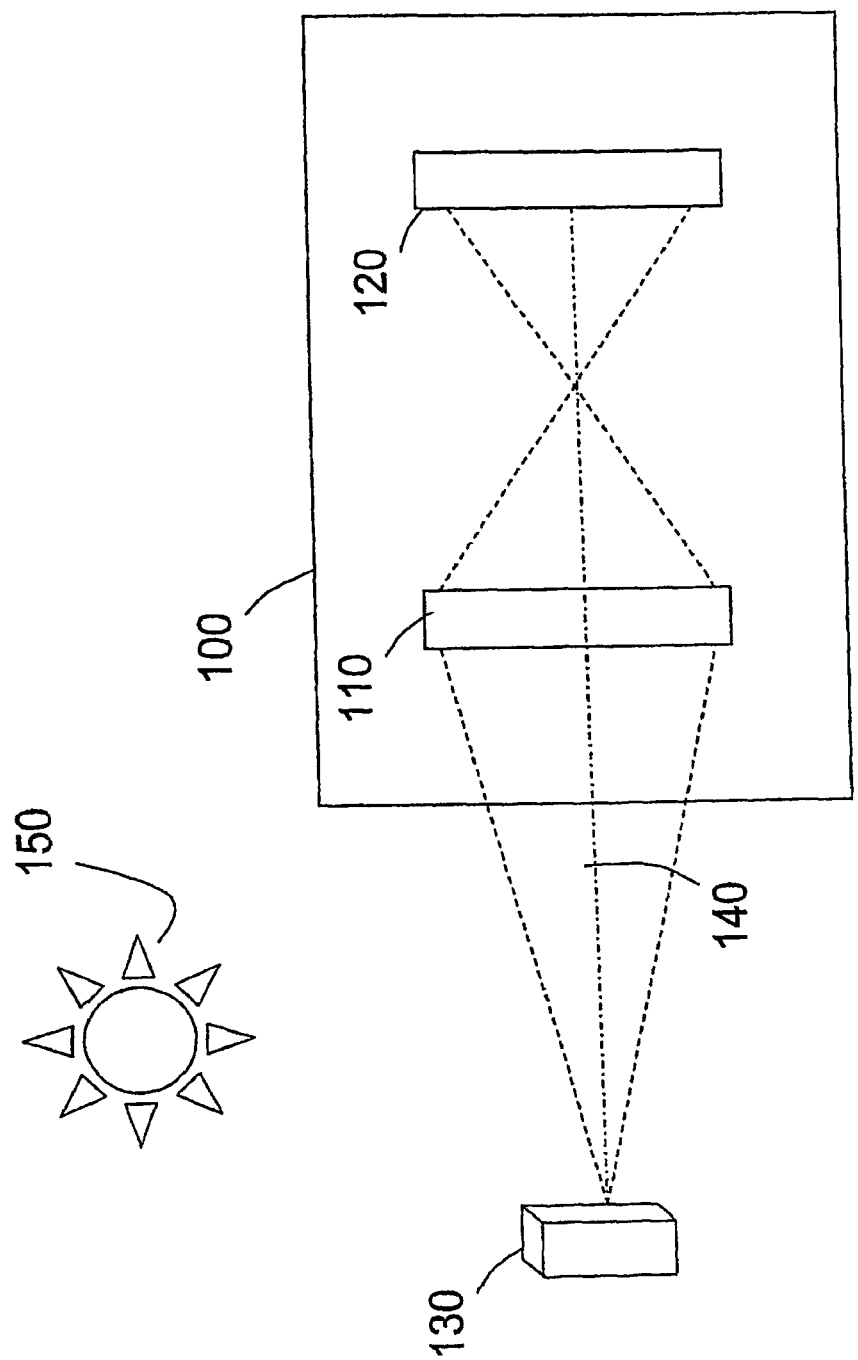
FIG. 1 is a block diagram of an optical apparatus according to an embodiment of the present invention.

FIG. 1 is a block diagram of an optical apparatus 100 according to a first embodiment of the present invention. The optical apparatus 100 is configured to capture a three-dimensional information of an object 130, and the optical apparatus 100 includes an optical assembly 110 and an image capture assembly 120. In particular, the optical assembly 110 receives light from the object 130 along a receiving optical axis 140. For example, the optical assembly may receive light from the sun 150 that is reflected or scattered by reflecting surfaces on the object 130. The received light may be polychromatic and incoherent light, such as reflected sunlight. In addition, the light from the object may be fluorescent light or chemiluminescent light emitted by the object. The optical apparatus 100, in this embodiment, does not illuminate the object but passively receives light from the object.

The optical assembly 110 transforms the received light according to a transformation described below, and transmits the transformed light along the receiving optical axis 140. The image capture assembly 120 receives the transformed light from the optical assembly 110, and captures a two-dimensional intensity image of the transformed light. The captured two-dimensional intensity image includes geometric information regarding the portions of the object 130 from which light is received at the optical assembly 110. The geometric information is encoded in the captured two-dimensional intensity image as a Fresnel hologram. However, such a Fresnel hologram may be in focus for one cross-section or object focal plane of the object, while the Fresnel hologram may be out of focus for other portions of the object that are in front of or behind the cross-section that is in the object focal plane.

Accordingly, a method for extracting information from the desired in-focus cross-section may take advantage of differences between the patterns in that plane and in other planes. Points on the desired cross-section plane create a composition of Fresnel zone plates each contributed from an object point on the specific cross-section plane of the object. Points from other than the specific cross-section plane contribute noisy patterns that may be accumulated in the image sensor, and the noisy patterns may be removed from the image data. For example, using three captured images, each with different phase factors, a superposition of the captured images may yield a Fresnel hologram which advantageously only contains information about a visible portion of the object that intersects a specific cross-section plane of the object space. In addition, the present invention also applies to capturing a set of single object plane holograms, which include a set of two-dimensional intensity images that encode three-dimensional or geometric information of an object. The image capture assembly 120 may extract complete three-dimensional information of the object from the captured set of single object plane holograms. The image capture assembly may be an opaque light capturing device. An opaque device is understood to mean a device that is not transparent or translucent to electromagnetic radiation of relevant frequencies and intensities, and therefore such a device does not allow such electromagnetic radiation to pass through.

A hologram is a real positive light intensity distribution that encodes a complex valued wave-front distribution, including three-dimensional information regarding the light scattering surface of the object. Further, in a Fresnel hologram, each point on the object is encoded into a portion of a sinusoidal Fresnel zone plate with an entire range of spatial frequency components present, as noted by Goodman, "Introduction to Fourier Optics," 3rd Ed., Roberts & Company Publishers, 2005, incorporated herein by reference. Thus, an image of the object's cross-section may be recreated optically, by appropriately illuminating a transparency having the Fresnel hologram, or the image of the object's cross-section may be recreated by a computer using an electronic image data of the hologram. The recreated set of images of the object's cross-section includes three-dimensional information regarding the shape and distance of an observable surface of the object.

The optical apparatus 100 may advantageously capture the three-dimensional object information without moving or being moved (i.e., the spatial relationship between the optical apparatus 100 and the object 130 may remain unchanged from a time before an image is captured to a time after the three-dimensional information is extracted from the captured image by the image capture assembly 120). In addition, the optical apparatus 100 may advantageously capture the three-dimensional object information while one or both of the object and the optical apparatus 100 are in motion.

Moreover, the optical apparatus 100 does not project any pattern on the object, such as is done in a conventional or scanning holographic method. Further, the optical apparatus 100 does not include any parts that are required to move while the light is being received from the object, such as a scanning aperture used in scanning holography. Thus, without parts that move during image capture, the optical apparatus 100 may be less expensive to produce and use, more reliable, quieter, and faster, for example, than an apparatus used for scanning holography. Further, with respect to conventional holographic systems that require active illumination (for example, illumination by a laser), the present invention advantageously has a simpler design that may be applied to more types of imaging.

In addition, the present invention does not require an interference between a light from the illumination (i.e., not scattered by the object) with a light scattered by the object. Instead, the current approach diffracts light scattered by the object, which may be understood as a mutual interference between portions of electromagnetic radiation wavefronts coming from object itself, and is not an interference between such scattered light and another light from the source. Thus, as the mutual interference may be performed by a few collinear electromagnetic elements (e.g., lenses and masks, or DOEs, as described below), or even a single electromagnetic element (e.g., a single DOE, as described below), the relative differences between optical paths of the interfering wavefronts are easily controlled (e.g., all the optical paths pass through the same electromagnetic elements) and therefore, variations between the lengths of the paths may be more easily controlled and minimized.

Further, the optical apparatus 100 may advantageously capture the three-dimensional object information in a single image (e.g., a single exposure).

Moreover, the optical apparatus 100 may advantageously be able to capture images with very low levels of light intensity. Conventional holographic systems may require beam splitters and/or mirrors that may cause some received light to be lost or wasted. On the other hand, the optical apparatus 100 does not require the use of beam splitters or mirrors, and therefore may be able to capture images with low levels of light intensity.

Further, conventional holographic systems may produce Fourier holograms in which each object point contributes to interference fringe patterns that are spread over the entire image plane. Such conventional systems may require greater light intensity than the optical apparatus 100, which translates each object point using a Fresnel Zone Pattern, which may produce fringe patterns for a particular object point in only a portion of the image plane, thereby advantageously allowing for lower light intensities.

In addition, the optical apparatus 100 advantageously receives and transmits light only along a single axis, thereby reducing susceptibility to axial variation and simplifying the design, manufacture and use of the optical apparatus 100. Further, the optical apparatus 100 is coaxial and self-interfering. In particular, in the present embodiment light from separate light paths is not interfered to produce an interference pattern or hologram. Instead, the hologram is produced by diffraction of light in the optical assembly 110. Although diffraction may be understood as being produced by interference between each portion of a light wavefront (i.e., each point along the wavefront being considered a point source of light according to Huygens wave theory of light), diffraction produced by a single coaxial assembly, as in the present embodiment, is much less sensitive to variations in optical paths between interfering light sources. In particular, light is self-interfered, according to the present embodiment, because the only interference is between light waves passing through various portions of a same optical element (e.g., the optical assembly 110, or the mask 304 in FIG. 3, described below), and it is much easier to minimize path length and angle variations for paths passing through a same optical element, as in the present embodiment, than it is to control path variations between separate optical paths, passing through separate optical elements, along separate optical axes, as in the conventional holography systems. In addition, the optical apparatus 100 may be used to advantageously capture polychromatic incoherent light received from the object. Therefore, a full color three-dimensional image may be recreated from the hologram recorded by the apparatus.

Although embodiments within this document are described as transmitting and receiving light, capturing light images and including optical assemblies, the invention is also applicable to other types of electromagnetic radiation. Thus, the invention also includes an electromagnetic radiation apparatus that includes an electromagnetic radiation assembly that receives a received electromagnetic radiation from an object.

Figure 2:
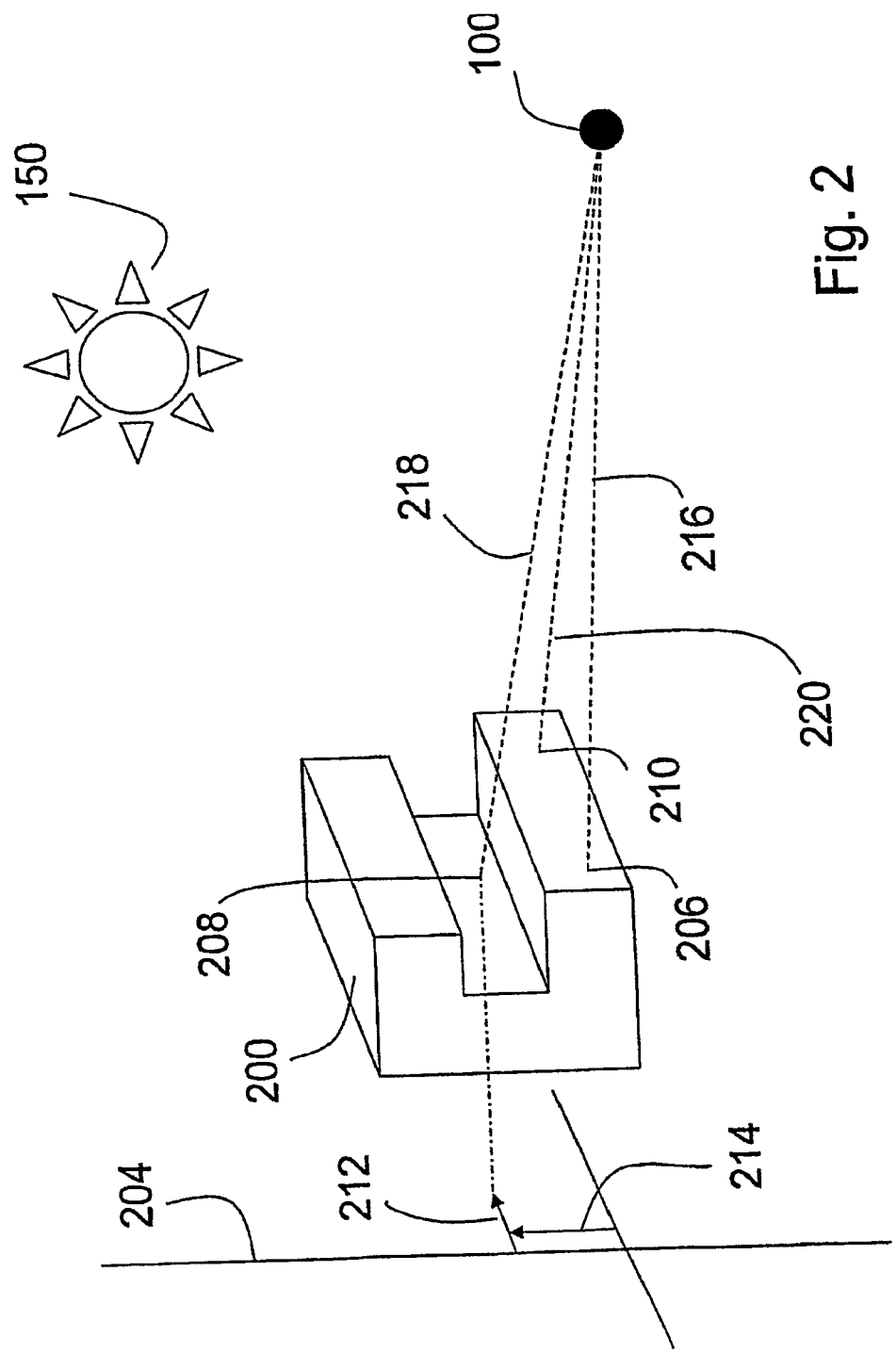
FIG. 2 is a block diagram that illustrates an example of captured geometric information according to embodiments of the present invention.

FIG. 2 is a block diagram that illustrates an example of captured geometric information according to embodiments of the present invention. According to the example of FIG. 2, an object 200 is illuminated by a light source or sources (e.g., the sun 150) causing light to be scattered or reflected by various light radiating portions of the object 200. Three example light radiating portions 206, 208 and 210 scatter light rays 216, 218 and 220, respectively. These example light rays travel towards the optical apparatus 100 (shown in FIG. 2 without the detail of FIG. 1). Light captured by the optical apparatus 100, according to the present invention, includes geometric information regarding the distance between the object and the optical apparatus as well as the shape of observable surfaces of the object 200 from which light is received at the optical apparatus 100. For example, the captured light includes information regarding a distance traveled by the ray of light 218, and in particular, includes the distance between the light radiating portion 208 and the optical apparatus 100. Further, the captured light also includes geometric information regarding a horizontal distance of the light radiating portion 208, for example, a horizontal distance 212 between an edge of the object 200 and the light radiating portion 208. In addition, the captured light also includes geometric information regarding a vertical distance of the light radiating portion 208, for example, a vertical distance 214 between an edge of the object 200 and the light radiating portion 208. In this example, horizontal distance 212 and vertical distance 214 are distances measured in a measurement plane 204 that passes through radiating portion 208.

Thus, an optical apparatus, according to the present embodiment, may be configured to capture a light including geometric information regarding each portion of each object from which the light is received at the optical apparatus. Further, from the geometric information, the size, shape and location of the visible portions of each object may be determined. For example, in FIG. 2, if light is scattered by each external surface of the object 200, and at least a portion of the scattered light is received at the optical apparatus 100, then the apparatus 100 may capture light including geometric information regarding the dimensions (e.g., height, width and depth) of each visible surface of the object 200, as well as information regarding the distance between the object 130 and the front surface of optical apparatus 100.

Although light is scattered by external surfaces in FIG. 2, one of skill in the art will understand that such an optical apparatus is also capable of capturing received light from an internal surface of the object 130 that radiates light to the optical assembly 100 through a translucent or transparent exterior portion of the object 130. In that case, the captured geometric information may include geometric information regarding an interior portion of the object.

The optical assembly 110 includes any optical assembly configured to control a complex amplitude of the transmitted light according to the complex transformation function described below. Thus, for example, optical assembly 110 may include one or more refractive lenses, one or more diffractive optical elements (DOEs), or one or more spatial light modulators (SLMs).

An incoherent correlator in the regime of diffraction theory may include every system that produces a pattern of a two-dimensional Fourier transform of the mask transparency on the system's aperture at an output plane around a point that is linearly related to an input point's location, when the incoherent correlator is illuminated by a single point from some position on the input plane. Thus, the incoherent correlator produces an output image including every point in the input plane.

Figure 3:
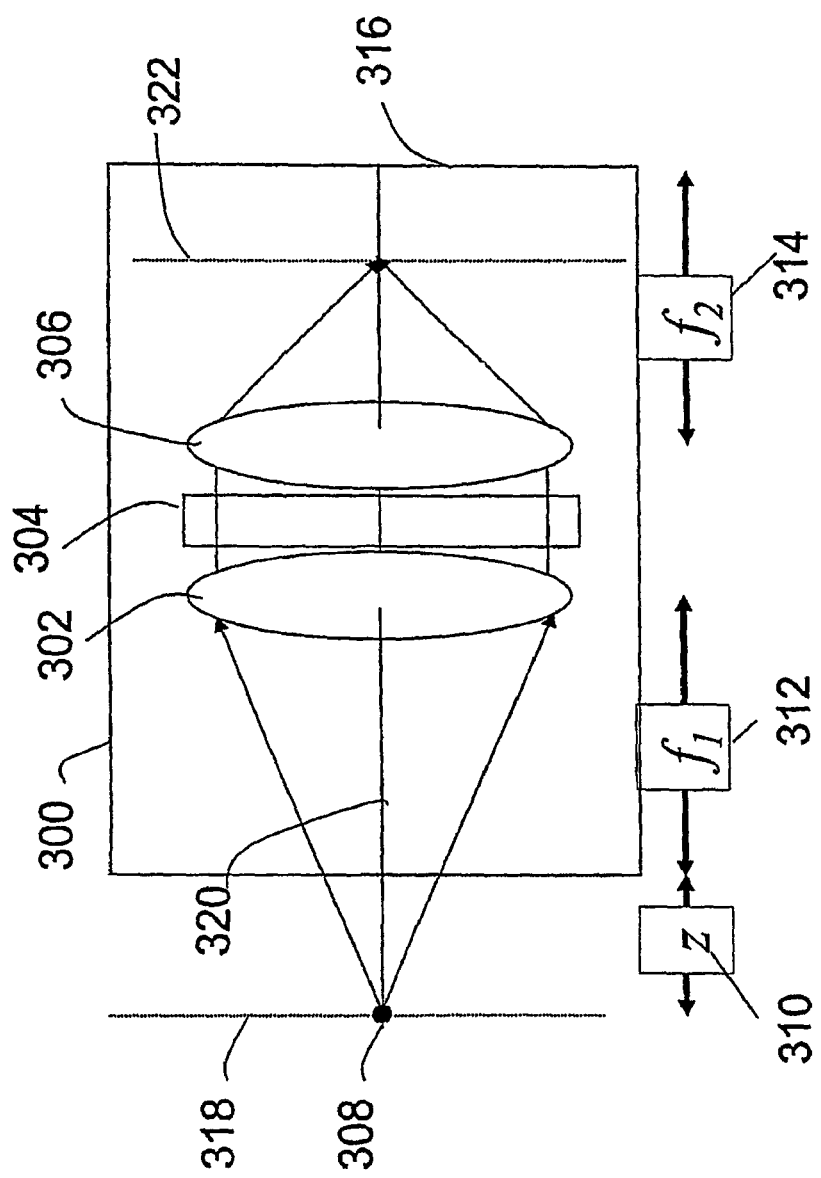
FIG. 3 is a block diagram of an incoherent correlator that may be used as the optical assembly in the optical apparatus of FIG. 1.

FIG. 3 is a block diagram of an incoherent correlator 300 that may be used as the optical assembly 110 in the optical apparatus 100 shown in FIG. 1. The incoherent correlator 300 is an optical assembly that includes a first transforming optical assembly 302, a mask 304 and a second transforming optical assembly 306. Each of the first and second transforming optical assemblies 302/306 include the types of converging lenses that would perform a two-dimensional Fourier transform of received light if they were illuminated by coherent light (though coherent light is not required during the operation of the present invention). When the incoherent correlator 300 is illuminated by a single point light source 308 from some position on a plane 318, the incoherent correlator 300 produces a pattern of a Fourier transform of a mask 304 on an output plane 322. The plane 318 is located along and perpendicular to an optical axis 320 of the incoherent correlator 300, at a distance $(z+f_1)$ from the first transforming optical assembly 302, where $f_1$ is a focal length of the first transforming optical assembly 302 and z is a remaining distance between the point light source 308 and the first transforming optical assembly 302. The output plane is located along and perpendicular to the optical axis 320 at a distance $f_2$ from the second transforming optical assembly 306, where $f_2$ is a focal length of the second transforming optical assembly 306, in a direction away from the plane 318. Note that the Fourier transform of a mask 304 on an output plane 316 is obtained only if z=0. When z≠0 the optical assembly 300 still performs a correlation between the object, but with a different function than the Fourier transform of mask 304. In other words, in the case that z≠0, the output plane 316 will include an output image that is different than a Fourier transform of a mask 304.

FIG. 4 is a block diagram of an embodiment of an optical apparatus 400 that includes an optical assembly 300. Optical apparatus 300 includes a first transforming optical assembly 302, a mask 304 and a second transforming optical assembly 306. Each of the first and second transforming optical assemblies 302/306 are the types of optical assemblies (e.g., converging Fourier lenses) that would perform a two-dimensional Fourier transform operation on a received coherent light (although the use of the apparatus does not require coherent light). Light is received from object 130 at the first transforming optical assembly 302, which transforms the received light and transmits the transformed light. The mask 304 receives the transformed light, varies an amplitude and/or phase of the received coherent transformed light as described below, and transmits a portion of the received light as the masked light. The masked light is received by the second transforming optical assembly 306, which transforms the masked light and transmits a second transformed light. The image capture assembly 120 receives and captures the second transformed light, as described above. Note that when the light received from the object is incoherent, the transformations performed by the first and second transforming optical assemblies 302/306 may not be Fourier transformations. However, the first and second transforming optical assemblies 302/306 are the types of optical assemblies (e.g., converging Fourier lenses) that would produce a Fourier transform of received coherent light or received point source light.

The mask 304 includes any device or structure configured to transform an amplitude and phase of a received light, according to one or more predetermined complex transmission functions. For example, the mask 304 may include one or more diffractive optical elements (DOE), one or more amplitude filters, one or more lenses, and/or one or more SLMs.

FIG. 5 is a detailed front view of an embodiment of mask 304 that includes a DOE having an array of plural transform regions 500-514. Each of the plural transform regions in the diffractive optical element is configured to transform a phase and/or an amplitude of a received light according to the transform equations described below.

The diffractive optical element may include volume-modulated diffractive optical elements that use a variation in the volume of refractive material in each transform region to transform the phase and/or amplitude of the received light and produce transformed transmitted light. In addition, the diffractive optical element may include index-modulated diffractive optical elements that use a variation in a refractive index of refractive material in each transform region to transform the phase and/or amplitude of the received light and produce transformed transmitted light. In addition, the diffractive optical element may include one or more transmission layers of having a predetermined transmissivity to thereby vary an amplitude of the received light. Further, diffractive optical elements that combine one or more features of volume-modulated, index-modulated and transmission layer diffractive optical elements may also be included. Methods of preparing the diffractive optical elements include, for example, conventional methods such as those described in Salmio et al., "Graded-index diffractive structures fabricated by thermal ion exchange," Applied Optics, Vol. 36, No. 10, 1 Apr. 1997, Carre et al., "Customization of a self-processing polymer for obtaining specific diffractive optical elements," Synthetic Metals 127 (2002) 291-294, and Nordman et al., "Diffractive phase elements by electron-beam exposure of thin $As_2S_3$ films, Journal of Applied Physics 80(7), 1 Oct. 1996, each of which is incorporated herein by reference.

The two-dimensional intensity image captured by the image capture assembly is generally described by an intensity function $o(x,y)$, which describes the distribution of light intensities captured at each point in the image capture plane (i.e., x, y plane). The three intensity functions $o_n(x,y)$ define the partial contribution to the overall image intensity contributed by each partial image, and is related to the overall image intensity function as follows:

$$o(x, y) = \sum_{n=1}^{3} B_n o_n(x, y) \tag{1A}$$

where $B_n$ is a complex constant.

The transmission functions that produce the three partial images captured by the image capture assembly 120 are defined as follows:

$$o_n(x,y) = \iiint s(x',y',z') |h_n(x-x',y-y',z')|^2 dx'dy'dz' \tag{1B}$$

where $s(x',y',z')$ is a function that describes the intensity at the system input in the vicinity of the point $(x',y',z')=(0,0,0)$. From the function $o(x,y)$, the geometric information regarding the light scattering surface (i.e., the portions of the object facing the optical apparatus 100 that scatter or emit light that is received at the optical assembly 110) of the object may be determined in terms of object referenced coordinates $x'$, $y'$ and $z'$.

The output response functions of the optical system for a light point at $(x,y,0)$ are termed point spreading functions (PSF) $h_n(x,y,0)$. In the present embodiment, $h(x,y,0)$ is a linear summation of point spreading functions $h_1(x,y,0)$, $h_2(x,y,0)$ and $h_3(x,y,0)$, which each perform a light spreading function with respect to the image capture coordinates (i.e., $x,y,0$). PSF $h(x,y,0)$ is defined as follows:

$$h(x, y, 0) = \sum_{n=1}^{3} \left| \frac{1}{\sqrt{2}} \exp\left\{ \frac{i\pi}{2\lambda\Delta}[(x-x_n)^2 + (y-y_n)^2] + \frac{i\theta_n}{2}\right\} + \frac{1}{\sqrt{2}} \exp\left\{ \frac{-i\pi}{2\lambda\Delta}[(x-x_n)^2 + (y-y_n)^2] - \frac{i\theta_n}{2}\right\}\right| \times \tag{2}$$

$$\exp[i\varphi_n(x-x_n, y-y_n)]p_z(x-x_n, y-y_n),$$

where $\phi_n(x-x_n,y-y_n)$ are wide-band random-like phase functions, $p_z(x-x_n,y-y_n)$ are two-dimensional disk functions centered at points $(x_1,y_1)$, $(x_2,y_2)$ and $(x_3,y_3)$, respectively, in the image capture space, i is the imaginary unit (i.e., $i=(-1)^{0.5}$), $\lambda$ is the wavelength of the propagating light, and $\Delta$ is a parameter. Further, the disk function $p_z$ has a diameter function $d(z)$ that varies the diameter based on the value of z and thereby limits the diameter of a corresponding FZP. Further, each PSF is selected to have a different constant phase value $\theta_n$.

Although the equation above includes a single value $\lambda$ for the wavelength of the propagating light, the above equation may be used for polychromatic light by assuming that the captured intensity image is a combination of intensities in plural portions of the total captured spectrum, and for example, the captured intensity image may be considered as a combination of captured red light intensities, captured blue light intensities, and captured green light intensities. Further, the invention also includes using other color models to represent the colored image, such as CMYK.

Thus, in the image captured at the image capture device (i.e., at z=0), the intensity PSFs $h_{1,2,3}$ are given by $$|h(x, y, 0)|^2 = \sum_{n=1}^{3} \left| \frac{1}{\sqrt{2}} \exp\left\{ \frac{i\pi}{2\lambda\Delta}[(x-x_n)^2 + (y-y_n)^2] + \frac{i\theta_n}{2}\right\} + \frac{1}{\sqrt{2}} \exp\left\{ \frac{-i\pi}{2\lambda\Delta}[(x-x_n)^2 + (y-y_n)^2] - \frac{i\theta_n}{2}\right\}\right|^2 p_o(x-x_n, y-y_n), \tag{3}$$

Therefore, the desired light transforming function of each partial function $H_n(u,v)$ of the optical assembly 110 is the Fourier transform of $h_n(x,y,0)$ in equation 2 above. Thus, $H_n(u,v)$, corresponding to embodiments with the spatial multiplexing of partial mask patterns as shown in Equation 2 and FIGS. 8A-8C, 9A and 9B.

In alternative time multiplexing embodiments, such as those shown in FIGS. 14 and 16, $H_n(u,v)$ may be defined as follows:

$$H_n(u, v) = FT\left\{\left|\frac{1}{2}\exp\left[\frac{i\pi}{\lambda\Delta}(x^2 + y^2) + \frac{i\theta_n}{2}\right] + \frac{1}{2}\exp\left[\frac{i\pi}{\lambda\Delta}(x^2 + y^2) - \frac{i\theta_n}{2}\right]\right| \tag{4}$$

$$\exp[i\varphi_n(x, y)]p_o(x, y)\right\},$$

$$n = 1, 2, 3$$

where FT represents a Fourier transform operation.

Further, the overall transforming function of the mask $H(u,v)$ is defined as follows:

$$H(u, v) = \sum_{n=1}^{3} H_n(u, v) \tag{5}$$

where u and v are coordinates in the plane of the optical assembly 110 corresponding to the x and y coordinates in the image capture plane (i.e., the u axis is parallel to the x axis and the v axis is parallel to the y axis).

When the transform regions of a mask include a color filtering capability configured to filter out or to pass light only centered at particular frequencies, as described above with respect to FIG. 5. The masks do not have to change when illuminated by various colors. The response of a mask transparency changes according to the wavelength of the light, for example as shown in Equation 27 below.

FIG. 6 shows an example of a binary Fresnel Zone Pattern 600, in which each of zone includes only one of two transmissivity states: substantially transparent, and substantially opaque, with respect to the light being transmitted. In this example, the FZP 600 is printed on a glass substrate 602 that transmits more than 90% of light within the visual light spectrum using an ink that reflects or absorbs more than 90% of light within the relevant light spectrum.

The invention is not limited to binary FZPs having alternating zones of more than 90% transmission and more than 90% absorption/reflection, but also includes FZPs having other levels of transmission, and absorption/reflection, as known in the field of FZPs. Further, the invention is not limited to FZPs having zones having a consistent transmissivity throughout each zone (i.e., zones that are entirely substantially transparent or entirely substantially opaque), but also includes FZPs having zones with varying transmission levels within each zone. In addition, the invention is not limited only to patterns of complete circular rings, but also includes patterns of partial rings, such as an off-axis FZP. Moreover, the invention also includes replacing the FZP with arbitrary real valued functions which should satisfy certain conditions to be described below.

Figure 7C:
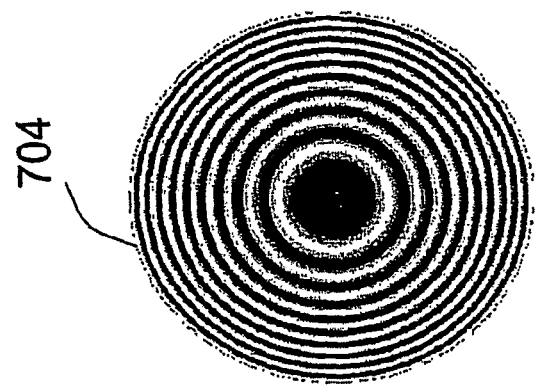
FIG. 7C is an example of another sinusoidal FZP.
Figure 7B:
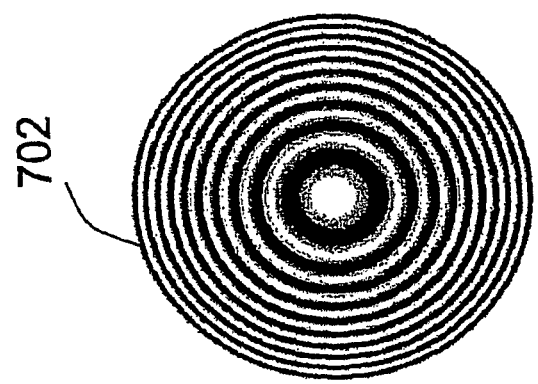
FIG. 7B is an example of another sinusoidal FZP.
Figure 7A:
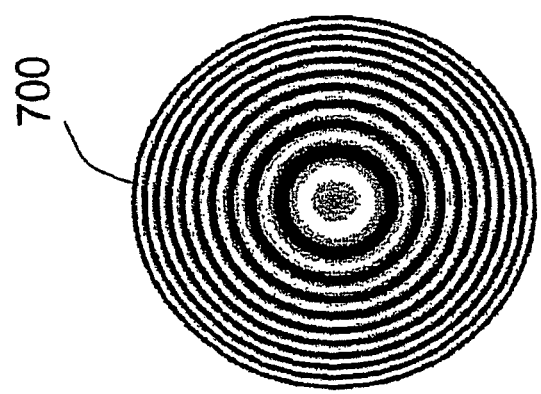
FIG. 7A is an example of a sinusoidal FZP.

FIGS. 7A-7C show examples of sinusoidal FZPs 700, 702 and 704. In sinusoidal FZPs, transmissivity varies sinusoidally between points of maximum transmissivity in substantially transmissive zones and points of minimum transmissivity in less transmissive zones, along a straight line radiating from the center of the FZP. Further, the FZPs 700, 702 and 704 each have a different phase.

Figure 8C:
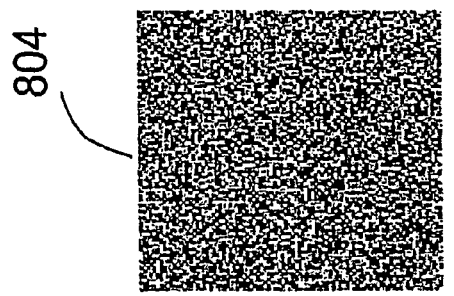
FIG. 8C is another example of a phase distribution of a Fourier Transformed FZP pattern with random phase distribution.
Figure 8B:
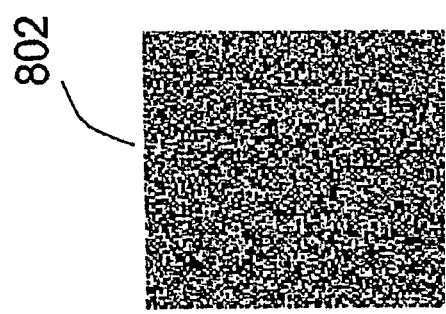
FIG. 8B is another example of a phase distribution of a Fourier Transformed FZP pattern with random phase distribution.
Figure 8A:
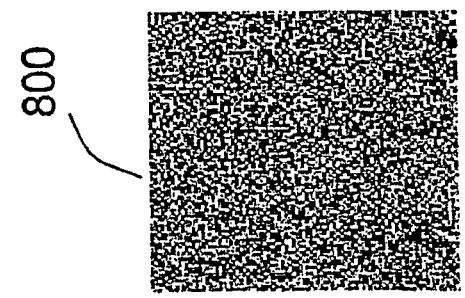
FIG. 8A is an example of a phase distribution of a Fourier Transformed FZP pattern with random phase distribution.

FIGS. 8A-8C show examples of phase functions of Fourier Transformed FZP patterns with random phase (FT-FZP) 800, 802 and 804 that are Fourier transforms of FZPs with random phase functions 700, 702 and 704, respectively. Note that the FT-FZP patterns have random-like pattern. The Fourier transforms of Fresnel zone patterns may be used to produce the mask functions according to Equation 4 above.

Further, H(u,v) of Equation 4 may be obtained by Fourier transform of h(x,y,0) from Equation 2.

Figure 9B:
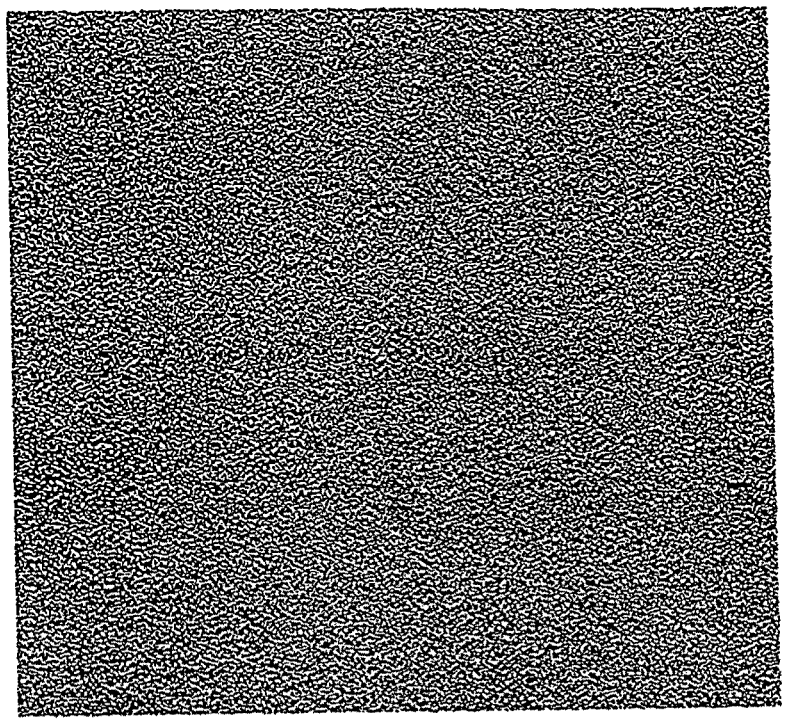
FIG. 9B is the phase portion of a complex transmission function that is a Fourier Transform of a linear combination of three FZP functions each having random phase distributions.
Figure 9A:
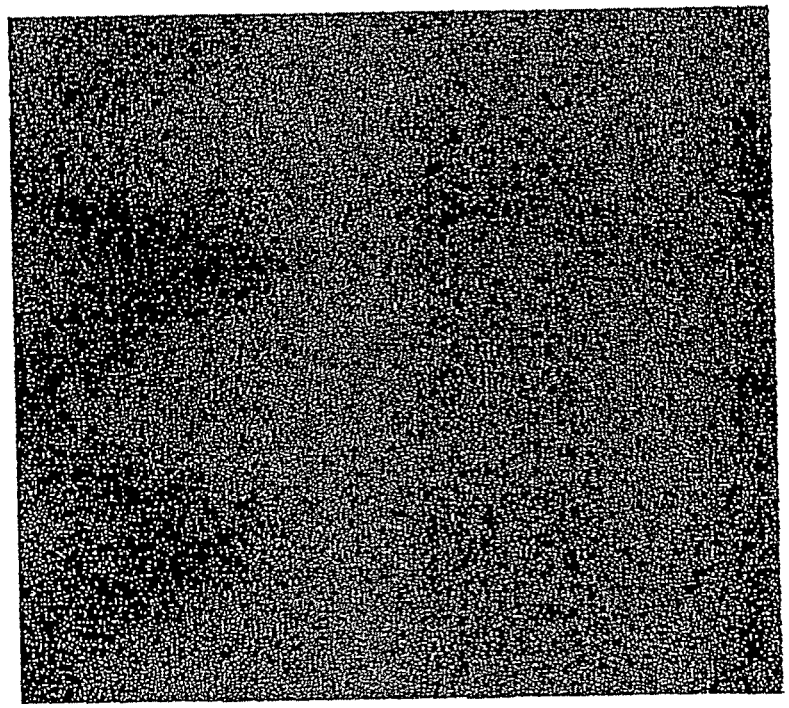
FIG. 9A is the amplitude portion of a complex transmission function that is a Fourier Transform of a linear combination of three FZP functions each having random phase distributions.

FIG. 9A is the amplitude portion of a complex transmission function according to Equation 5, which is a linear combination of three mask functions each according to Equation 4, and corresponding to the Fourier transform of the three FZPs in FIG. 9C.

FIG. 9B is the phase portion of the complex transmission function according to Equation 5, which is a linear combination of mask functions according to Equation 4, and corresponding to the Fourier transform of the three FZPs with random phase functions in FIG. 9C.

The complex transmission function of Equation 5 and examples illustrated in FIGS. 9A and 9B may be implemented using a single DOE or SLM or combinations of DOEs and/or SLMs, as described above.

Note that the linear combination of FT-FZPs is an amplitude and phase pattern (e.g., as shown in FIG. 9A-B). The combination of 3 FZPs together is not symmetric in the sense that h(x,y,0)≠h(−x, −y,0). Further, it is well known that a Fourier transform of non-symmetric functions can not be purely real.

FIG. 9C is an example of the pattern that is generated on the CCD when a point object is present at the input, as described above during the process to produce mask patterns shown in FIGS. 9A and 9B.

Figure 10A:
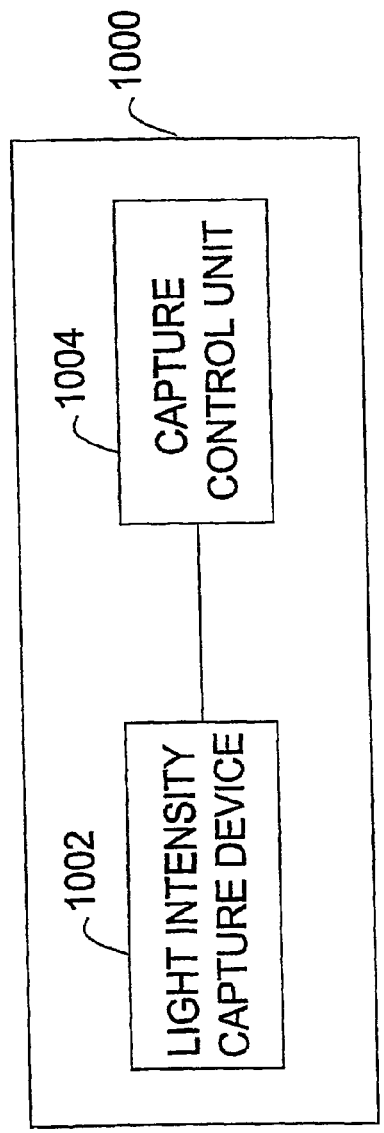
FIG. 10A is a block diagram of an embodiment of an image capture assembly.

FIG. 10A is a block diagram of an image capture assembly 1000 that includes a light intensity capture device 1002 and a capture control unit 1004. The light intensity capture device 1002 of this embodiment is a conventional light capturing device, such as a charge coupled device (CCD) as used in digital cameras, and is configured to capture a two-dimensional array of light intensity information (i.e., image of the received light) under the control of the capture control unit 1004. The invention is not limited only to CCDs but may also include other devices that capture light intensity, such as a photographic film or a transparent film, an X-ray detector, other electromagnetic radiation detectors, a CMOS device, a diode array, or a photo-detector, etc. . . . .

The capture control unit 1004 controls the light capturing functions of the light intensity capture device 1002 and is configured to retrieve electronic image data information from the light intensity capture device 1002. For example, in the present embodiment, the light intensity capture device includes a CCD connected to the capture control unit 1004, which is configured, according to conventional means, to retrieve electronic image data from the CCD image array. Alternatively, for example, if the light intensity capture device included a photographic film, the image capture control unit could include a conventional image scanning function configured to scan the captured image from the photographic film, and thereby retrieve the electronic image data. The invention also includes other conventional methods of capturing electronic image data, known to those of skill in this field.

The capture control unit 1004 controls the functions of the CCD 1002, and may also include and provide control for conventional photographic mechanical assemblies such as a shutter and/or a controllable aperture (not shown) to control aspects of capturing the image on the CCD 1002. Alternatively, one of skill in the image capture field will understand that such mechanical assemblies controlled by the capture control unit 1004 may be arranged in any convenient location along the light path between the object and the image capture assembly, or between the light source and the image capture assembly.

According to the present embodiment, light from a point source is spread by the pattern in the mask 304 which includes PSFs $h_n$ (Equation 2) having disk functions $p_1(x,y)$, $p_2(x,y)$ and $p_3(x,y)$ centered at points $(x_1,y_1)$, $(x_2,y_2)$ and $(x_3,y_3)$, respectively, in the image capture space. Thus, an image capture device may be configured to include three distinct regions within a single light intensity capture device to receive three distinct partial images produced by mask 304, such as the light intensity capture device 1002 in FIG. 10A. Further, the image capture device may include three separate light intensity capture devices to receive the three distinct partial images produced by mask 304, such as light intensity capture devices 1006, 1008 and 1010 in the embodiment of image capture assembly 1012 shown in FIG. 10B.

Figure 11A:
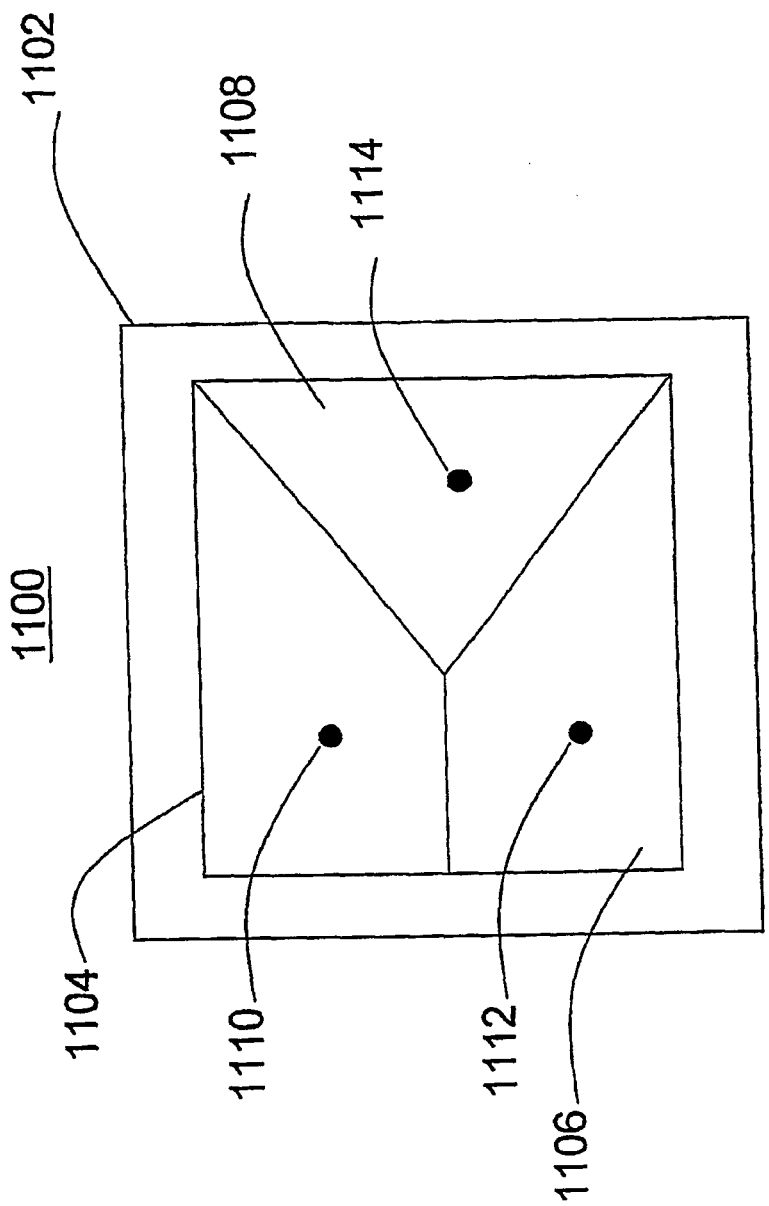
FIG. 11A is a view of an embodiment of a light intensity capture device that includes a charge coupled device having three distinct regions.

FIG. 11A is a view of an example of a light intensity capture device 1100 that includes a charge coupled device 1102 having three distinct regions 1104, 1106 and 1108. A central location in each region 1110, 1112 and 1114, respectively, corresponds to a center of each of the three partial images produced by the optical assembly 110. In particular, the coordinates of the points 1110, 1112 and 1114 correspond to $(x_1,y_1)$, $(x_2,y_2)$ and $(x_3,y_3)$, respectively, from Equation 3.

Figure 11B:
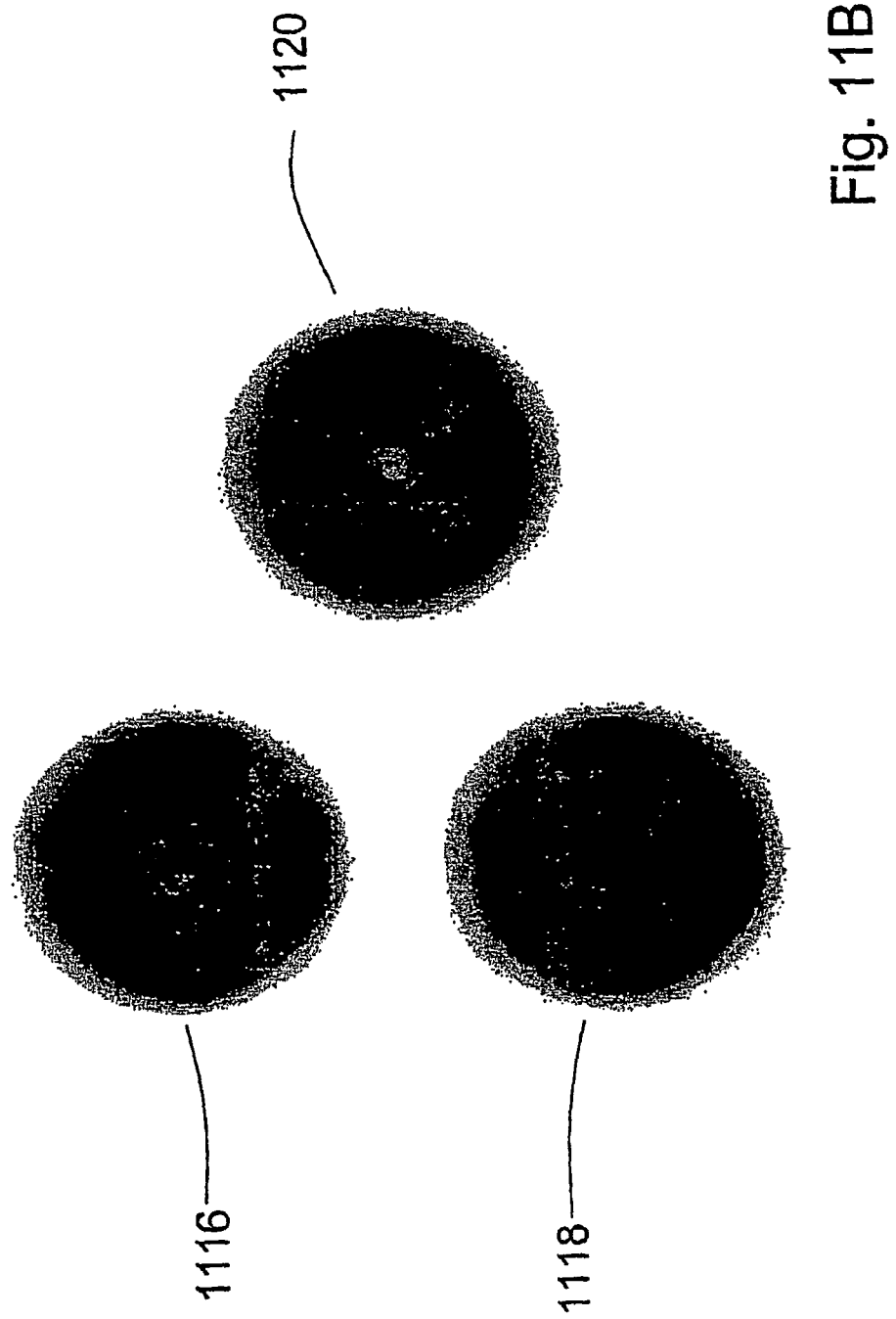
FIG. 11B is an example of a two-dimensional intensity image including three partial holograms.

FIG. 11B is an example of a two-dimensional intensity image according to Equation 1A captured by image capture assembly 120, including three partial images 1116, 1118 and 1120 produced by optical assembly 110. Such a two-dimensional intensity image is converted into a three-dimensional image of the object by the image capture assembly 120, as described below.

Figure 12C:
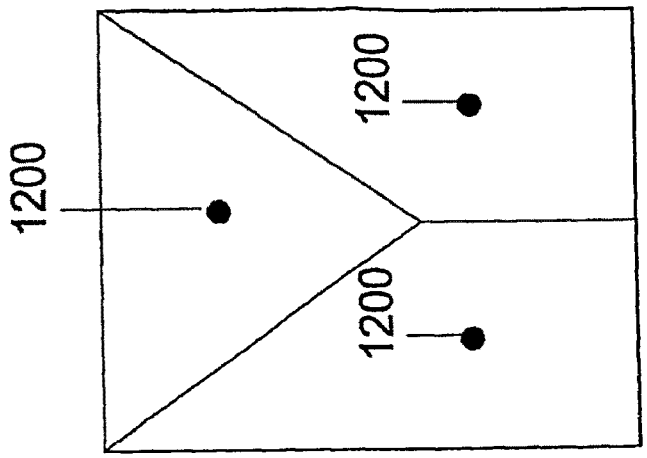
FIG. 12C is another example of an arrangement of distinct regions in an embodiment of a light capturing device.
Figure 12B:
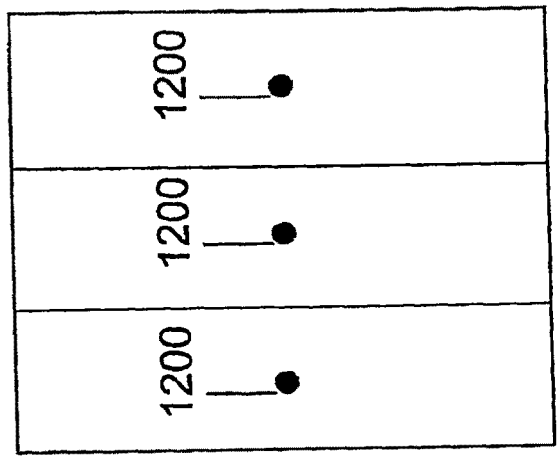
FIG. 12B is another example of an arrangement of distinct regions in an embodiment of a light capturing device.
Figure 12A:
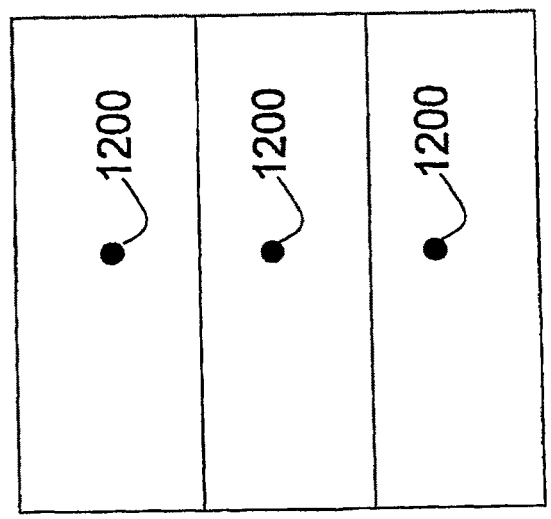
FIG. 12A is an example of an arrangement of distinct regions in an embodiment of a light capturing device.

FIGS. 12A-12C show other examples of ways in which the distinct regions of a light intensity capturing device may be arranged, where each distinct region includes a center 1200. One of skill in the art will understand that the light intensity capturing device may be divided into three or more zones in any convenient manner. For example, if the light intensity capturing device includes a randomly addressable CCD, the boundaries of the zones may be arranged along convenient address regions. Alternatively, if the light intensity capturing device includes a photographic film, the boundaries of the zones may be arranged according to the geometries that are convenient for the dimensions and aspect ratio of the film.

According to Equation 1A above, an image capture assembly 120 receives and captures light having a light intensity distribution given by o(x,y). To extract an image of a cross-section of the object from the captured image, the image capture assembly operates on the captured image (i.e., intensity function o(x,y)) according to Equation 1A. Thus, the image of a cross-section of the object s(x',y',0') is given by the following equation:

$$s(x', y', 0) = O_F(x, y) * \exp\left[\frac{-i\pi}{\lambda\Delta}(x^2 + y^2)\right]. \quad (6)$$

where $O_F(x,y)$ is a linear combination of the intensity distributions in the partial images as follows:

$$O_F(x, y) = o_1(x, y)[\exp(-i\theta_3) - \exp(-i\theta_2)] + \quad (7)$$
$$o_2(x, y)[\exp(-i\theta_1) - \exp(-i\theta_3)] + o_3(x, y)[\exp(-i\theta_2) - \exp(-i\theta_1)].$$

The extraction of the geometric information may be performed using methods from the field of digital holography, for example as described in I. Yamaguchi, and T. Zhang, "Phase-shifting digital holography," Opt. Lett. 22, 1268-1269 (1997), incorporated herein by reference.

In addition, the capture control unit 1004 may include functions for combining the electronic data for each of the three partial images according to Equation 7, for extracting the object geometric information according to Equation 6 and for providing the resulting object geometric information in a desired format. Alternatively, those functions may be performed in a general purpose computer configured to receive the image data from the image capture assembly.

The object geometric information may be extracted as surface data, which may be suitable for use in applications such as physical modeling (e.g., to create a computer model of the object) or three-dimensional fabrication (e.g., to create a physical three-dimensional copy of the object) applications. In addition, the object geometric information may be displayed graphically, for example using two-dimensional representations of three-dimensional objects (e.g., a two-dimensional projection such as isometric projection, or a two-dimensional representation of a three-dimensional object that may be animated to rotate the object around one or more axes to better illustrate the three-dimensional object), or using direct three-dimensional representation of three-dimensional objects (e.g., holographic display or projection).

FIG. 13 is a block diagram of an example of a capture control unit 1300 that includes an image data processor 1302 that combines the electronic image data according to Equation 6 to produce the object geometric information, and an object data output device 1304 to output the object geometric information. The image data processor 1302 may be implemented using a conventional processor and conventional data processing software. The object data output device 1304 may include any of a number of conventional devices configured to utilize three-dimensional object geometric data such as a visual holographic display, a virtual reality environment display, a three-dimensional object fabrication device (e.g., laser sintering fabrication device, a digitally controlled lathe, etc. . . . ), a simulation model, a two-dimensional animation of a moving three-dimensional object, etc. . . . The invention also includes a capture control unit (not shown) that is configured to include an interface to an external control device, such as a computer, which may replace image data processor 1302 and object data output 1304, to flexibly perform the image data processing functions in a separate device.

Figure 10B:
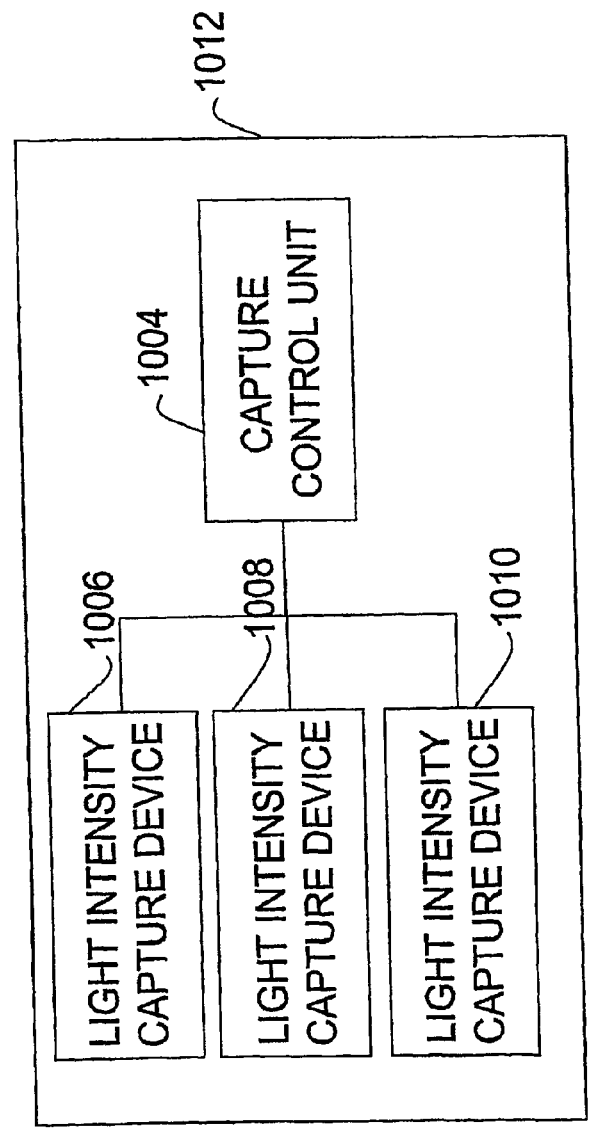
FIG. 10B is a block diagram of another embodiment of an image capture assembly.

In the embodiments described above, three different mask patterns having three different transmission functions (e.g., functions $H_1$, $H_2$, and $H_3$ of equation (4)) are combined in a single mask, three partial images resulting from the mask patterns are simultaneously captured, and the three partial images are combined to obtain geometric object information. However, if the image capture assembly of FIG. 10A is used, the resulting resolution of the captured image may be reduced if the pixel array size is not increased three times so that each of the three images are the same resolution so that the three partial images may be captured on a single light intensity capture device. Alternatively, if the image capture assembly of FIG. 10B is used, or if a single sensor with three times the area is used, the resulting cost of the capture apparatus is increased by the cost of two additional light intensity capture devices or the larger format sensor.

Another embodiment that varies a mask over time may not cause the possible resolution reduction or cost increase of the preceding embodiment. In particular, in this embodiment, a mask may be varied over time, resulting in three different partial images that vary over time. The three different partial images may be captured by an image capture assembly configured to capture images over time, and the three partial images may be combined to extract the geometric information of the object.

Figure 14:
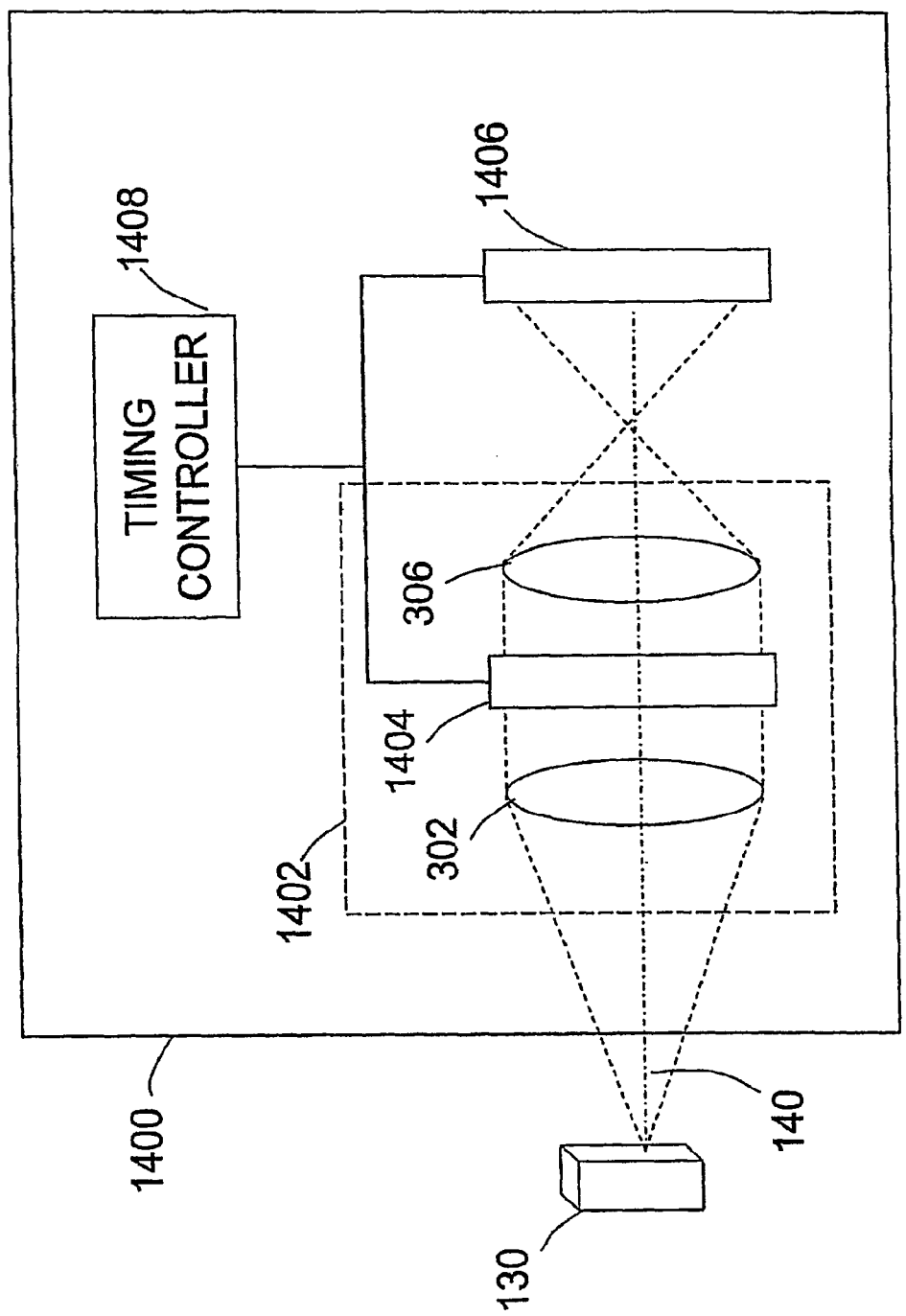
FIG. 14 is a block diagram of an embodiment of an optical apparatus that varies the mask over time.

FIG. 14 is a block diagram of an embodiment of an optical apparatus 1400 that varies the mask over time. Optical apparatus 1400 is similar to the embodiment of the optical apparatus 400 in FIG. 4, however, the optical apparatus 1400 includes a controllable incoherent correlator 1402 and a controllable image capture assembly 1406 that are controlled by a timing controller 1408, and the optical apparatus 1400 is configured to capture three-dimensional or geometric information of object 130 using at least three different images captured at different times.

The controllable incoherent correlator 1402 is similar to the incoherent correlator 300 of the embodiment shown in FIG. 4. However, the controllable incoherent correlator 1402 includes a controllable mask 1404 having a mask that may be controlled by the timing controller, to controllably transform the amplitude and phase of light received from the object. One or more spatial light modulators (SLMs), as described in FIG. 5, may be used in such a controllable incoherent correlator.

Further, the controllable image capture assembly 1406 is similar to the image capture assembly 120 in the embodiment shown in FIG. 4. However, the controllable image capture assembly 1406 is further configured to be controlled to capture and retrieve electronic image data by the timing controller 1408.

Figure 15:
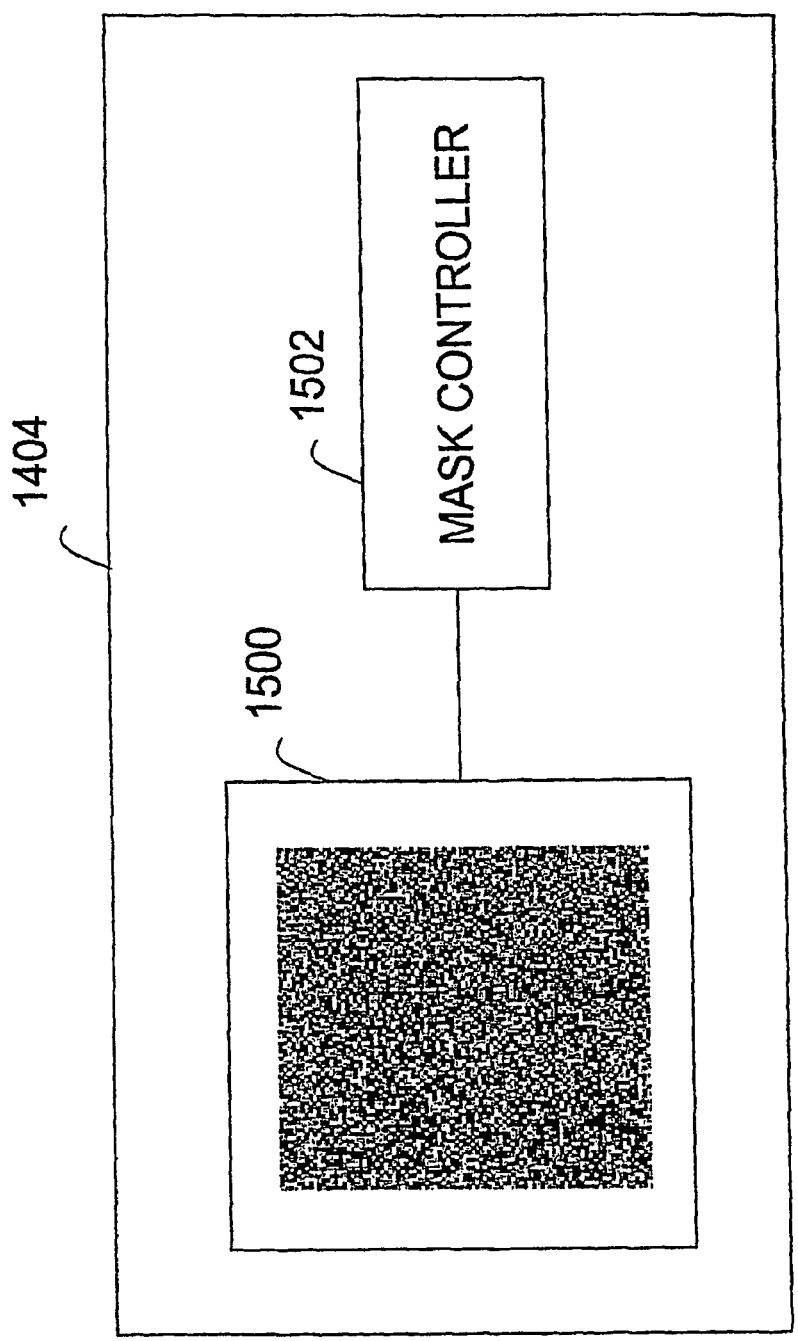
FIG. 15 is a block diagram of a controllable mask that includes a spatial light modulator under the control of a mask controller.

FIG. 15 is a block diagram of controllable mask 1404 that includes a spatial light modulator 1500 under the control of a mask controller 1502. The mask controller 1502 controls the mask controller 1502 to transform light according to complex transform functions $H_1$, $H_2$ and $H_3$ of Equation 4, at times $t_1$, $t_2$ and $t_3$, as synchronized by the timing controller

1408. In an alternative embodiment, the mask controller 1502 may be eliminated and the spatial light modulator 1500 may be controlled directly by the timing controller 1408, or by another external device not shown (e.g., an external computer operated controller). Image capture assembly 1406, also under the control of timing controller 1408 captures three partial images at times $t_1$, $t_2$ and $t_3$ and combines the partial images to obtain geometric information for object 130, as described previously.

Figure 16:
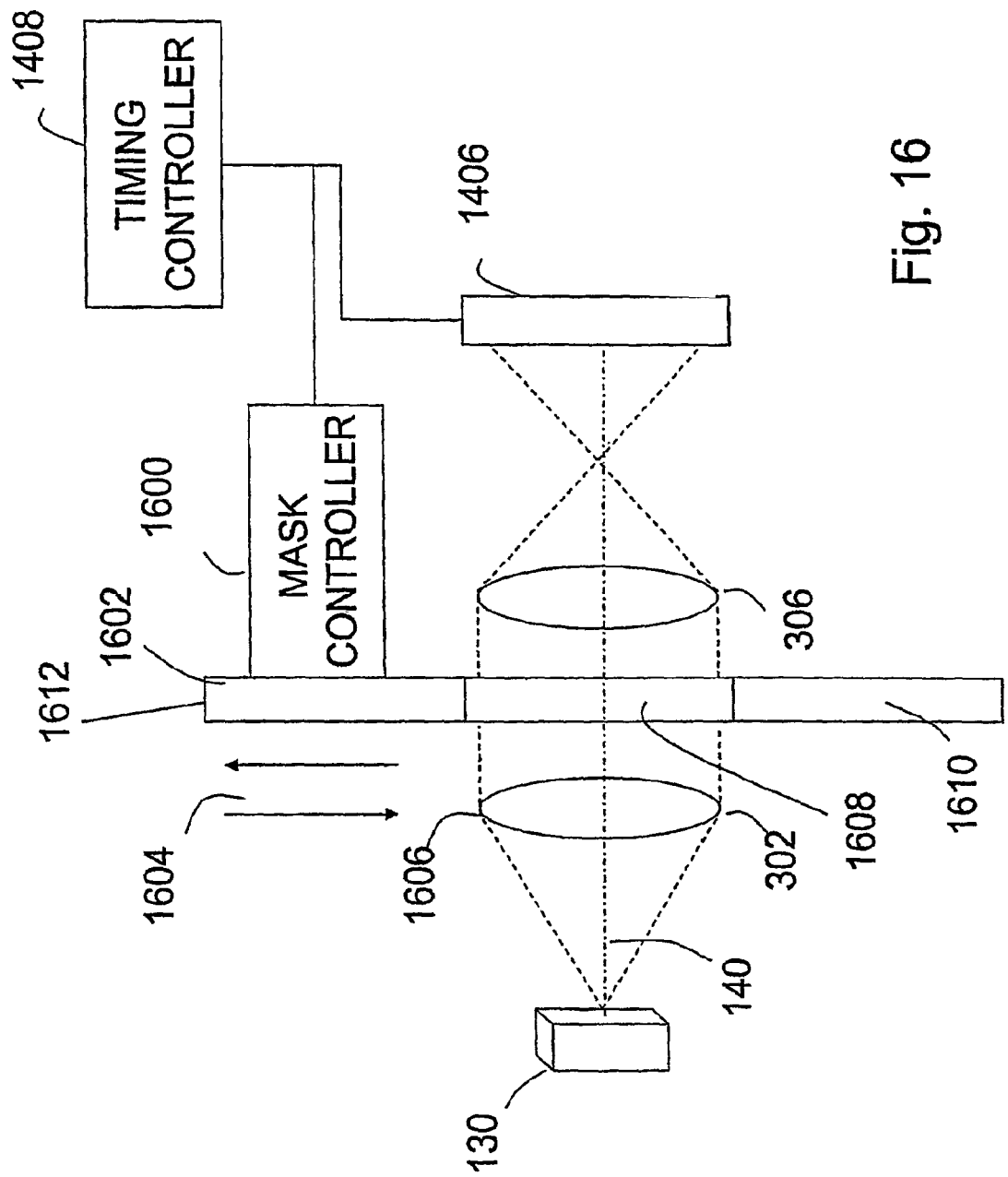
FIG. 16 is a block diagram of another embodiment of an optical apparatus in which the mask is varied over time.

FIG. 16 is a block diagram of another embodiment of an optical apparatus in which the mask is varied over time. In this embodiment, a mask controller 1600 controls a mechanical position of a multimask 1612. The multimask 1612 includes three masks 1602, 1608 and 1610 corresponding to the masks $H_1$, $H_2$ and $H_3$ according to Equation 4. The mask controller moves the multimask 1612 in directions 1604 to place a corresponding mask between optical transforming assemblies 302 and 306 at times $t_1$, $t_2$, and $t_3$, under the control of timing controller 1408. Image capture assembly 1406, also under the control of timing controller 1408 captures three partial images at times $t_1$, $t_2$ and $t_3$ and combines the partial images to obtain geometric object information for object 130, as described previously. The multimask 1612 may include masks in a linear arrangement as shown in FIG. 16, or may include masks arranged in a radial arrangement, or any other suitable arrangement.

The three partial images may also be produced and captured simultaneously using an arrangement including three different optical assemblies having different masks and arranged to each receive a portion of the light received from the object.

Figure 17:
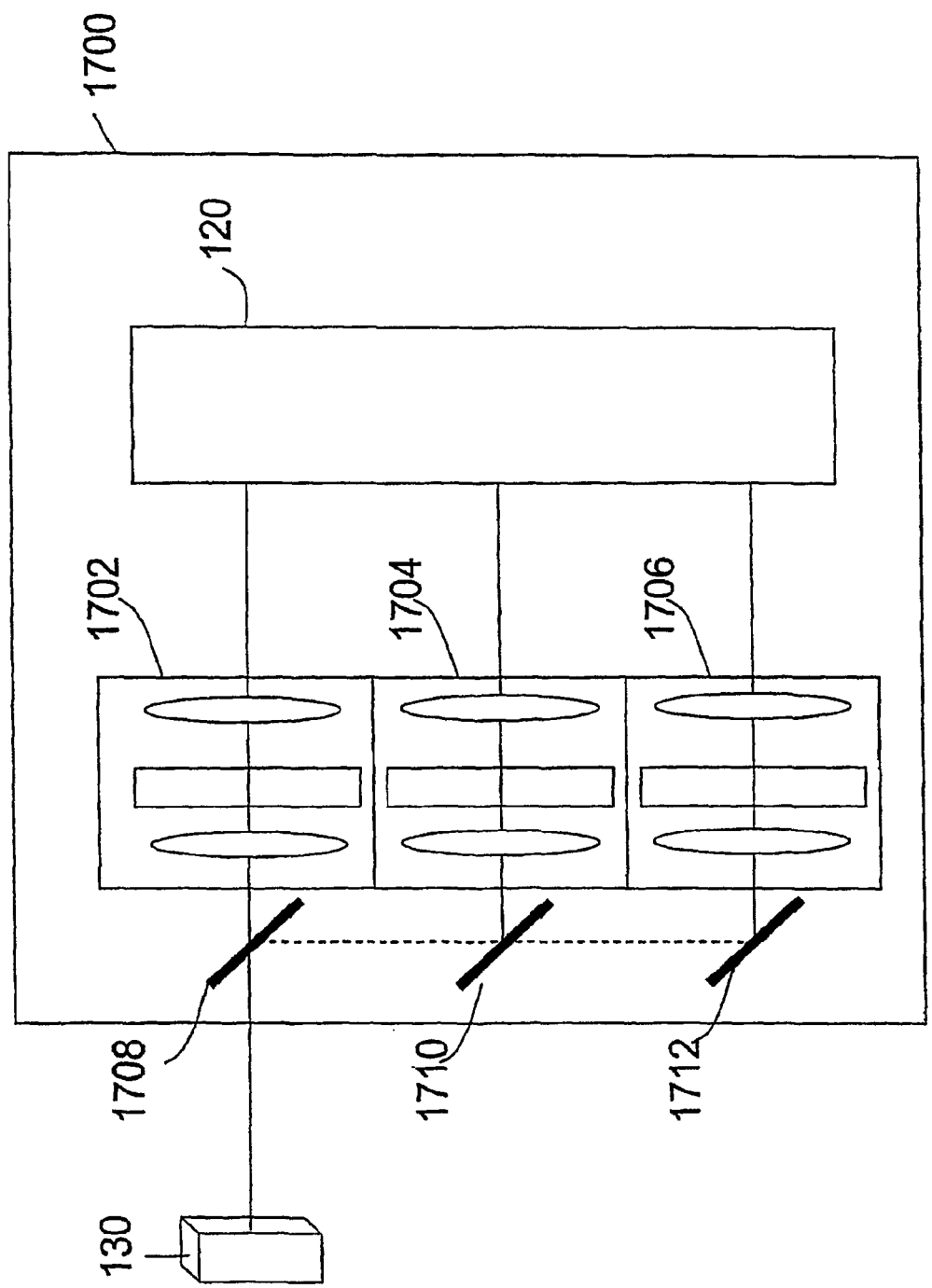
FIG. 17 is a block diagram of another embodiment of an optical apparatus.

FIG. 17 is a block diagram of an embodiment of an optical apparatus 1700 having optical assemblies 1702, 1704 and 1706 that are configured to each receive a portion of the received light from the object by an arrangement of partially transmissive and reflective mirrors 1708, 1710 and 1712 (e.g., "partially-silvered" mirrors). An image capture assembly 120, such as the embodiments shown in FIGS. 10A and 10B, captures and processes the received partial images as described above.

Although the embodiments are described using only transmissive optical elements (e.g., refractive lenses and transmissive masks) one of skill in the art will understand that the invention also includes alternative embodiments in which one or more of the optical elements may be replace with a corresponding reflective optical element, as desired.

Figure 18:
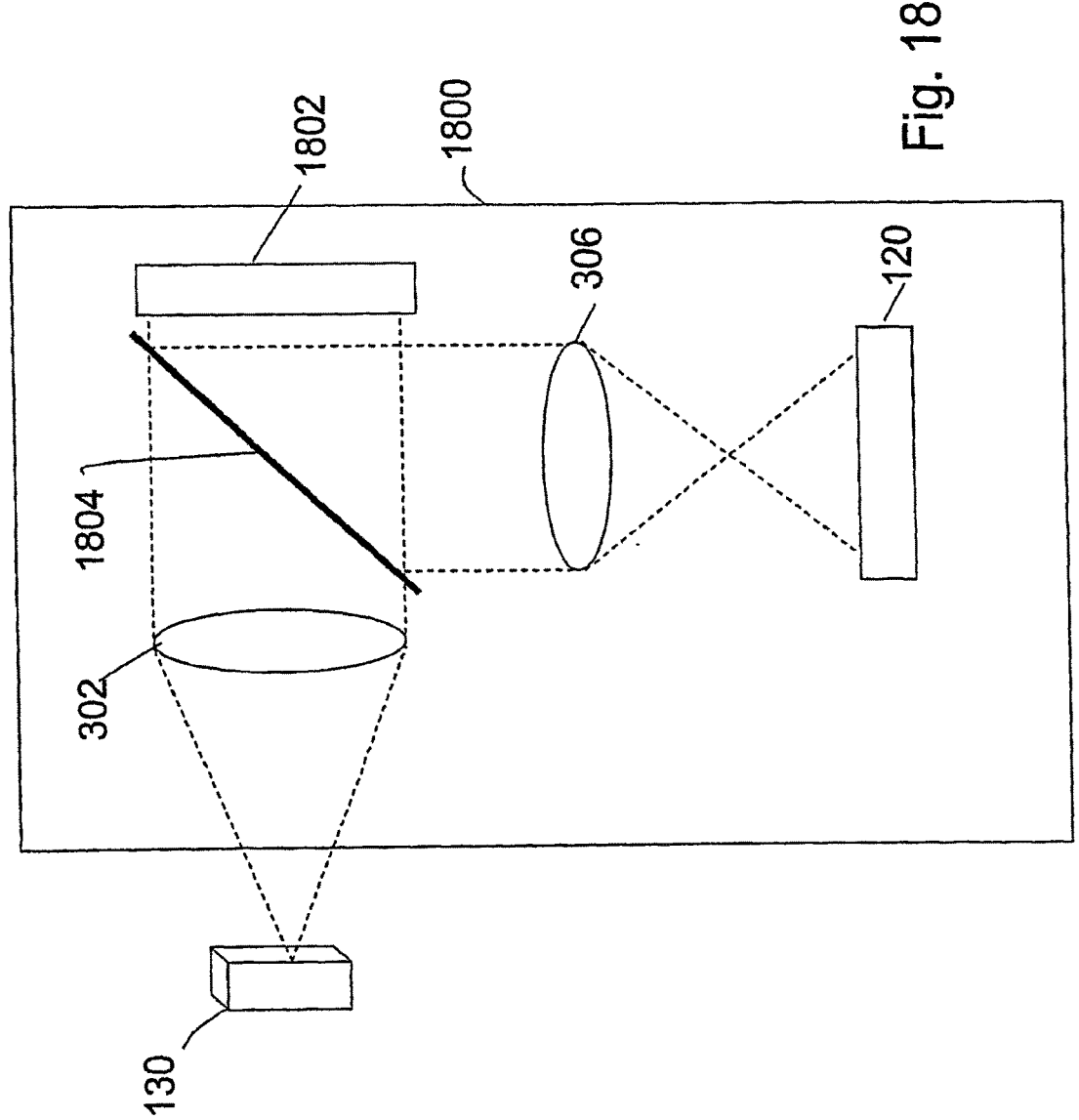
FIG. 18 is a block diagram of another embodiment of an optical apparatus.

FIG. 18 is an embodiment of an optical apparatus 1800 that is similar to optical apparatus 400 shown in FIG. 4. However, optical apparatus 1800 includes a reflective mask 1802 that is configured to reflect unmasked light, instead of transmitting the unmasked light as in mask 304. A beam splitter 1804 redirects the light reflected by mask 1802 to the second transforming optical assembly 306.

Other arrangements of mirrors or beam splitters to conveniently direct light are also included in the present invention.

In the optical apparatus embodiments described above, when the electromagnetic radiation received from the object includes a wide bandwidth, it is possible to capture frequency information in the image capture assembly. Thus, it is possible for the image capture assembly to determine a corresponding electromagnetic radiation frequency or frequencies for each portion of the object. For example, when a white light is received at the optical assembly from the object, the image capture assembly may determine the color of each portion of the object from the image captured by the image capture assembly.

In addition, it may be possible to increase the resolution of the captured three-dimensional information by reducing the bandwidth of the received light. For example, the resolution of the captured three-dimensional information may be increased by limiting the bandwidth of the received light to those frequencies of light close to the color red. Such an increase in resolution may be obtained by filtering received or transmitted light in the optical assembly to have a reduced bandwidth using conventional filters, or by irradiating the object with a reduced bandwidth light source, using methods known by those of skill in the art.

However, images captured using a reduced light bandwidth may not include a sufficient level of information regarding the various colors of the received light, and therefore may not allow for the image capture assembly to determine colors of the object to a sufficiently high level of accuracy. Accordingly, other embodiments of the invention may include plural channels each configured to receive light and capture images within different portions of the electromagnetic spectrum, and them to combine the separately captured images to produce full spectrum three-dimensional information regarding the object.

Figure 19:
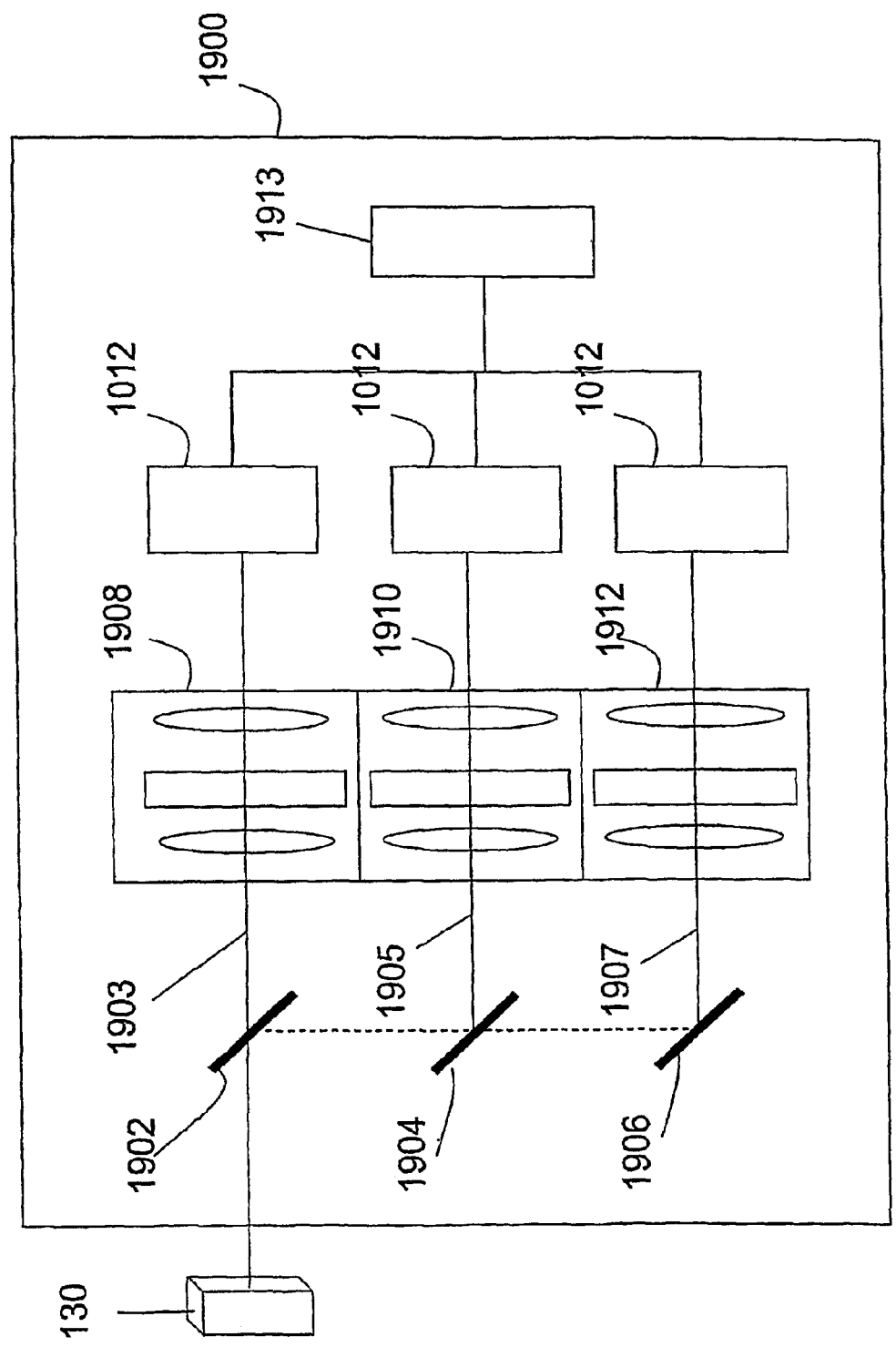
FIG. 19 is a block diagram of another embodiment of an optical apparatus.

FIG. 19 is a block diagram of optical apparatus 1900 that receives light from object 130. The received light is partitioned into three light portions 1903, 1905 and 1907 by light partitioning devices 1902, 1904 and 1906, respectively. The three light portions 1903, 1905 and 1907 each include a subset of the bandwidth of the received light. For example, light portion 1903 may include only light frequencies near the color red, light portion 1905 may include only light frequencies near the color green and light portion 1907 may include only light frequencies near the color blue. The light partitioning devices 1902, 1904 and 1906 may include any combination of dichroic mirrors, color filters, mirrors or other partially transmissive frequency filtering devices known to those of skill in the art.

The light portions 1903, 1905 and 1907 are received by optical assemblies 1908, 1910 and 1912, respectively, which each may be configured to transform the received light as described above. That is, each of the optical assemblies 1908, 1910 and 1912 may transform a light portion of the received light as described above (e.g., using three partial mask patterns or a time varying pattern), and transmit the transformed light to an image capture assembly 1012 that includes a separate light capture assembly for each of the three partial mask patterns, or to an image capture assembly 1000 (not shown) that includes a single light capture assembly configured to capture different images over time or different partial images within different regions of the assembly.

In addition, the optical apparatus 1900 includes an image combining apparatus 1913 configured to receive image data representing the images captured at image capture assemblies 1012 and combine the image data to produce combined broadband three-dimensional information regarding the object. For example, the optical apparatus 1900 may be able to capture full-color three-dimensional information with a higher resolution than the embodiments described above.

Although the embodiments of FIG. 19 include received light that is separated into three portions, other embodiments in which light is separated into other numbers of portions are also included.

An incoherent correlator may equivalently be implemented with alternate optical apparatuses other than the lens/mask/lens arrangements described above. For example, by applying the well-known thin lens approximation for lenses, the incoherent correlator may be implemented with a single optical transforming element and a single mask, with either the mask or the optical transforming element arranged to first receive light from the object. In addition, the optical assembly 110 may be implemented using a single diffractive optical element. The equations 1-5 above therefore also apply to embodiments having a single transforming optical assembly and a mask, and embodiments having an optical assembly implemented using only a single diffractive optical element.

Figure 20A:
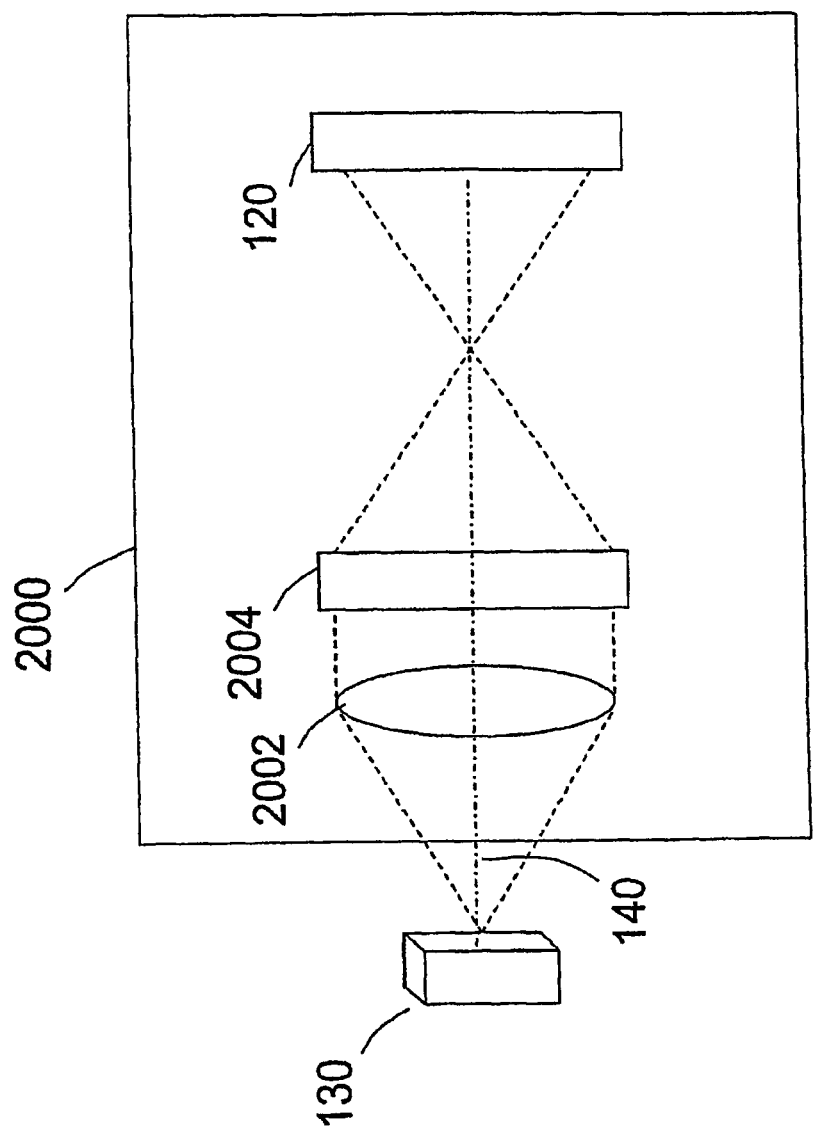
FIG. 20A is a block diagram of an example of an optical apparatus that does not require a second transforming optical element.

FIG. 20A is a block diagram of an example of an optical apparatus 2000 that is similar to the optical apparatus 400 shown in FIG. 4. However, the optical apparatus 2000 does not require a second transforming optical element. Instead light is received from the object 130 by optical transforming element 2002, which transforms the received light and transmits the transformed light. The transformed light is received by mask 2004 which selectively transmits a portion of the transformed light. Image capture assembly 120 receives and captures an image of the selectively transmitted light and obtains geometric information regarding object 130 from the captured image, as described above.

Figure 20B:
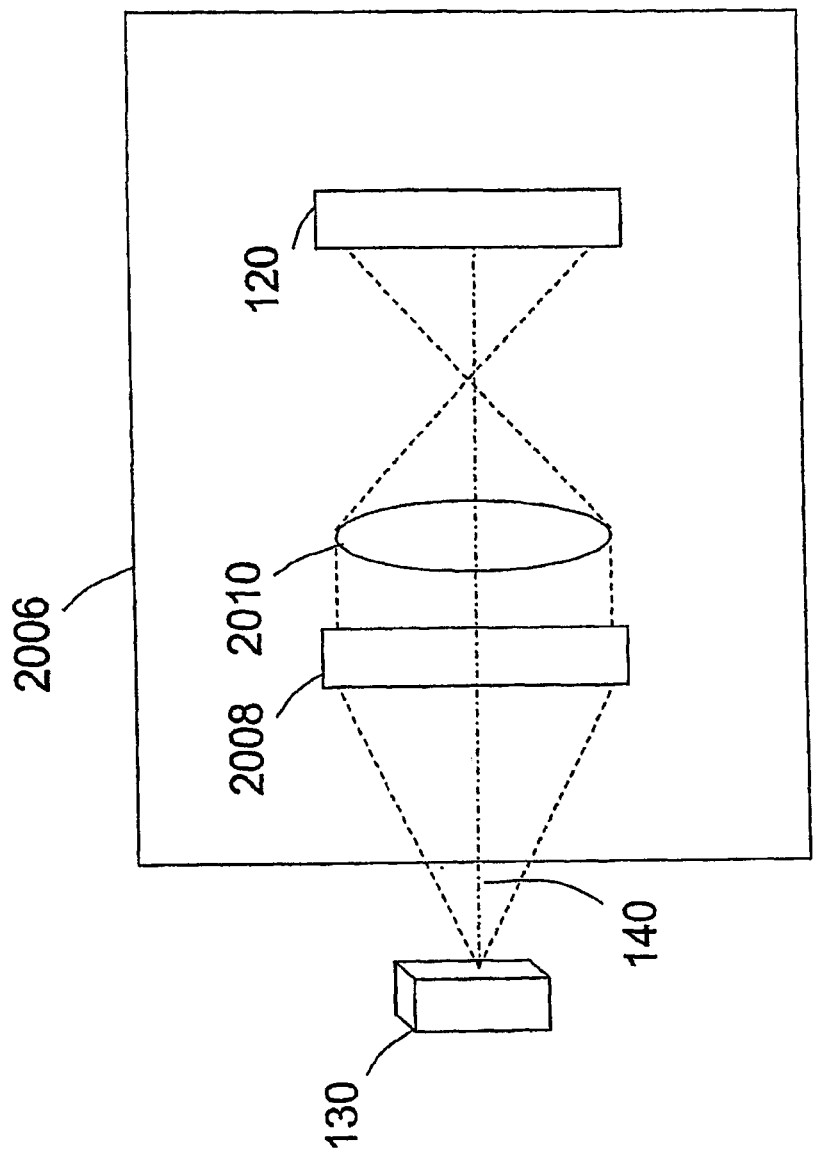
FIG. 20B is a block diagram of an example of an optical apparatus that does not require a first transforming optical element.

FIG. 20B shows an example of an optical apparatus 2006 that is similar to the optical apparatus 400 shown in FIG. 4. However, the optical apparatus 2006 does not require a first transforming optical element. Instead light is received from the object 130 by mask 2008 which selectively transmits a portion of the received light. The second optical transforming element 2010 receives the selectively transmitted light, transforms the received light and transmits the transformed light. Image capture assembly 120 receives and captures an image of the transformed light and obtains geometric information regarding object 130 from the captured image, as described above.

There may be a relatively high cost to manufacture optical assemblies having a conventional incoherent correlator structure. An alternative embodiment of the present invention the optical assembly may be implemented using a single diffractive optical element (DOE) in place of the incoherent correlator.

A single DOE may replace the incoherent correlator (e.g., incoherent correlator 300 including first and second transforming optical assemblies 302/306 and mask 304 in the embodiment shown in FIG. 4) described above. A DOE that is equivalent to the incoherent correlator is the product of the mask filter function and the transmission functions of the first and second transforming optical assemblies, $H_{DOE}$, defined as follows:

$$H_{DOE}(u, v) = \exp\left[\frac{-i2\pi}{\lambda f}(u^2 + v^2)\right] \int \int h(x, y, 0) \exp\left[\frac{i2\pi}{\lambda f}(xu + vy)\right] dx dy \quad (8)$$

where f is the focal length of the first and second transforming optical assemblies included in the DOE, h(x,y,0) is given above in Equation 2, and other parameters are as described with respect to Equation 4.

Further, the focal lengths of the lenses are not required to be the same. When the focal lengths are different, the $H_{DOE}$, is defined as follows:

$$H_{DOE}(u, v) = \exp\left[\frac{-i\pi(f_1 + f_2)}{\lambda f_1 f_2}(u^2 + v^2)\right] \int \int h(x, y, 0) \exp\left[\frac{i2\pi}{\lambda f_2}(xu + vy)\right] dx dy \quad (9)$$

Note that although Equations 8 and 9 do not include literal P function terms, $p_o(x,y)$ is part of h(x,y,0), and when the integral in Equations 8 and 9 are solved, the convolution with P(u,v) is obtained.

FIG. 20C is a block diagram of an example of an optical apparatus 2012 that is similar to the optical apparatus 400 shown in FIG. 4. However, the optical apparatus 2012 does not require first and second transforming optical elements. Instead light is received from the object 130 by mask 2014 which transmits light based on a complex transformation of the received light. Mask 2014 may be implemented using only a single diffractive optical element, as described above. Image capture assembly 120 receives and captures an image of the transformed light and obtains geometric information regarding object 130 from the captured image, as described above.

Figure 21:
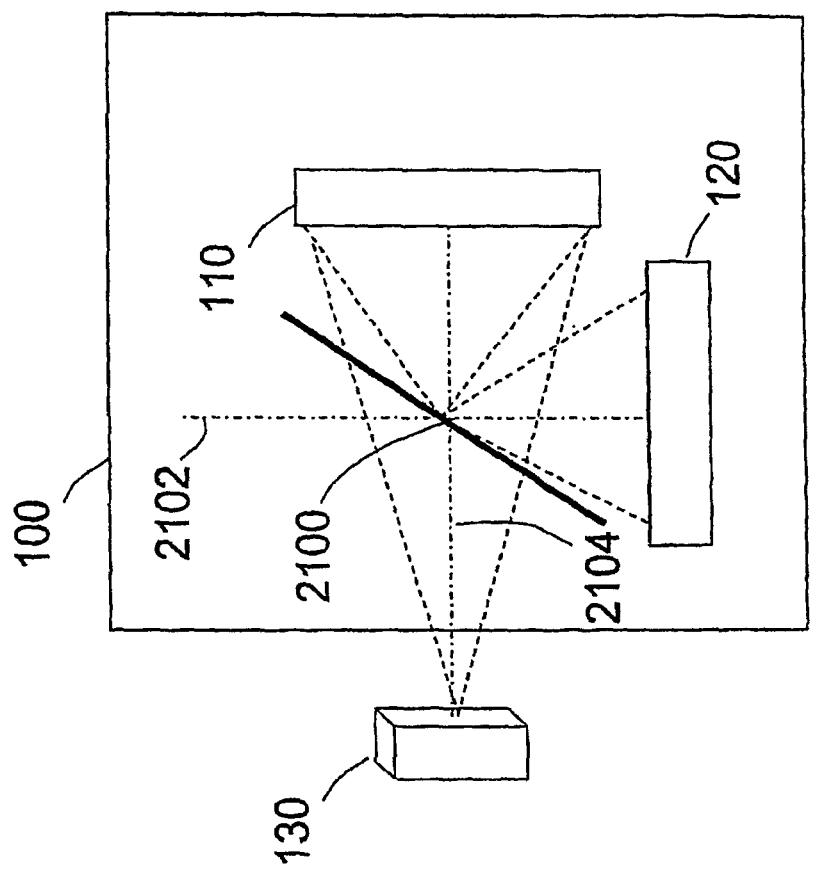
FIG. 21 is a block diagram of an embodiment of an optical apparatus including a reflective type diffractive optical element.

FIG. 21 is a block diagram of an embodiment of optical apparatus 100 in which the optical element 110 includes a reflective type diffractive optical element, for example, such as the diffractive optical elements shown in FIG. 5. In this embodiment, the optical apparatus 100 receives a light from object 130 along a receiving optical axis 2104. The optical apparatus 100 transforms and reflects the received light to produce a transmitted light transmitted back along optical axis 2102. The transmitted light is reflected by a beam splitter 2100 to an image capture assembly 120 located along a capturing optical axis 2102 of the optical apparatus. In the present embodiment, capturing optical axis 2102 is arranged at an angle of approximately 90 degrees from the receiving optical axis 2104. However, other angles between the receiving and capturing optical axes are also included in the invention.

With only two optical axes, the current embodiment may advantageously reduce a size of the optical assembly 100, while exhibiting less sensitivity to axial variations than in conventional holography systems.

An objective-side optical assembly, such as an objective lens, a zoom lens, a macro lens, a microscope, a telescope, a prism, a filter, a monochromatic filter, a dichroic filter, a complex objective lens, a wide-angle lens, a camera, a pin-hole, a light slit, a mirror, or any other optical assembly may be placed between the optical assembly and the object to collimate, focus, invert or otherwise modify the light from the object, prior to the light being received at the optical assembly. Such an arrangement may advantageously allow light from objects or portions of objects to be received, when it would not be possible or practical to receive that light without the inclusion of the objective-side optical assembly.

Further, an objective-side optical assembly may include refractive or diffractive optical elements configured to at least partially cancel any disadvantageous wavelength dispersal effects that may be caused by the optical apparatus 100, as described by Goodman, "Introduction to Fourier Optics," 3rd Ed., Roberts & Company Publishers, 2005, at p. 212, incorporated herein by reference.

Figure 22A:
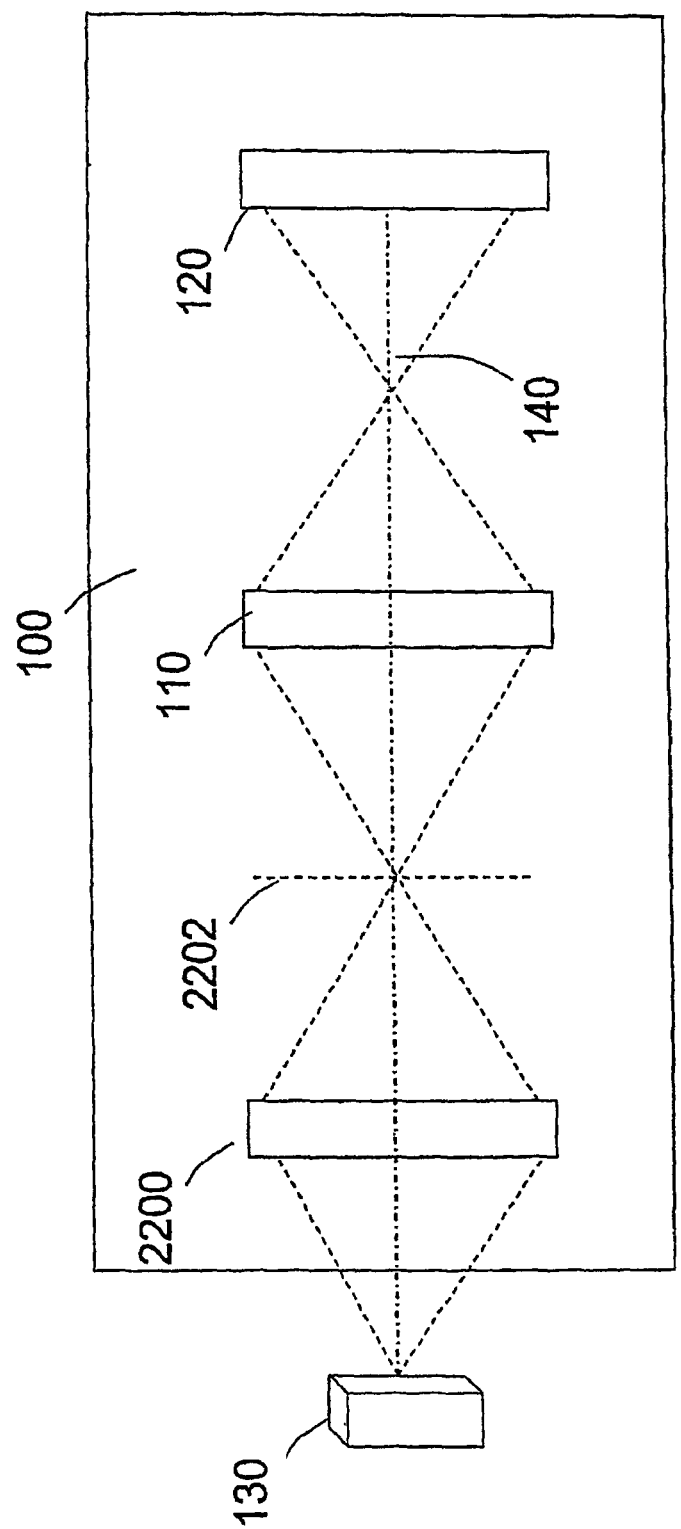
FIG. 22A is a block diagram of another embodiment of an optical apparatus.

FIG. 22A shows an alternative embodiment including the features of the embodiment in FIG. 1, as well as an objective-side optical assembly 2200 that receives light from the object and transmits a received light to the optical assembly 110. The objective-side optical assembly 2200 in the present embodiment includes a magnifying refracting objective lens that produces a magnified image of the object 130 centered on an image plane 2202. Thus, the present embodiment may capture more detailed geometric information regarding a magnified portion of the object.

The present invention may also operate in conjunction with an existing sensor-less camera, which is understood herein to be any camera from which the existing digital light sensor (e.g., CMOS device or CCD) or light sensitive capture medium (e.g., film and film transport mechanism)

has been removed, or moved away from the image plane of the camera to allow an apparatus according to the present invention to be used with the remaining optical and mechanical components of the camera. For example, film, film transport mechanisms and the rear cover of an existing 35 mm film camera may be removed and replaced with an optical assembly and image capture device according to the present invention, thereby making the existing camera capable of capturing three-dimensional information. Such an arrangement advantageously allows the present invention to conveniently take advantage of and operate with existing photographic lenses, shutter systems and aperture control systems of existing cameras.

Figure 22B:
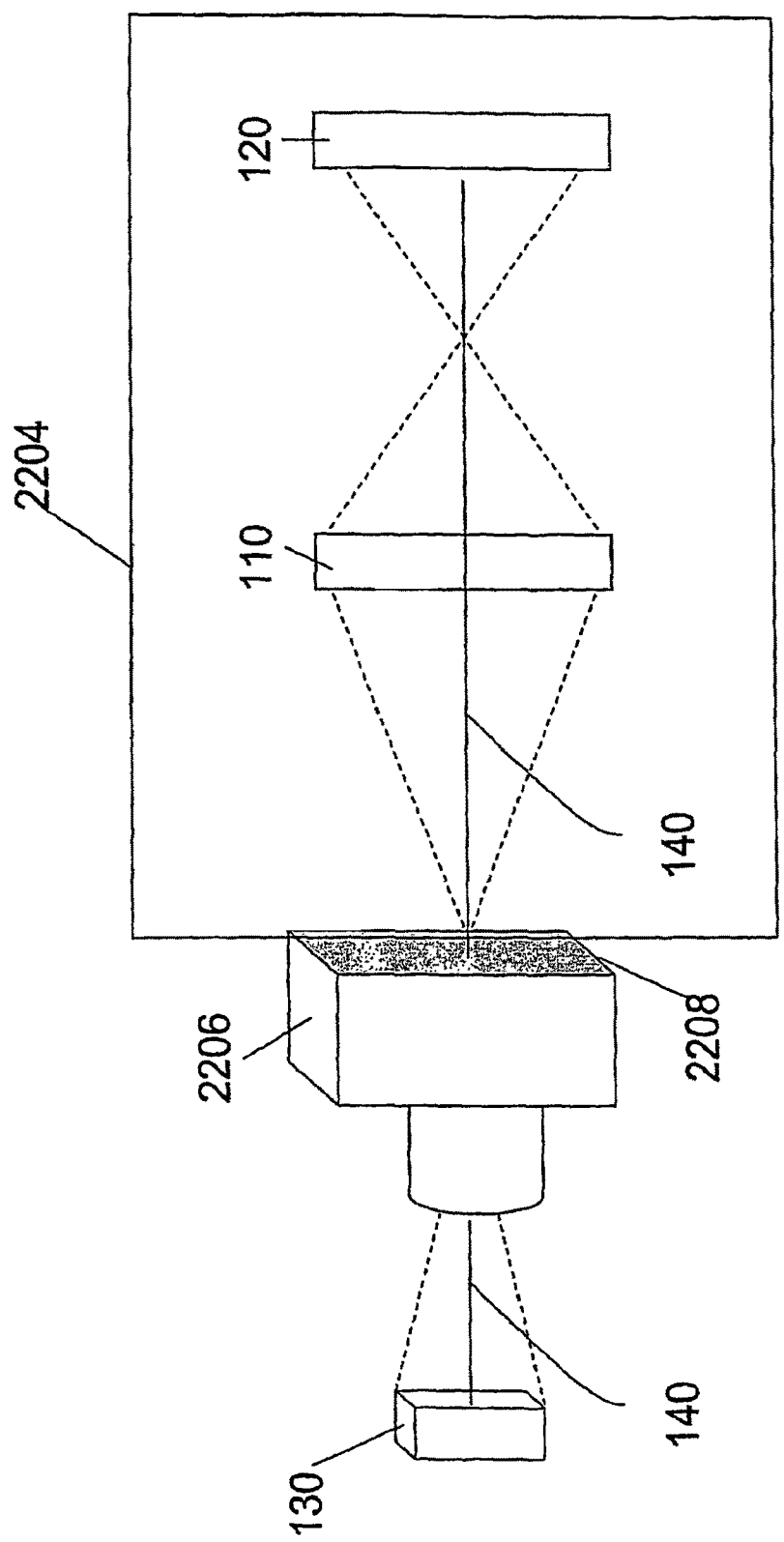
FIG. 22B is a block diagram of another embodiment of an optical apparatus.

FIG. 22B shows an example of an embodiment of an optical apparatus 2204 including features similar to the optical apparatus 100 shown in FIG. 1. In addition, the optical apparatus 2204 is configured to operate with an existing sensor-less camera 2206, which receives light from the object 130 along an optical axis 140, and manipulates the light using conventional camera features (e.g., lens, ground glass focusing screen, shutter and aperture of the existing camera) to produce an image of the object centered at image plane 2208. The optical apparatus 2204 includes a chassis having mechanical and electrical attachment features suitable for coupling the optical apparatus 2204 to a portion of the existing sensor-less camera 2206 near the image plane produced by the optics of the existing sensor-less camera 2206 (e.g., as a replaceable "3D back" of the camera). The optical assembly 110 receives light from the image of the object at the image plane 2208 and transmits a transformed light, which may be received, captured and processed to extract three-dimensional information of an object by the image capture assembly 120, as described above.

The present invention may also operate in conjunction with an existing camera. In particular, the optical assembly in the embodiment described herein may be used in conjunction with a conventional digital or film camera to illuminate the image plane of the conventional camera with a Fresnel hologram or partial Fresnel holograms of the observed object. The conventional camera may be used to capture an image of the hologram fringe patterns using the corresponding conventional means (e.g., light sensitive film or digital sensor), and image data corresponding to the fringe patterns may be converted into three-dimensional data of the object using a general purpose computer.

The invention is not limited to a single DOE that includes a transmission function based on a linear combination of three transmission functions each having a Fourier transforms of a FZP. On the other hand, the invention also includes receiving a portion of the light from the object at each of three DOEs, which produce three partial images that are combined.

Figure 23:
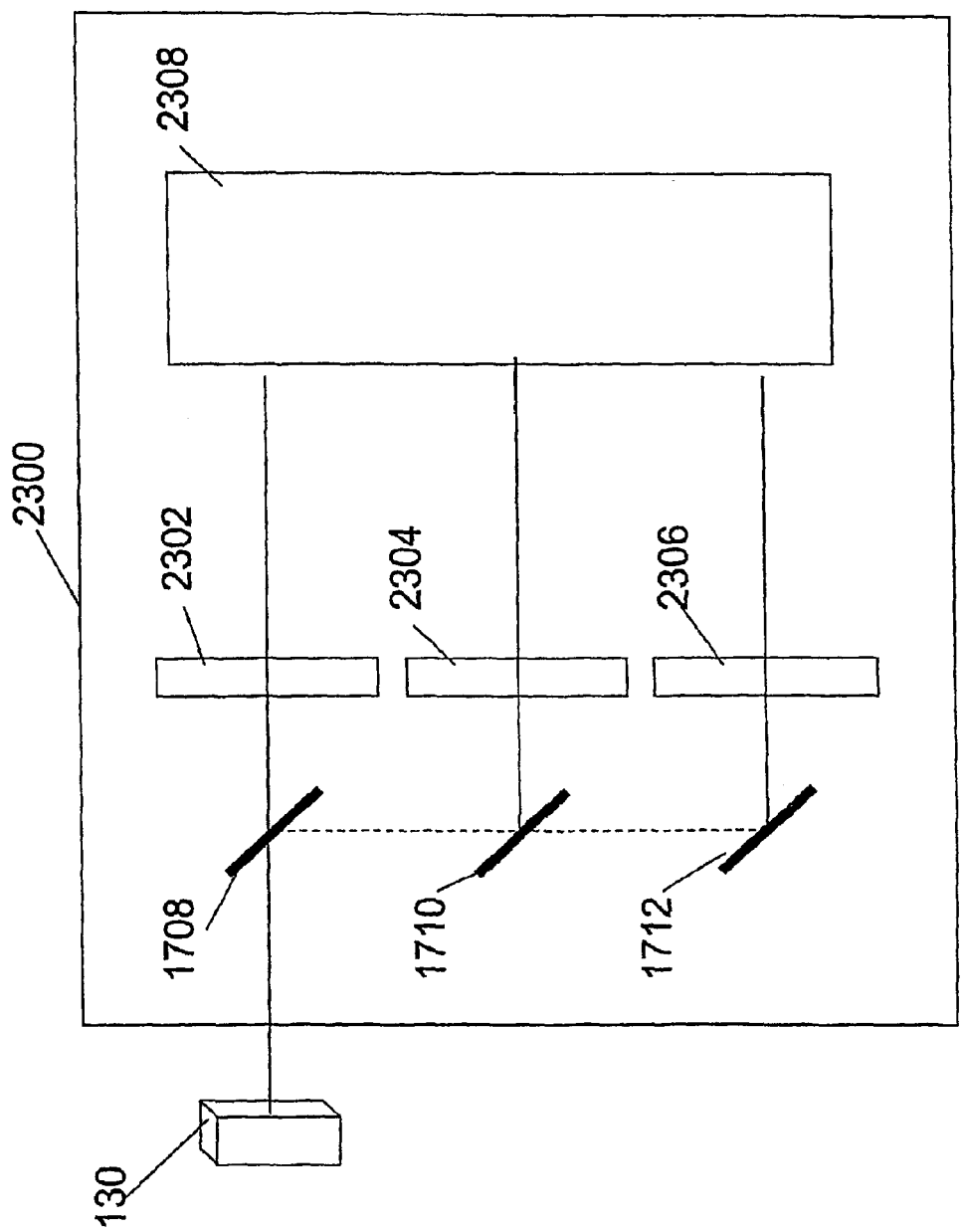
FIG. 23 is a block diagram of another embodiment of an optical apparatus.

FIG. 23 shows a block diagram of an embodiment of an optical apparatus 2300 including partially reflective and transmissive mirrors 1708, 1710 and 1712 that direct a light received from object 130 to each of three diffractive optical elements 2302, 2304 and 2306, respectively, which each perform a transforming function including a Fourier transform of a FZP. The image capture assembly 2308 extracts three-dimensional information from an image of the light transmitted by the diffractive optical elements, similar to the manner described above.

In addition, alternative embodiments of the optical assembly 110 may consist of a single SLM as shown in FIG. 5 or one or more SLMs.

Further, the invention is not restricted only to using three mask patterns to produce three partial hologram images that are combined. The invention also includes using an off-axis holographic method that employs a single off-axis hologram instead of three masks.

During reconstruction of an image from an off axis hologram each term is diffracted toward a different direction and therefore a desired angular separation can be achieved even from a single hologram, by taking advantage of the fact that angular separation in diffraction theory is directly translated to a spatial frequency separation. This characteristic may be exploited based on the idea that, when performing a convolution between functions f and g, it is equivalent to transform f and g to the frequency domain by a Fourier transform to obtain functions F and G, obtain a product of F and G, and transform the product back by an inverse Fourier transform. Thus, an optical apparatus that shifts a spatial frequency spectrum of a received light may be advantageously used to create a Fresnel hologram.

An optical apparatus that produces an off-axis Fresnel Zone Pattern (OAFZP) in response to point input light source can be used to convolve a received light rather than the FZPs in the embodiments above, and convolution using the OAFZP based assembly will allow for a convenient separation of terms in the frequency domain.

Figure 24:
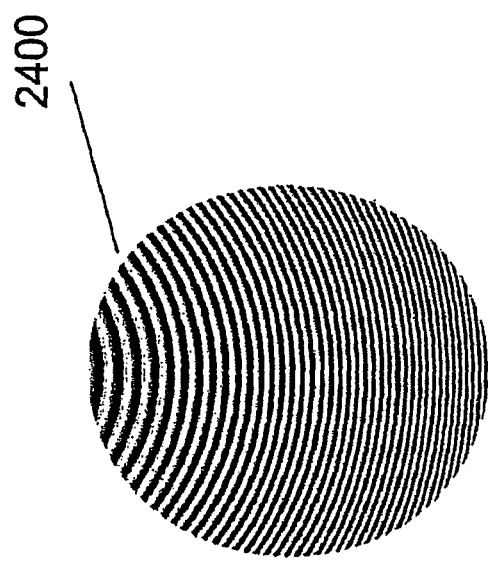
FIG. 24 is an example of an off-axis Fresnel Zone Pattern.

FIG. 24 shows an example of an OAFZP 2400.

To synthesize the off-axis FZP we may introduce a linear phase term to the equation for the on-axis FZPs described above, to result in the following OAFZP transformation function $$h(x, y, 0) = p_z(x, y) \left| \frac{1}{\sqrt{2}} \exp\left[\frac{i\pi(x^2 + y^2)}{2\lambda\Delta} + \frac{i2\pi(\alpha x + \beta y)}{\lambda}\right] + \frac{1}{\sqrt{2}} \exp\left[\frac{-i\pi(x^2 + y^2)}{2\lambda\Delta} - \frac{i2\pi(\alpha x + \beta y)}{\lambda}\right] \right| \exp[i\varphi(x, y)] \quad (10)$$

Figure 25:
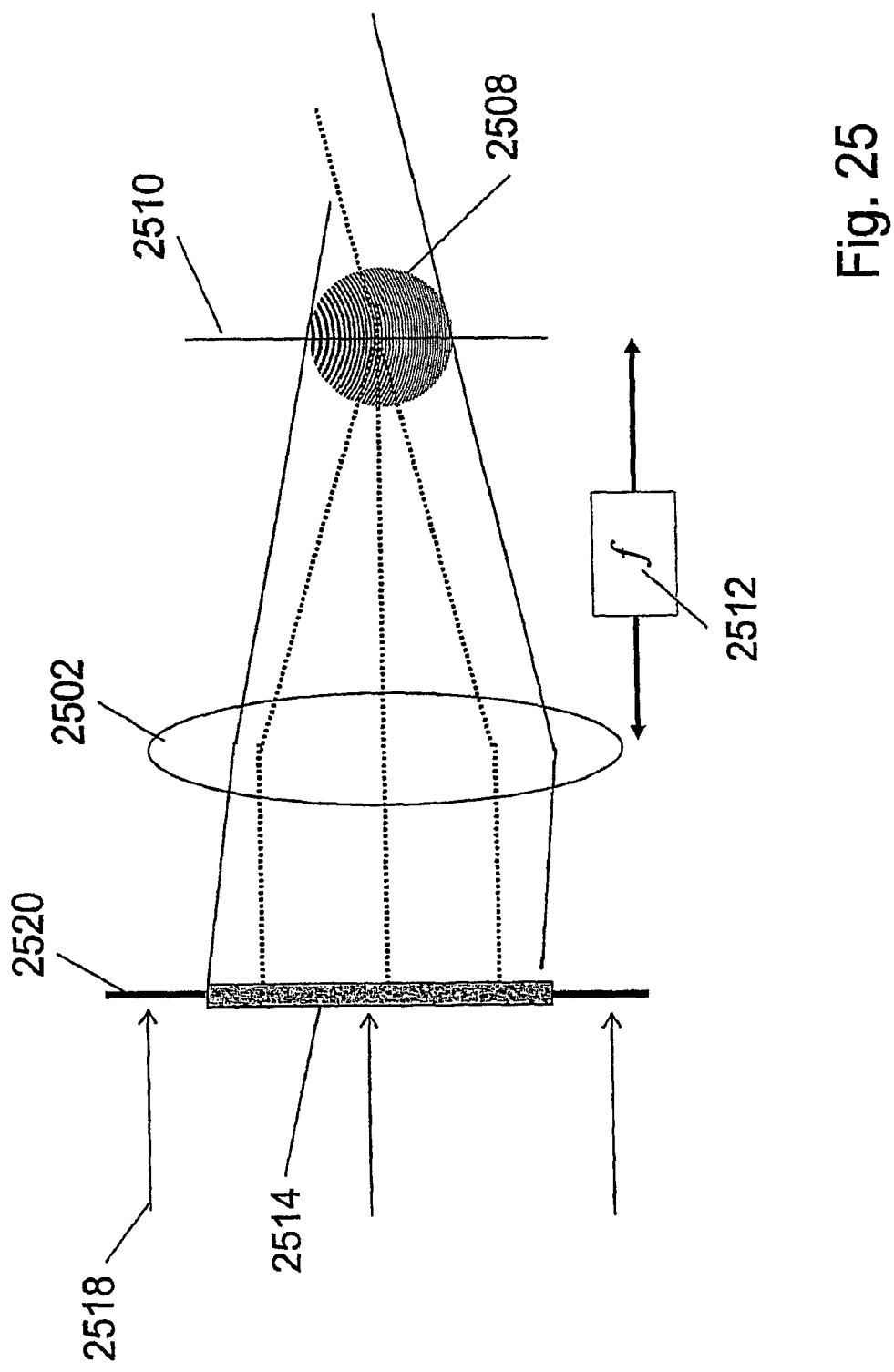
FIG. 25 is a block diagram of a portion of an optical apparatus including a composite mask.

FIG. 25 is a block diagram of a portion of an optical apparatus including a composite mask 2520. Light 2518 is received and refracted by DOE 2514 towards lens 2502 having focal length f 2512. Waves produced by mask 2520 and lens 2502, respectively, interfere with each other to produce OAFZP 2508 at image plane 2510.

Therefore, a composite mask that produces a single off-axis FZP may replace the masks or diffractive optical elements, based on Fourier transforms of FZPs, in any of the optical apparatuses described above.

A filter that creates a Fresnel hologram that includes object space information for only the observable portion of the 3D scene that intersects with a single transverse plane is one that produces an output having an amplitude PSF with a magnitude in the form of a FZP and a phase with a random, wide-band nature. According to Equation (4) the amplitude PSF $h(x,y,0)$ of an optical correlator is the inverse Fourier transform of the filter function $H(u,v)$. A filter $H(u,v)$ may be synthesized such that its inverse Fourier transform is the amplitude PSF $$h(x,y,0) = |h(x,y,0)| \exp[i\phi(x,y,0)] \quad (11)$$

The magnitude of $h(x,y,0)$ is a FZP of the form, $$|h(x, y, 0)| = |FT^{-1}\{H(u, v)\}| = \quad (12)$$
$$p_z(x, y) \left| \exp\left[\frac{i\pi}{\lambda\Delta}(x^2 + y^2) + i\theta\right] + \exp\left[\frac{-i\pi}{\lambda\Delta}(x^2 + y^2) - i\theta\right] \right|$$

where $p_z(x,y)=1$ in some given disk area S and $p_z(x,y)=0$ outside the area S. The intensity PSF in this case is $$|h(x, y, 0)|^2 = \qquad (13)$$
$$p_z(x, y)\left|\exp\left[\frac{i\pi}{\lambda\Delta}(x^2+y^2)+i\theta\right]+\exp\left[\frac{-i\pi}{\lambda\Delta}(x^2+y^2)-i\theta\right]\right|^2$$

According to equation (3), such an intensity PSF guarantees that the intensity distribution on the correlator output plane is an on-axis Fresnel hologram of at least one single transverse plane, the input plane of the correlator. When H(u,v) is a wide-band, random-like function satisfying equation (12), the h(x,y,z) resulting from equation (11) includes speckle noise in each and every plane besides the plane z=0. As mentioned above, on the plane z=0 the PSF's magnitude |h(x,y,0)| is a FZP because this is the constraint defined in equation (12) for which H(u,v) is synthesized.

The process of reconstructing the cross-section of the input plane by a computer is identical to the process described by equation (7). To get rid of the bias term (the $0^{th}$ order) and the twin image, at least three such holograms may be recorded with different phase values and the image can be obtained by a superposition according to equation (7).

When amplitude PSF has random, wide-band phase distribution $\phi(x,y)$, any object point located at any transverse plane that is at least a Rayleigh distance (i.e., 0.61λ/NA, where NA means numerical aperture) away from the input plane generates a meaningless noisy pattern on the output plane. The contribution of this noisy pattern to the recorded hologram in the output plane has a similar fate as of the DC term in the conventional digital hologram. Thus, this noise may be almost completely removed by the superposition of the three holograms described by equation (7). The remaining noise portion on the final hologram after the superposition induces a relatively weak noisy background in the reconstructed image.

In order to section the object into different cross-sections, the filter function may be constrained such that the magnitude of its inverse Fourier transform will satisfy equation (12). In other words, this magnitude may be in the form of a FZP. However, this FZP should be obtained only on the output plane. At any plane before or behind, at least a Rayleigh distance from the output plane, the obtained pattern should preferably resemble a noisy speckle pattern. Such a goal may be achieved if the phase of h(x,y,0) has a random wideband nature, which may be caused by starting the computing process with a random phase function filter, and forcing a second constraint on filter function H(u,v). The second constraint results from the requirement that the filter is preferably a phase-only function, and may achieve two goals: first, in order to get maximum transmission efficiency, the system's filter should preferably not absorb any light that passes through the correlator.

Second, in order to get an amplitude PSF with a wideband phase distribution, the filter should preferably have unit transmission. However, it should be noted that the second constraint is not crucial for proper operation, and these preferences may be relaxed, while still achieving the claimed benefits. A different constraint can be chosen, or even only the main constraint at the PSF space mentioned above can be enforced without using any second constraint at all. Preferably, the optimal filter function simultaneously satisfies as much as possible of both constraints. One possible way to select the filter function is by an iterative algorithm such as POCS (Projection Onto Constraints Sets), which is known by the following other names: Gershberg-Saxton, Ping-Pong, or IFTA (Iterative Fourier Transform Algorithm). Alternatively, other similar algorithms may be used. An example of selecting the filter function according to the POCS algorithm is shown in the flow diagram of FIG. 26.

Figure 26:
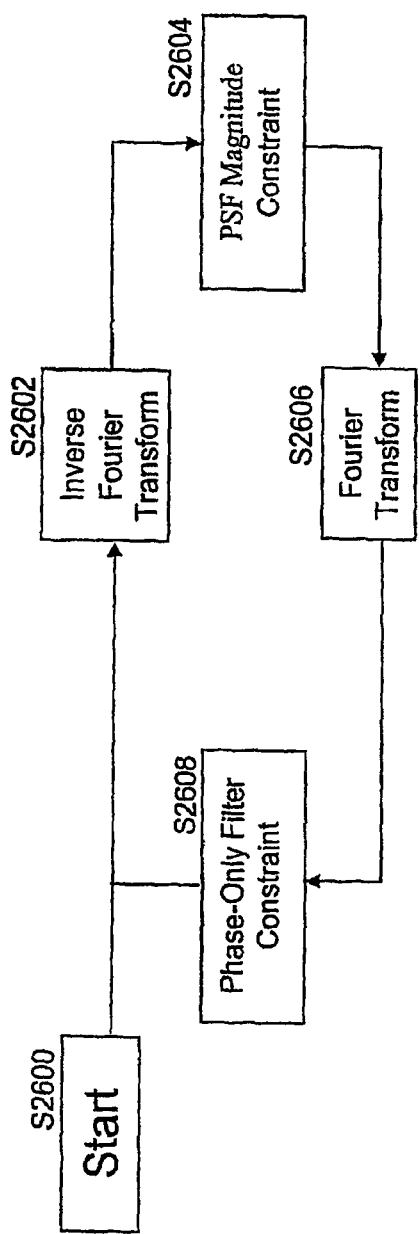
FIG. 26 is a block diagram of a method for calculating a filter.

The method of FIG. 26 begins with the selection of a random phase-only filter in S2600, such as $H_{Sf}(u,v)=\exp[i\phi_R(u,v)]$. This filter is inversely Fourier transformed to the PSF space, in S2602, and the obtained function is projected onto the constraint set such that the magnitude of the function h(x,y) is a FZP function of the form of equation (12), in S2604. The phase of the function h(x,y) remains unaffected by this step. Following this projection, the new PSF is Fourier transformed back to the filter space, in S2606. The new PSF is projected from the filter space onto the constraint set of the Fourier space, in S2608, where the magnitude of the function H(u,v) is replaced by the unity magnitude, and the phase function remains unaffected. These steps are repeated until the obtained filter is close enough to meeting both the constraint sets, as determined by the user's requirements.

In the description above, it is assumed that in order to reconstruct a specific cross-section of an object, the intensity PSF should be in the form of a FZP like that described by Equation (12). However, as described below, there are many other possible functions which can be used to successfully reconstruct a cross-section of an object. These functions should satisfy certain conditions which are discussed in the following. Using different intensity PSFs can reduce the number of holograms to be captured and superposed to fewer than the three holograms described above in the case of an intensity PSF of the form of Equation (13). In this example, the reduced number of holograms are still on-axis, providing all the advantages of on-axis holograms described above. Note that when using functions other than FZPs as the intensity PSF, the recorded holograms may no longer be considered as Fresnel holograms.

For example, the cross-section may be constructed based on capturing two on-axis holograms. The corresponding two amplitude PSFs are $|w_1(x,y)|\exp[i\phi_1(x,y)]$ and $|w_2(x,y)|\exp[i\phi_2(x,y)]$, where $\phi_1(x,y)$ and $\phi_2(x,y)$ are random wide-band functions. $w_1(x,y)$ and $w_2(x,y)$ are arbitrary functions which satisfy certain constraints, explicitly presented in the following. The two captured holograms are, $$H_1(x,y)=I(x,y)*|w_1(x,y)|^2$$
$$H_2(x,y)=I(x,y)*|w_2(x,y)|^2 \qquad (14)$$

where I(x,y) is the intensity distribution of a single object's cross-section located at the input plane.

The two captured holograms are subtracted one from the other such that the final hologram is $$H(x,y)=I(x,y)*[|w_1(x,y)|^2-|w_2(x,y)|^2] \qquad (15)$$

The magnitudes of the two amplitude PSFs are constrained such that the Fourier transform of the function $w(x,y)=|w_1(x,y)|^2-|w_2(x,y)|^2$ should be a phase only function. Such a constraint allows the reconstruction of an object's cross section to advantageously be performed by finding two magnitude functions $w_1(x,y)$ and $w_2(x,y)$ that satisfy the constraint that the function w(x,y) is real valued, on one hand, and on the other hand the constraint that the Fourier transform of this function w(x,y) is purely phase function.

First, a real random function is selected, for example using a computer to select the function. Next, the function is Fourier transformed and the magnitude of the transformed function is replaced by the unity function. Finally, the phase-only spectrum is inversely Fourier transformed back to the image plane. This short procedure guarantees that, on one hand, the resulting function is real valued, because the Fourier transform of the resulting function remains an odd function. On the other hand the Fourier transform of $w(x,y)$ is constrained to be a phase-only function. Once functions $w_1(x,y)$ and $w_2(x,y)$ are selected to satisfy $FT[w(x,y)]=\exp[i\psi(u,v)]$ the object's cross-section may be reconstructed by Fourier transforming the final hologram given in equation (14) and multiplying the result of the Fourier transformation by the transform by $\exp[-i\psi(u,v)]$, which has known characteristics. Therefore, the reconstructed cross section of the object may be obtained by multiplying the Fourier transform of the recorded hologram by the complex conjugate of $\exp[i\psi(u,v)]$, as shown in the following:

$$FT^{-1}\{FT\{H(x, y)\}\exp[-i\psi(u, v)]\} = FT^{-1}\{FT\{I(x, y) * \qquad (16)$$
$$[|w_1(x, y)|^2 - |w_2(x, y)|^2]\}$$
$$\exp[-i\psi(u, v)]\}$$
$$= FT^{-1}\{FT\{I(x, y)\}FT$$
$$\{[|w_1(x, y)|^2 - |w_2(x, y)|^2]\}$$
$$\exp[-i\psi(u, v)]\}$$
$$= FT^{-1}\{FT\{I(x, y)\}\exp[i\psi(u, v)]$$
$$\exp[-i\psi(u, v)]\} =$$
$$FT^{-1}\{FT\{I(x, y)\}\} = I(x, y)$$

Thus, in summary, the filter may be synthesized as follows. First, two Fourier related functions are selected as described above, such that one is a bipolar real function in the object domain $w(x,y)=|w_1(x,y)|^2-|w_2(x,y)|^2$ and the other is $\exp[i\psi(u,v)]$ in the frequency domain. Next, the positive part of $w(x,y)$, designated as $w_P(x,y)$, is separated from the negative part, designated as $w_N(x,y)$, where $w_N(x,y)$ is a positive function. The amplitudes of the two PSFs are given by: $w_1(x,y)=\sqrt{w_P(x,y)}$ and $w_2(x,y)=\sqrt{w_N(x,y)}$. The phase of these PSFs is calculated by two separated POCS algorithms, for example as shown in FIG. 26. Further, the magnitude in the PSF domain is enforced to be $|w_1(x,y)|$ in one POCS and $|w_2(x,y)|$ in the other POCS, and not FZPs as suggested before.

In each of the POCS algorithms, the frequency domain may be constrained to get a phase-only function in order to achieve maximum transmission efficiency for the filters. In the image domain, the amplitude functions may be constrained to obtain $w_1(x,y)$ in one POCS and $w_2(x,y)$ in the other POCS. Starting these POCS algorithms from a random phase distribution in the frequency domain allows the phase functions of the two amplitude PSFs to be random-like wide-band functions.

Finally, the filter-finder POCS algorithms yield two phase only filters $F_1(u,v)=\exp[i\theta_1(u,v)]$ and $F_2(u,v)=\exp[i\theta_2(u,v)]$ having inverse Fourier transforms $|w_1(x,y)|\exp[i\phi_1(x,y)]$ and $|w_2(x,y)|\exp[i\phi_2(x,y)]$, respectively. Functions $w_1(x,y)$ and $w_2(x,y)$ are computed such that the Fourier transform of $|w_1(x,y)|^2-|w_2(x,y)|^2$ is again the phase only function $\exp[i\psi(u,v)]$.

In the following example, the image of the cross-section of the object is reconstructed using only a single on-axis hologram. In this example, the single amplitude PSF is denoted by $|s(x,y)|\exp[i\phi(x,y)]$, where $\phi(x,y)$ has a random wide-band nature. The single captured hologram is, $$H(x,y)=I(x,y)*|s(x,y)|^2 \qquad (17)$$

where $I(x,y)$ is the intensity distribution of the object's cross-section located at the input plane. Unfortunately, the Fourier transform of the function $|s(x,y)|^2$ is not a pure phase only function because, for such positive-only functions, the high bias term yields a large magnitude value in the origin of the spectral plane at $(u,v)=(0,0)$, significantly larger than the rest of the spectrum values. Therefore, a positive-only function may not be transformed to a phase-only spectral function in which the spectral magnitude is one everywhere. The constraint on the magnitude of the amplitude PSFs that can be imposed is that the Fourier transform of the bipolar function $s'(x,y)=|s(x,y)|^2-[\iint_A |s(x,y)|^2 dxdy-1]/A$ should be a phase only function, where A is the area of the image plane. As described below, this kind of constraint enables object cross-section reconstruction using a direct calculation to find a magnitude function satisfying, on one hand the constraint that the function $s'(x,y)$ is real valued, and on the other hand the constraint that the Fourier transform of this function is purely a phase function. A real random bipolar function, for example, selected by a computer, is Fourier transformed and the magnitude of the transformed function is replaced by the unity function. Next, this phase-only spectrum is inversely Fourier transformed back to the image plane. The obtained bipolar function is converted to a positive function by adding the constant value equal to the absolute value of the function's minimal value. This short procedure guarantees that, on one hand, the resulting function is real valued because its Fourier transform remains an odd function. On the other hand, during the procedure we enforce the condition that the Fourier transform of a resulting function is a phase-only function. After selecting a function $s(x,y)$ that satisfies the condition $$FT\{|s(x,y)|^2-[\iint_A |s(x,y)|^2 dxdy-1]/A\}=\exp[i\psi(u,v)] \qquad (18)$$

the object's cross-section can be reconstructed by Fourier transforming the final hologram given in equation (17), introducing a zero value at the origin of the spectral plane and multiplying the transform by $\exp[-i\psi(u,v)]$. Therefore, the reconstructed cross section of the object is approximately given by, $$FT^{-1}\{\{FT\{H(x,y)\}[1-\delta(u,v)]+\delta(u,v)\}\exp[-i\psi(u,v)]\}$$

$$FT^{-1}\{\{FT\{I(x,y)*|s(x,y)|^2\}[1-\delta(u,v)]+\delta(u,v)\}\exp[-i\psi(u,v)]\}$$

$$FT^{-1}\{\{FT\{I(x,y)\}FT\{|s(x,y)|^2\}[1-\delta(u,v)]+\delta(u,v)\}\exp[-i\psi(u,v)]\}$$

$$FT^{-1}\{FT\{I(x,y)\}\exp[i\psi(u,v)]\}\cong I(x,y) \qquad (19)$$

where $\delta(u,v)=1$ for $(u,v)=(0,0)$ and $\delta(u,v)=0$ for all points other than $(u,v)=(0,0)$. The entire process of filter synthesizing includes now a single POCS algorithm.

In summary, reconstructing the cross-section of the object using a single on-axis hologram may be performed as follows. First, two Fourier related functions are selected as described above, where one function is a bipolar real unbiased function in the object domain $s'(x,y)$ and the other in the frequency domain is $\exp[i\psi(u,v)]$. Next $s'(x,y)$ is converted to a positive function by adding the constant value $|\min\{s'(x,y)\}|$ to $s'(x,y)$. The amplitude of the PSF is now $s(x,y)=\sqrt{s'(x,y)+|\min\{s'(x,y)\}|}$. The phase of this PSF is calculated by a POCS algorithm. The frequency domain is constrained to get a phase-only function to obtain maximum transmission efficiency for the filter. The image domain is constrained to get the amplitude function s(x,y). Starting a POCS algorithm with a random phase distribution in the frequency domain allows the phase of the amplitude PSF to be a random-like wide-band function. The POCS algorithm yields a phase-only filter $F(u,v)=\exp[i\theta(u,v)]$ having an inverse Fourier transform equal to $|s(x,y)|\exp[i\phi(x,y)]$. The function s(x,y) is computed such that the Fourier transform of the bipolar real function $|s(x,y)|^2-[\iint_A |s(x,y)|^2 dxdy-1]/A$ is the phase only function $\exp[i\psi(u,v)]$. Following is a description of alternative methods to capture sets of sectioning holograms for reconstructing images of different cross-sections of a 3D scene. Each alternative method has different advantages.

Figure 27A:
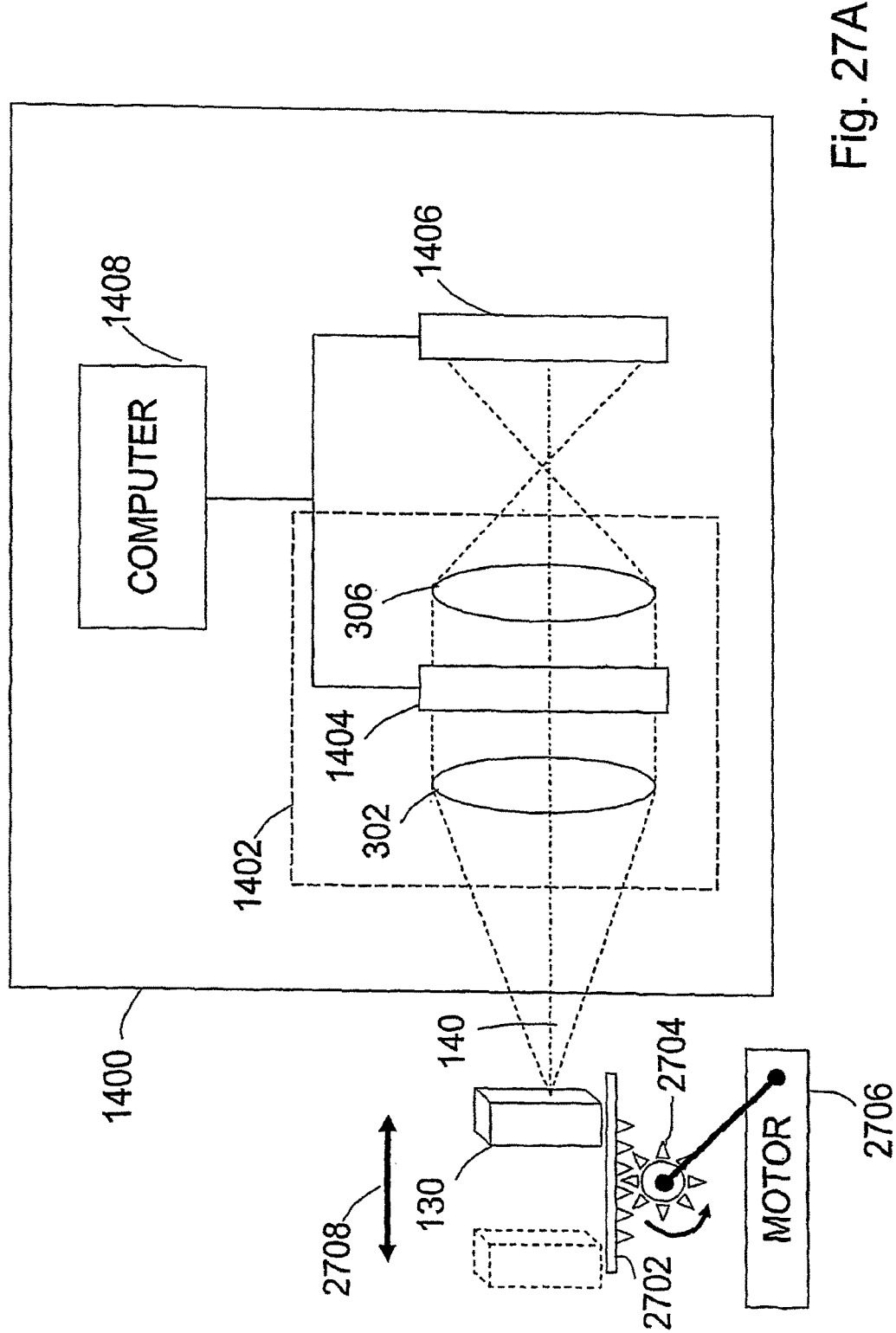
FIG. 27A is a block diagram of another embodiment of an optical apparatus.

FIG. 27A is a schematic and block diagram of a first embodiment of an apparatus configured to capture different cross sections of an object 130. In this embodiment, an optical apparatus 1400, such as the optical apparatus shown in FIG. 14, may be configured to capture plural holograms corresponding to different positions of object 130. In this example, object 130 may be moved along axis 2708 by a mechanical device, such as a movable platform 2702, connected by gear 2704 to motor 2706. Further, although not shown, the position of the platform 2702 may be controlled by computer 1408, or the position may be independent of computer 1408. By shifting the input object plane along axis 2708, as shown in FIG. 27A, each of the plural different captured holograms may be used to obtain a corresponding cross-section of the object 130.

Figure 27B:
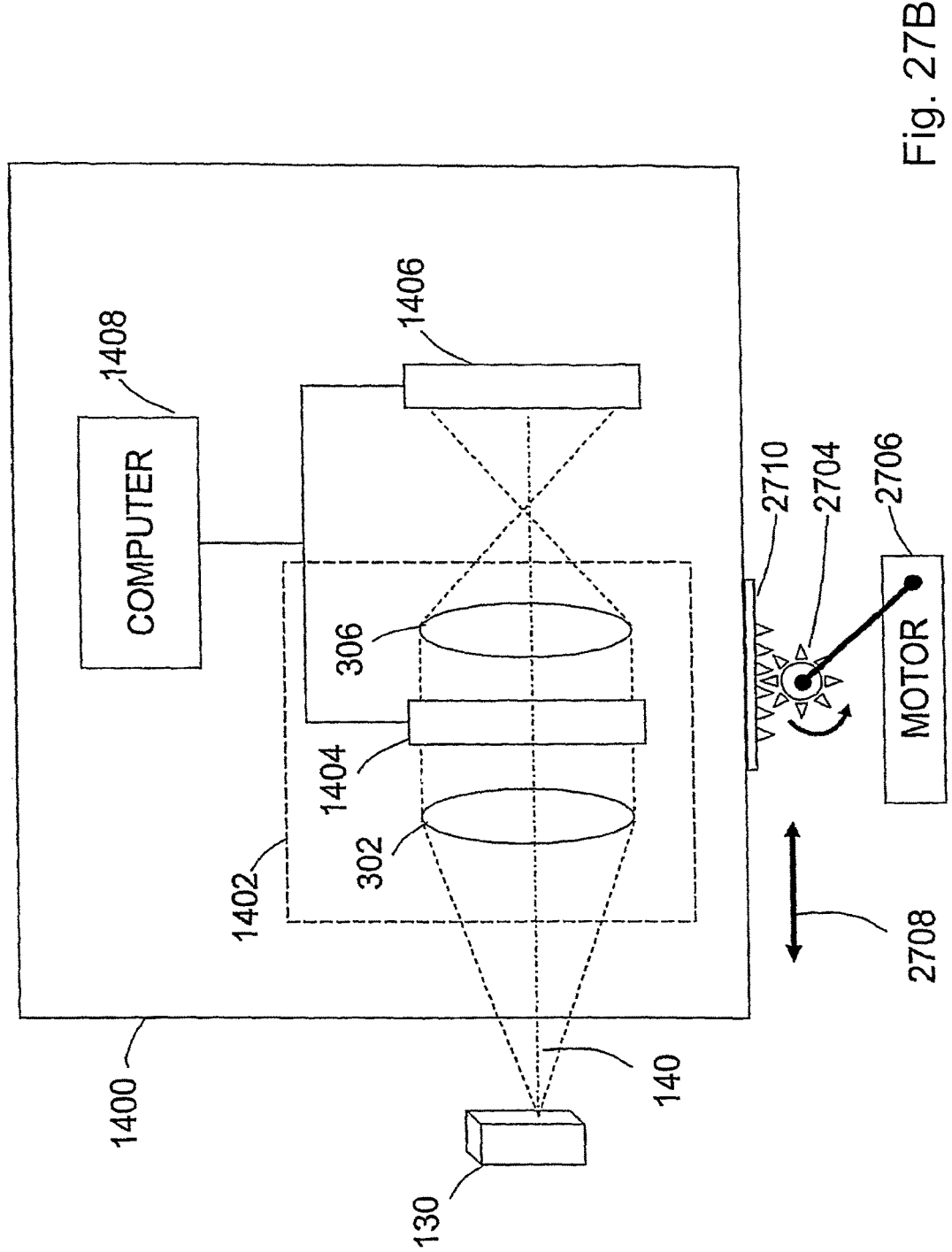
FIG. 27B is a block diagram of another embodiment of an optical apparatus.
Figure 27C:
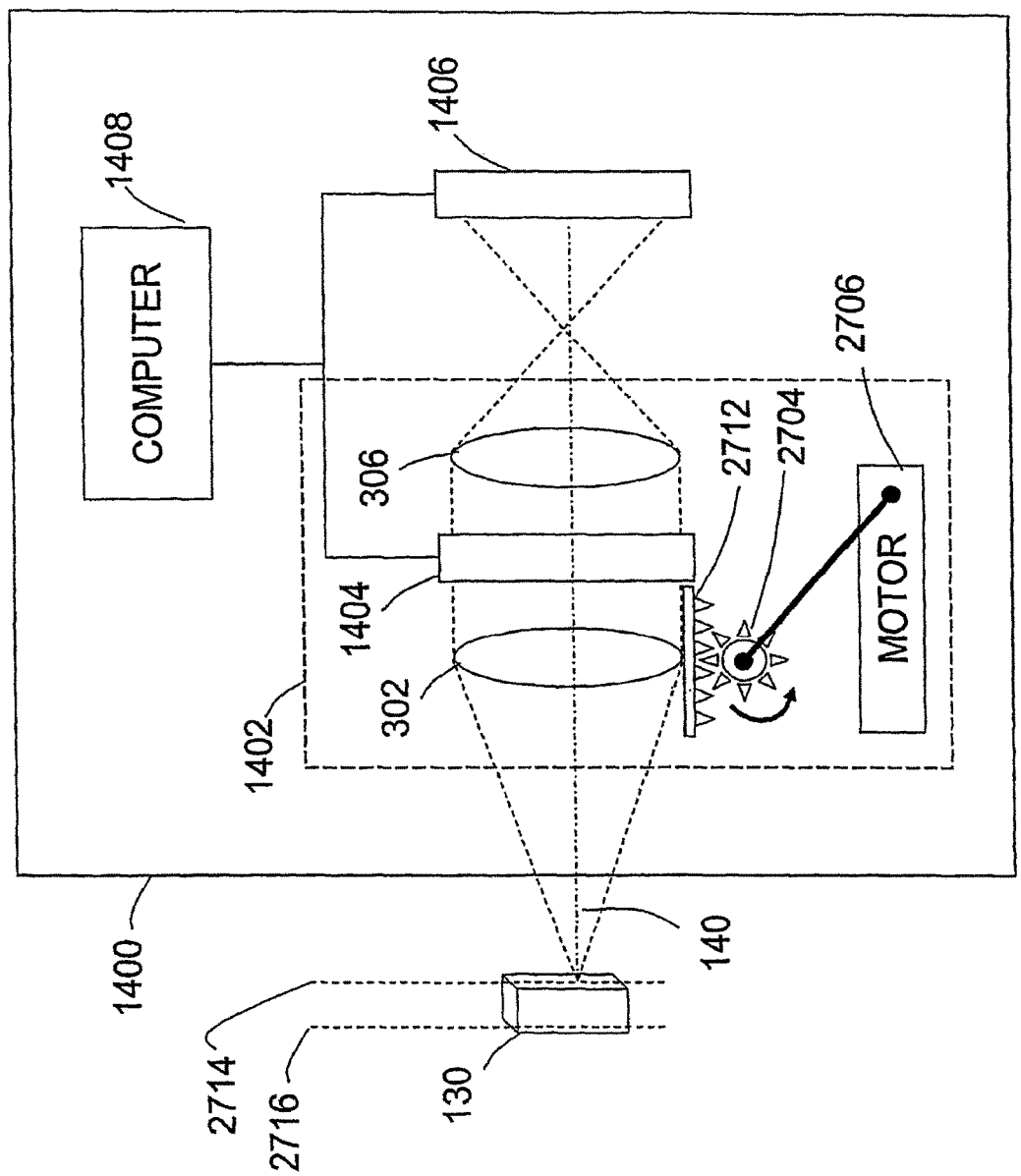
FIG. 27C is a block diagram of another embodiment of an optical apparatus.

FIG. 27B is a schematic and block diagram of a second embodiment of an apparatus configured to capture different cross sections of an object 130, in which the position of the object 130 may remain unchanged, while the position of the optical apparatus 1400, mounted on a movable platform 2710, is varied along the axis 2708. FIG. 27C is a schematic and block diagram of a third embodiment of an apparatus configured to capture different cross sections of an object 130. In this option, a location of an input plane may be varied between 2714 and 2716 by mechanically moving a location of lens 302, using for example, a platform 2712 by a gear 2704 and a motor 2706. In addition, other methods of changing a focal or object input plane known to those in the field of optics are also included in the present invention.

Figure 27D:
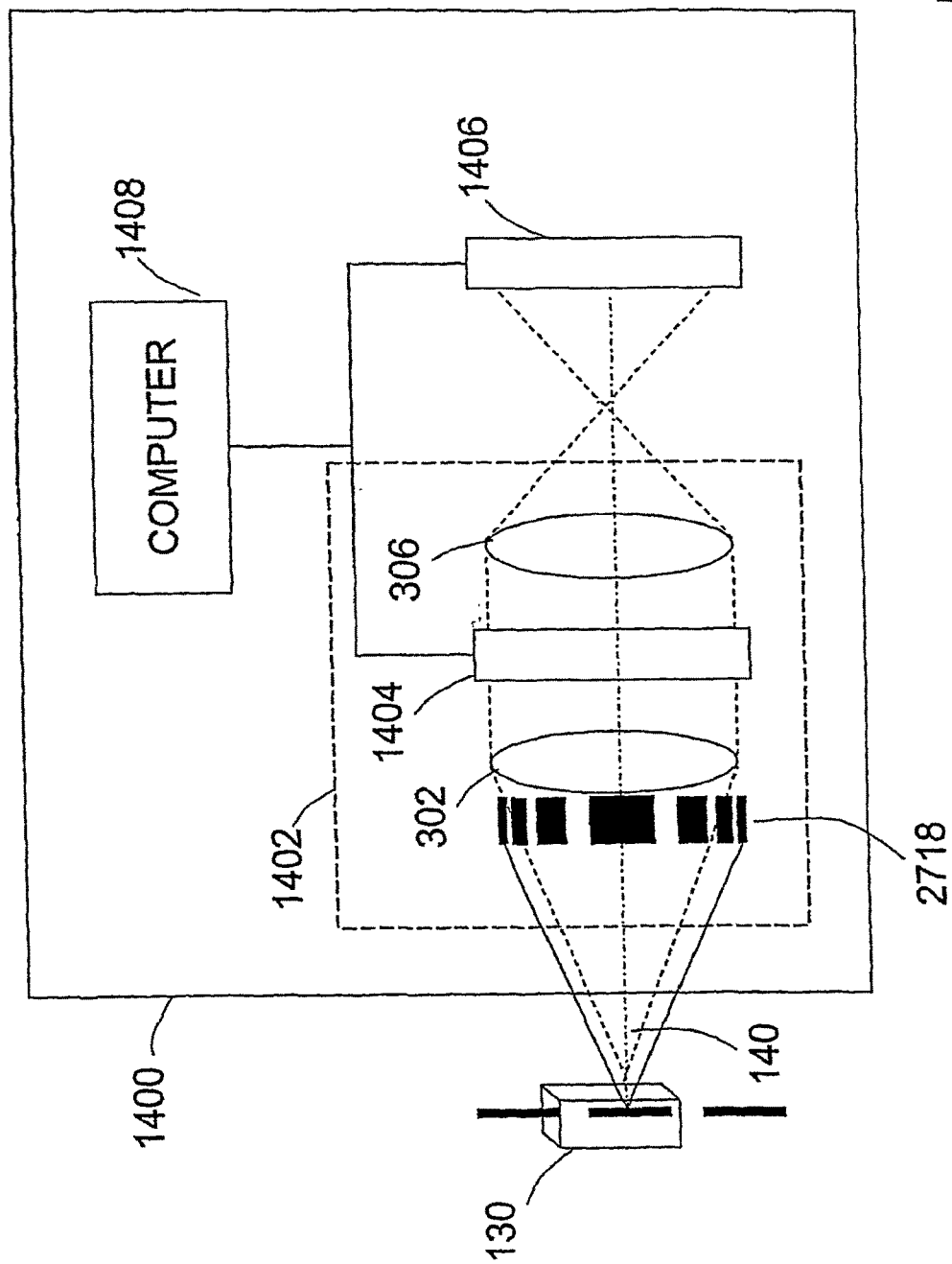
FIG. 27D is a block diagram of another embodiment of an optical apparatus.

FIG. 27D is a block diagram of a fourth embodiment of an apparatus configured to capture different cross sections of an object 130, without moving either the object 130 or the apparatus 1400. In this embodiment, the effective focal length of the correlator's input lens 302 is varied using an electrically controlled diffractive lens (ECDL) 2718, which may be implemented using a SLM. Alternatively, lens 302 may be replaced by the ECDL 2718. In this embodiment, holograms may be captured using various focal lengths of the correlator's input lens or ECDL, with each hologram corresponding to a different cross-section.

Although different cross-sections may be obtained by changing the input plane of the object or the input focal plane, different cross-sections may alternatively be obtained by changing a location of the output plane.

Figure 28A:
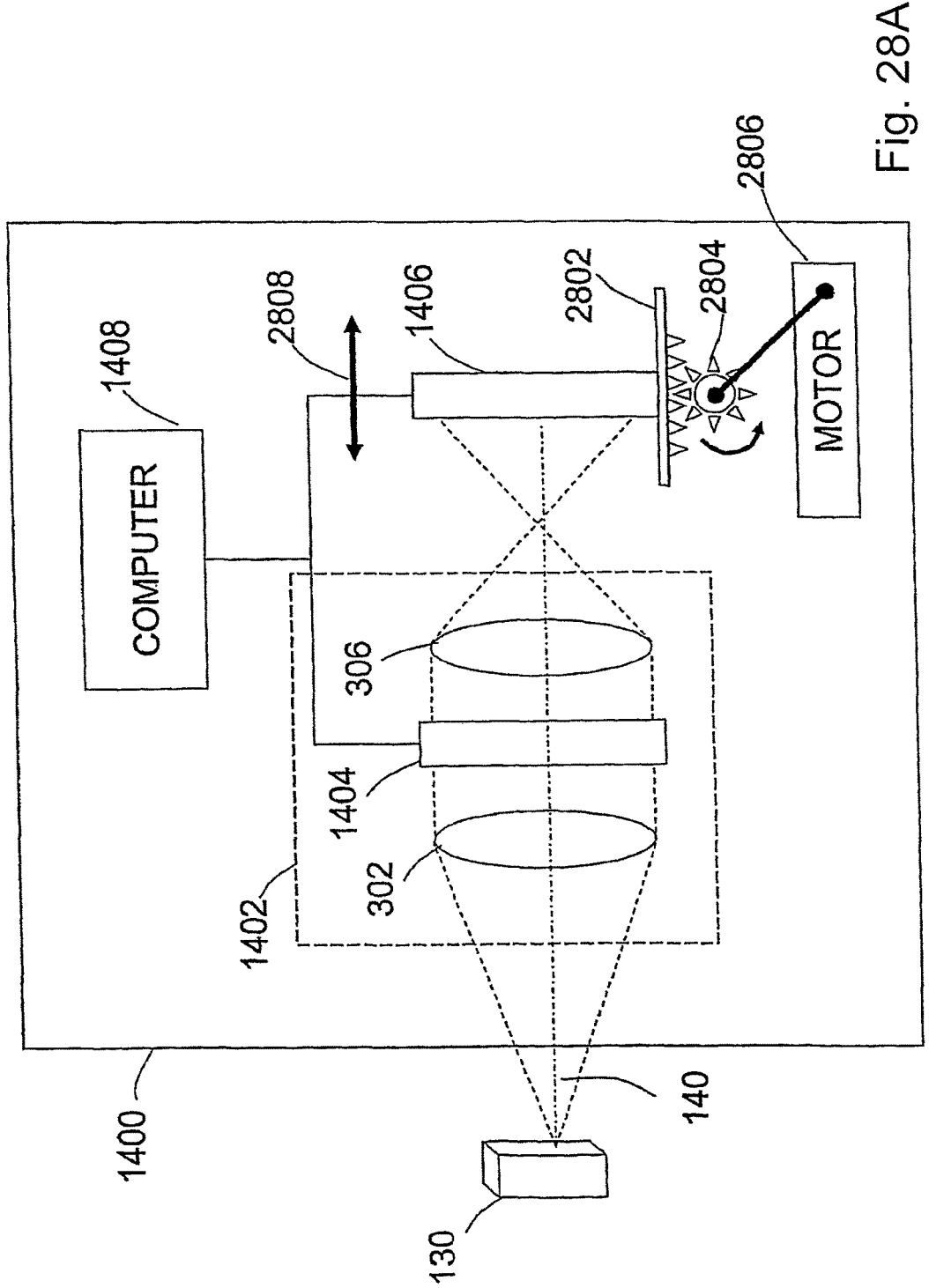
FIG. 28A is a block diagram of another embodiment of an optical apparatus.

FIG. 28A is a schematic and block diagram of a fifth embodiment of an apparatus configured to capture different cross sections of an object 130, by moving a location of image capture assembly 1406 with respect to incoherent correlator 1402. In this example, a motor 2806 controls a movable platform 2802, using gear 2804. The platform 2802 is configured to move image capture assembly 1406 along axis 2808. Plural holograms corresponding to plural cross-sections may be obtained at each different position of image capture assembly 1406 along axis 2808.

Figure 28B:
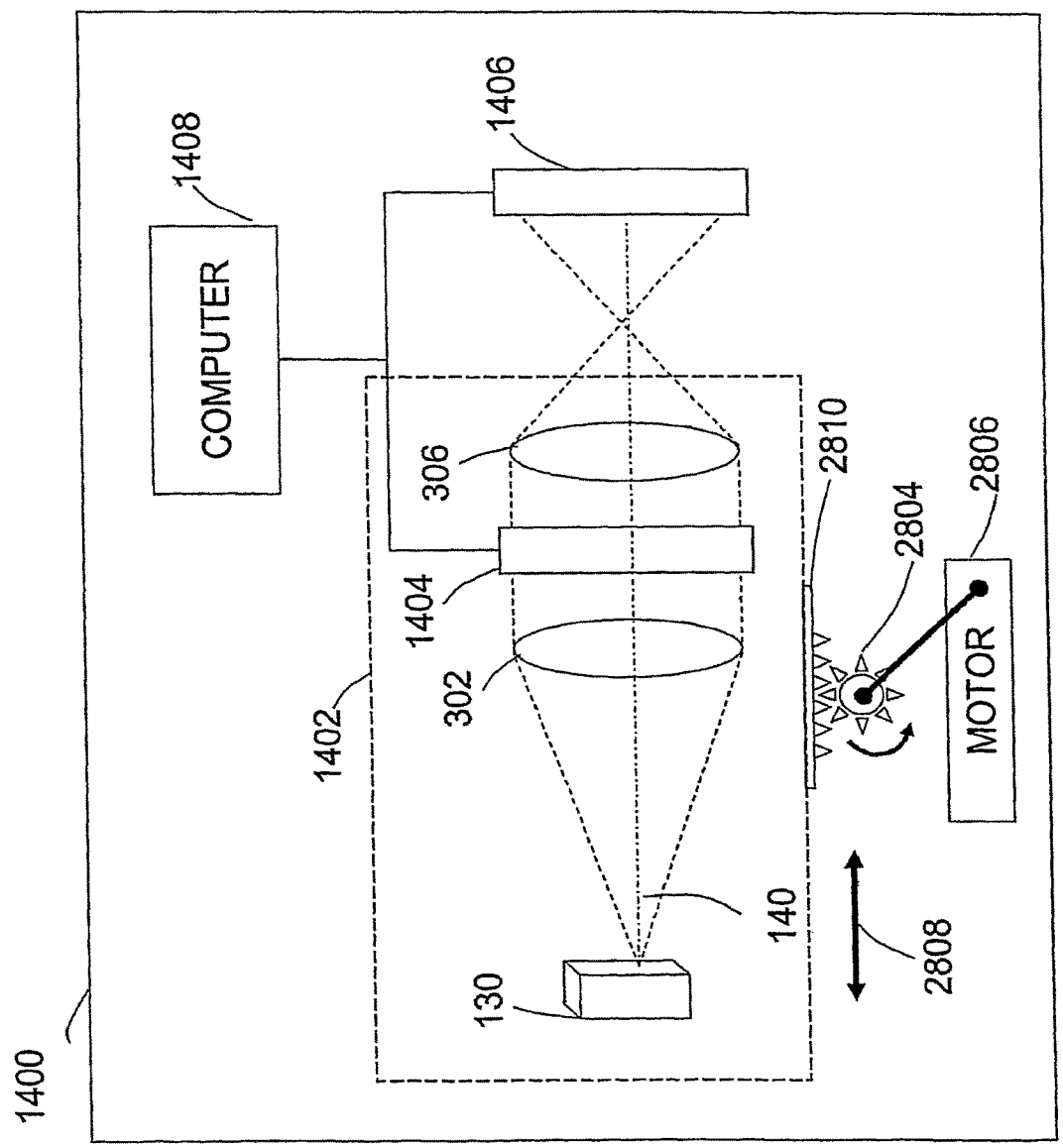
FIG. 28B is a block diagram of another embodiment of an optical apparatus.

FIG. 28B is a schematic and block diagram of a sixth embodiment of an apparatus configured to capture different cross sections of an object 130, by moving object 130 and image correlator 1402, each attached to movable platform 2810, with respect to image capture assembly 1406.

Figure 28C:
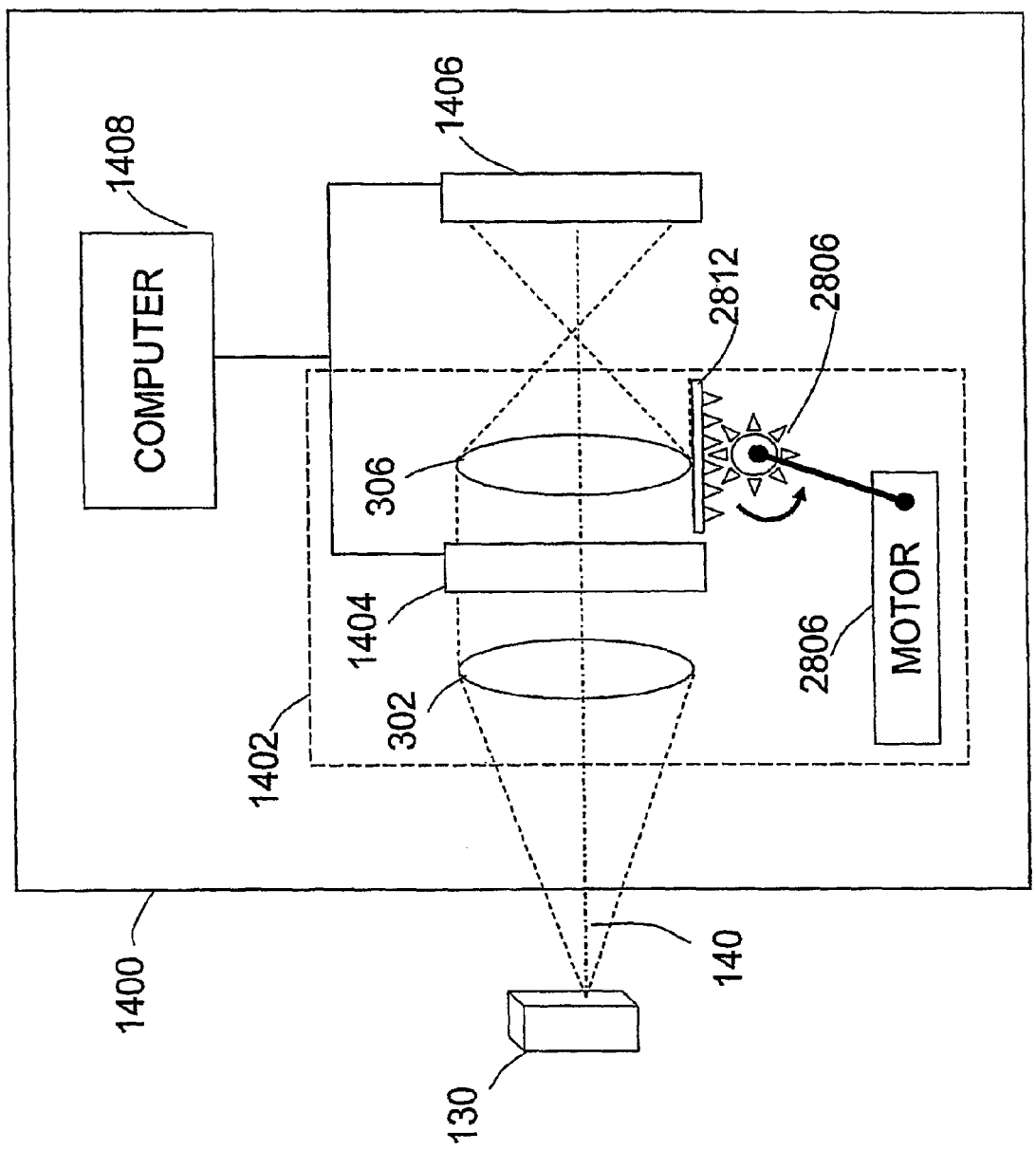
FIG. 28C is a block diagram of another embodiment of an optical apparatus.
Figure 28D:
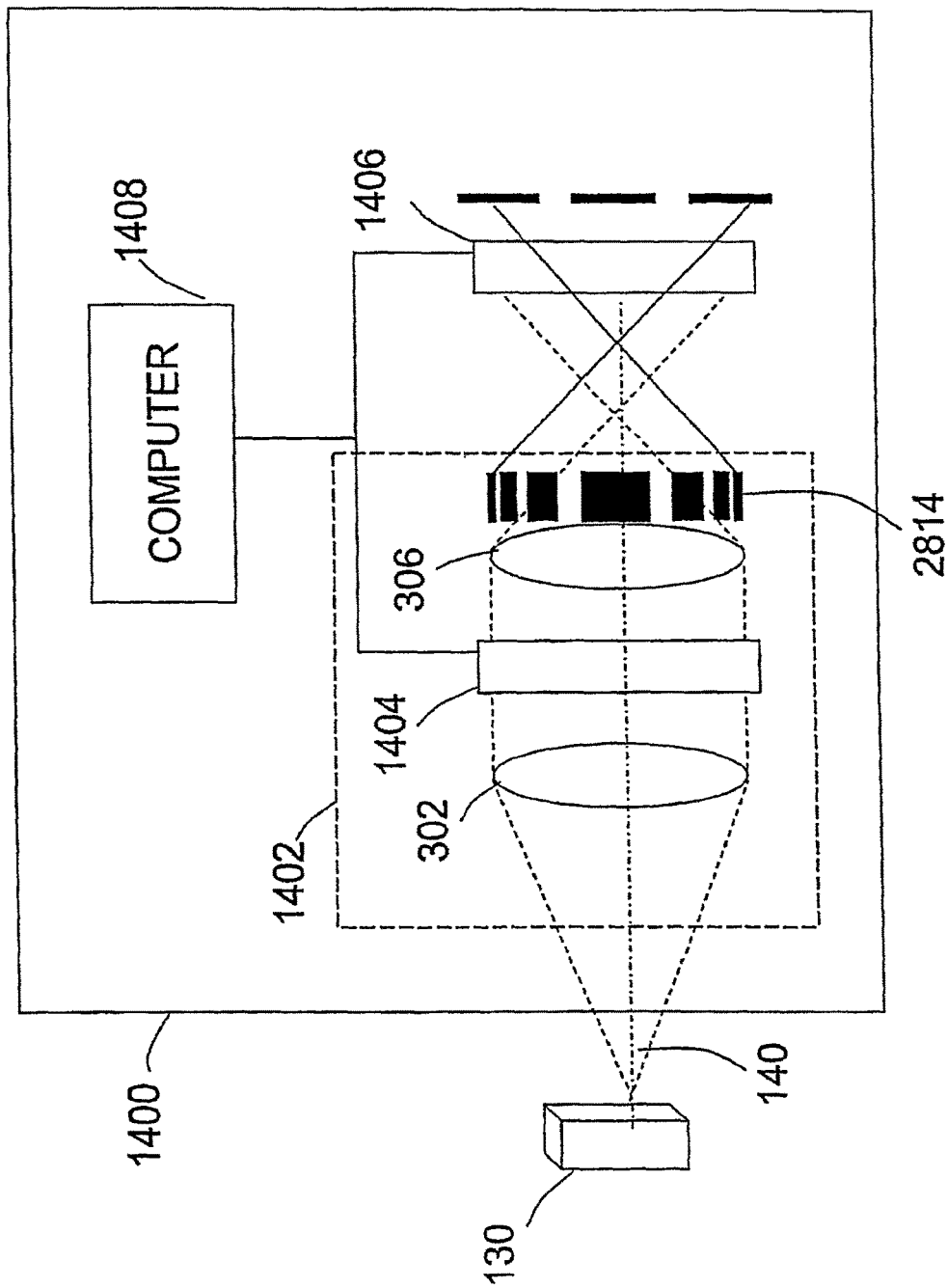
FIG. 28D is a block diagram of another embodiment of an optical apparatus.

FIG. 28C is a schematic and block diagram of a seventh embodiment of an apparatus configured to capture different cross sections of an object 130, by moving a location of an output lens 306, and thereby changing the cross-section captured by the image capture assembly 1406. FIG. 28D is a block diagram of a eighth embodiment of an apparatus configured to capture different cross sections of an object 130, by varying an effective focal length of lens 306 using ECDL 2814, as described above.

Instead of changing or moving the correlator or some of its components, holograms may be captured while varying the filter function such that each varied filter satisfies the two constraint sets described above, for each different desired transverse plane in the observed scene. Thus, by varying the filters, cross-sections for the entire observed 3D space may be obtained.

For example, using the embodiment shown in FIG. 16, the filters in each of masks 1602, 1608, and 1610 may be selected to correspond to three different desired cross-sections of object 130.

In the embodiments described above, the process of capturing the plural cross-sections of the observed 3D space is performed serially, plane by plane, which may require an unacceptable amount of time. However, all the transverse planes may be captured at once by splitting the output plane into several channels corresponding to the number of cross-sections desired to be recorded in parallel.

FIG. 29 is a block diagram of a ninth embodiment of an apparatus configured to capture different cross sections of an object 130, by capturing plural partial images simultaneously. In this embodiment, filter 1404 includes a combination of four different filter functions each corresponding to a different portion of the optical spectrum and each observing a different cross-section of object 130. Light from correlator 1402 is received by light partitioning devices 2910, 2912, 2914, and 2916, which are each configured to reflect one portion of the light, corresponding to one of the filter functions, to a corresponding image capture assembly 2902, 2904, 2906, or 2908, respectively. The light partitioning devices 2910, 2912, 2914, and 2916 may include any combination of dichroic mirrors, color filters, mirrors or other partially transmissive frequency filtering devices known to those of skill in the art.

Alternatively, light partitioning devices 2910, 2912, 2914, and 2916 may be configured to reflect a portion of the entire spectrum of light, and the filter 1404 may be selected such that the relative length of light paths to each of image capture assemblies 2902, 2904, 2906, and 2908, correspond to different cross-sections of the object 130.

In the embodiment shown in FIG. 29, each image capture assembly receives only a portion the output light intensity. However, the present invention also includes using several correlators in parallel to obtain several cross-sections of the scene.

Figure 30A:
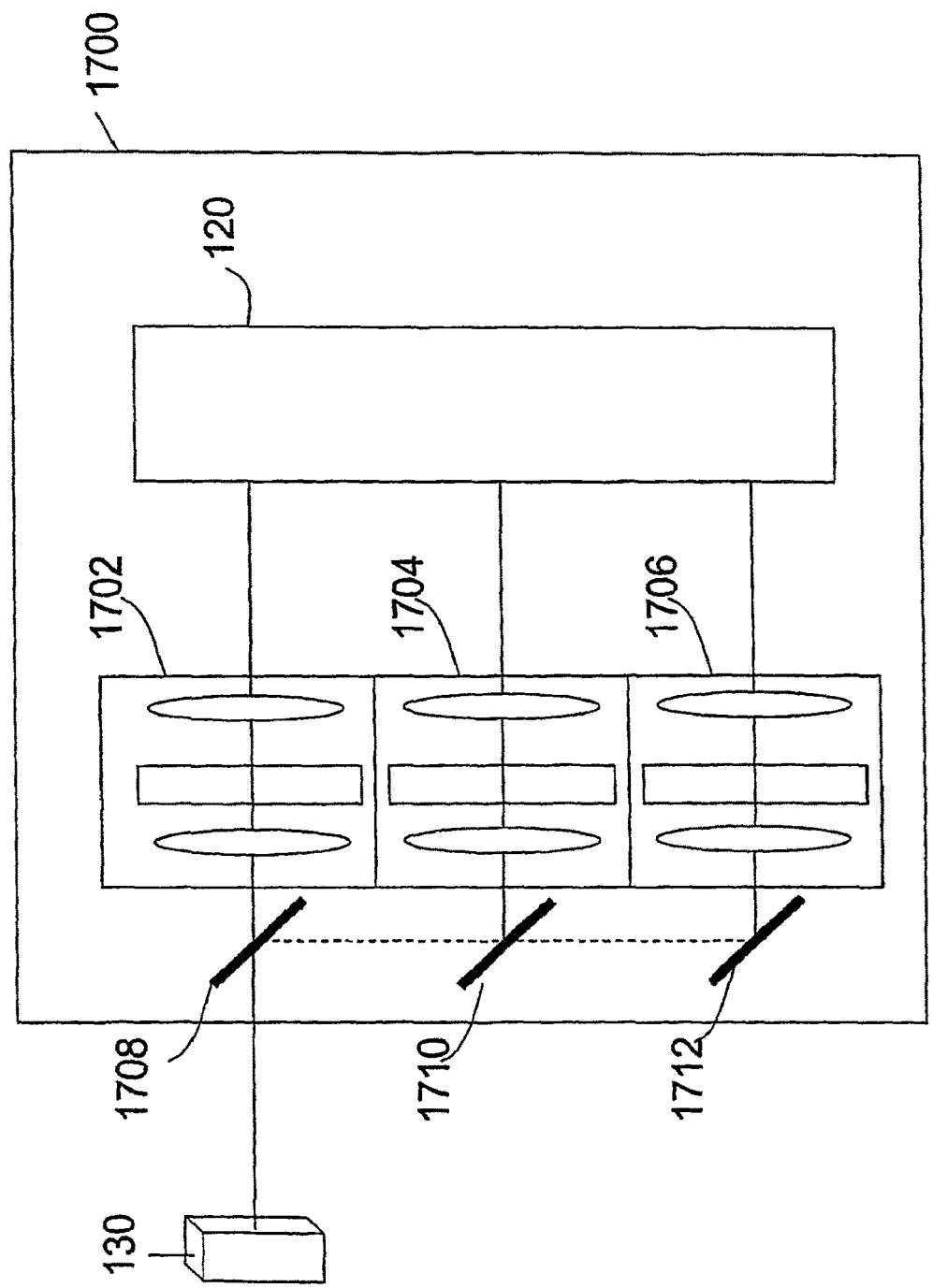
FIG. 30A is a block diagram of another embodiment of an optical apparatus.
Figure 30B:
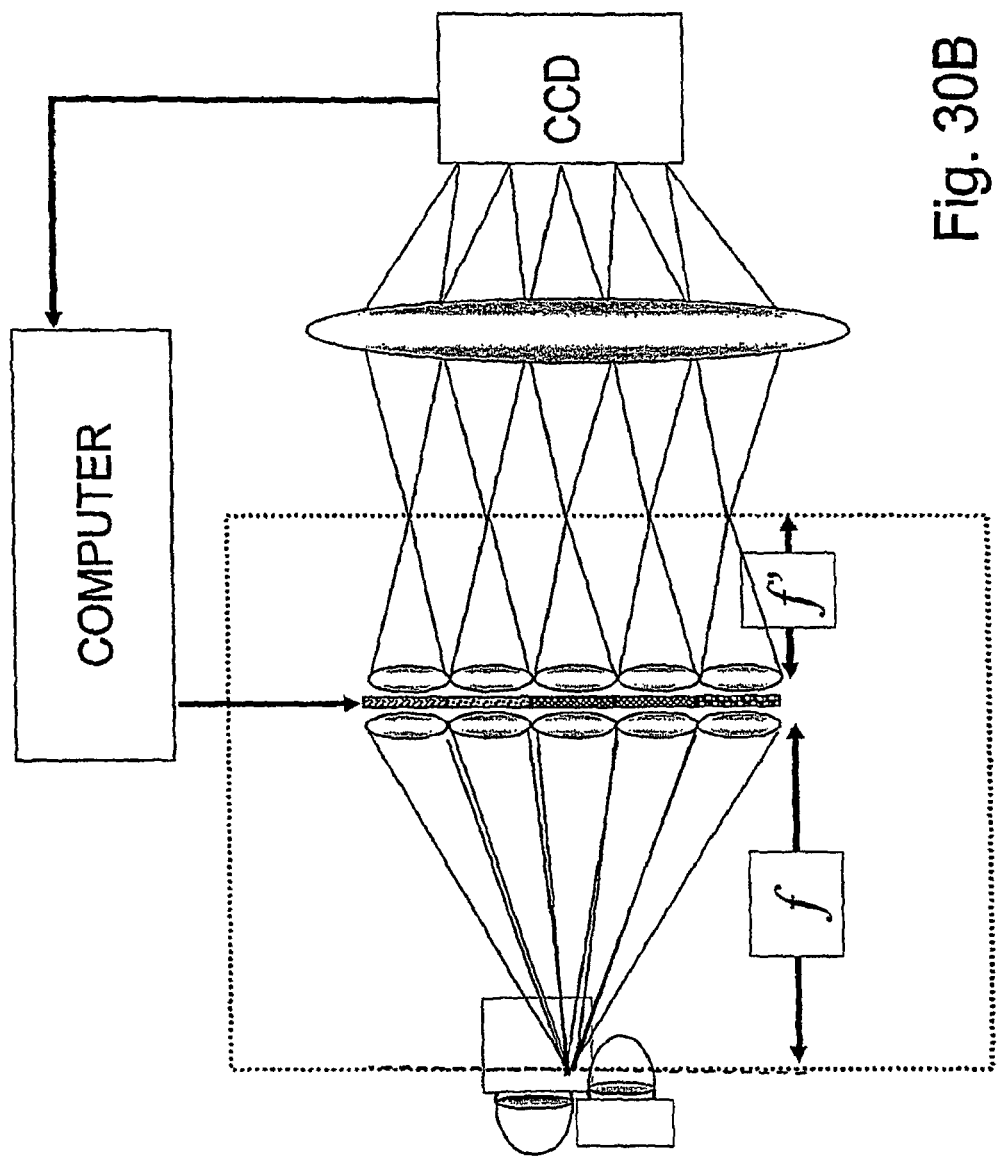
FIG. 30B is a block diagram of another embodiment of an optical apparatus.

FIG. 30A is an example of an embodiment in which each correlator can be implemented by two microlenses, which are contained in double lens arrays as is shown in FIG. 30B. In this setup the efficiency is not compromised but the field of view may be reduced.

Figure 30C:
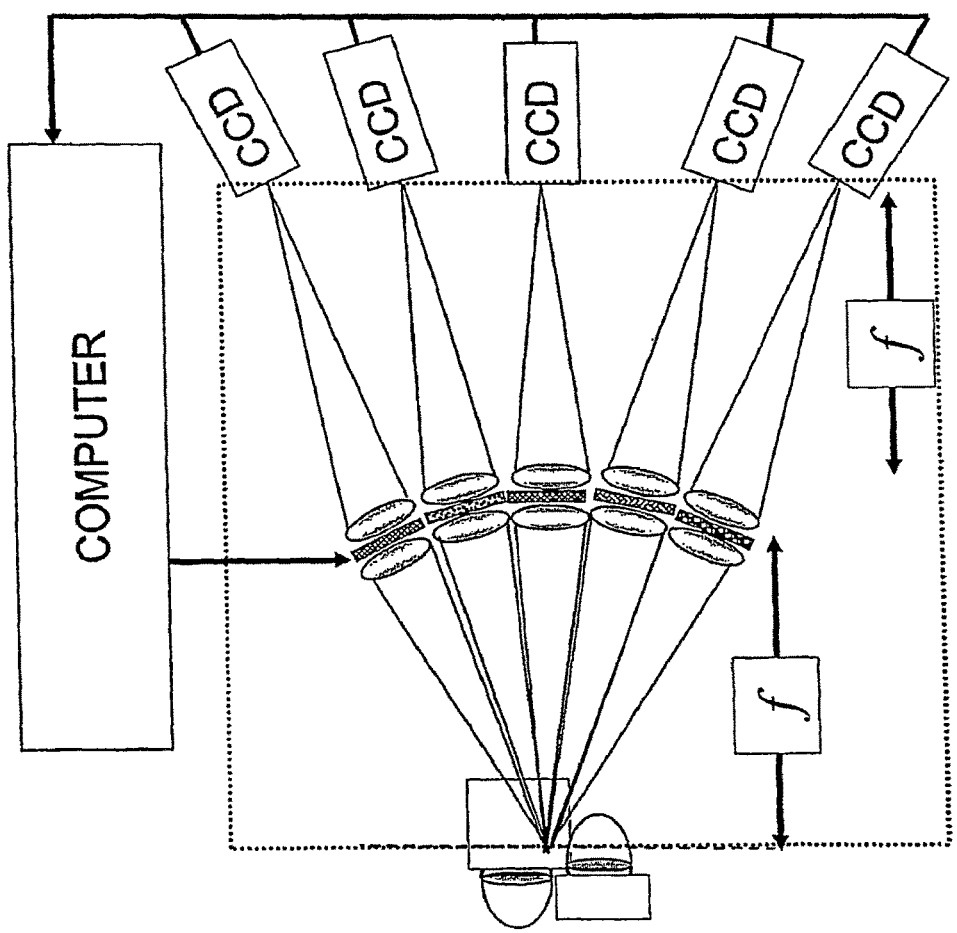
FIG. 30C is a block diagram of another embodiment of an optical apparatus.
Figure 30D:
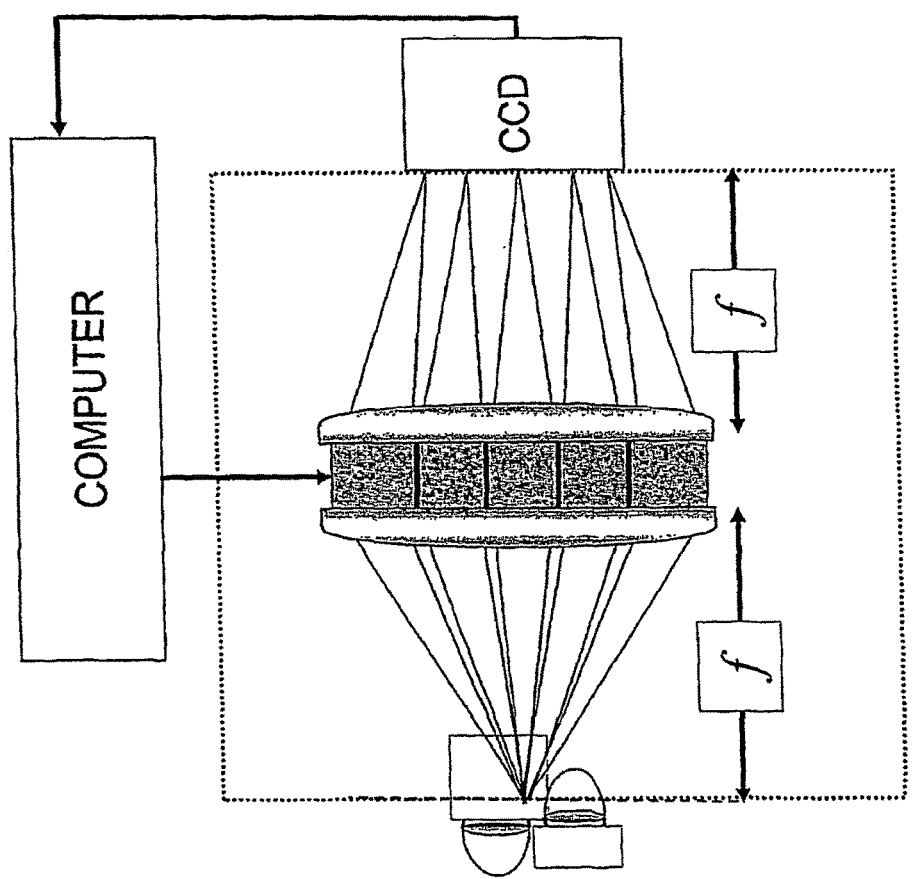
FIG. 30D is a block diagram of another embodiment of an optical apparatus.

FIG. 30C shows an example including parallel correlators using double convex microlens arrays. This arrangement enables using more correlators in the process compared to the setup with double planar microlens arrays. However, with these convex arrays one may need to use many digital cameras distributed on a wide surface of a sphere around the object. In order to avoid this last constraint, one can use a DOE with or without one or more spherical lenses, for example as shown in FIG. 30D, which all together operate as the multiplexed array of correlators in a similar manner like the double convex microlens arrays.

One of skill in the art will understand that the optical apparatuses described above are not limited to capturing only reflected sunlight, but may also determine the shape and distance of object portions that do not reflect light but instead emit a fluorescent light, a black body radiation, a chemiluminescent light or other light produced by the object, or objects that reflect or scatter light from sources other than the sun. In addition, an optical apparatus, according to the present embodiment, is not limited to capturing only the external shape and distance of objects, but may also capture information regarding internal portions of an object that radiate (i.e., reflect or fluoresce) light from an internal portion through a transparent or translucent surface of the object to the optical apparatus.

The present invention is also not limited to capturing geometric information regarding an object using a Cartesian coordinate system (e.g., x, y, z), but also includes capturing geometric information using any other coordinate system that may fully describe the shape, size and location of the object, such as a three-dimensional polar coordinate system (e.g., $\phi,\theta,r$), an earth referenced coordinate system such as the global coordinate system (e.g., latitude, longitude, elevation), a coordinate system incorporating an ellipsoid earth model reference system such as WGS-84, an earth centered earth fixed Cartesian coordinate system (ECEF) (e.g., x, y, z), Universal Transverse Mercator (UTM), Military Grid Reference System (MGRS), or World Geographic Reference System (GEOREF), etc. . . . . Further, although Cartesian type measurement terms such as "vertical," "horizontal" and "range" are used throughout the present description, those terms are intended to also include corresponding measurement terms in other reference systems, but which are omitted from the description herein for reasons of clarity and brevity.

Advantages of the present invention may make embodiments of the invention suitable for three-dimensional imaging applications that are impossible or impractical without the present invention. For example, the present invention may be applied to capturing three-dimensional movies/video/television images, performing three-dimensional object recognition for moving objects or stationary objects from a moving or stationary platform (e.g., military targeting applications, robotic sensing applications, autonomous aid to vision impaired users, etc. . . . ), autonomous navigation and safety functions (e.g., automatically guide an automobile to stay on a road and avoid collisions with moving and stationary objects), weather sensing (e.g., capture three-dimensional information regarding clouds or air masses detected with radar, visible light, or infrared and/or ultraviolet light, etc. . . . ), security functions (e.g., monitor locations and identity objects in a room, monitor identities and locations of people in a building, three-dimensional synthetic radar, etc. . . . ), and three-dimensional environmental mapping for virtual reality simulation (e.g., create three-dimensional model of tourist destination for virtual visit), or three-dimensional models of environments that are difficult or impossible to observe directly (e.g., internal body cavities, microscopic environments, hazardous environments, extraterrestrial environments, underground or sea environments, remote environments, etc. . . . ).

Although examples described above deal with optical components and visible light, the present invention also applies to receiving other forms of electromagnetic radiation from an object and determining three-dimensional information of the object based on the received electromagnetic radiation, such as x-ray radiation, microwave radiation, radio frequency radiation, and ultraviolet and infrared light. For example, embodiments of the invention described above may be modified to replace optical components (e.g., lenses, mirrors, diffractive optical elements, SLMs) with corresponding x-ray components, such as are known in the art and as described in i) U.S. Pat. No. 6,385,291 to Takami, ii) Pereira et al., "Lithium x-ray refractive lenses," Proc. SPIE 4502, 173 (2001)., and iii) Beguiristain et al., "Compound x-ray refractive lenses made of polyimide," Proc. SPIE, vol. 4144, pp. 155-164, each of which is incorporated herein by reference.

Further, for example, the present invention may be applicable as a replacement for existing x-ray imaging systems (e.g., CT scanners). As the present approach does not require any moving parts, x-ray imaging done using an embodiment of the present invention advantageously may produce a scan more reliably, with higher resolution, greater speed and less total radiation exposure to the patient.

Each of the embodiments described above may be modified to replace optical elements with equivalent x-ray elements known to those of skill in the art to produce three-dimensional information based on a received x-ray radiation from an object (i.e., a three-dimensional x-ray image). For example, the present invention may be applicable as a replacement for existing electron microscope technology.

Further the invention also applies to other forms of propagating energy waves, such as sound waves and may be applied to produce three-dimension object information using passive or active sonar.

Coherent light, which propagates according to the paraxial approximation, is described mathematically as a convolution between an input aperture and a quadratic phase function with an appropriate parameter in a denominator of an exponent power indicating a propagation distance of the wave from the input aperture. Thus, the complex amplitude (i.e., the electrical field) distribution O(x,y) on some transversal plane, in a distance z from the input plane, may be given (in the Fresnel approximation) by $$O(x, y) = \int\int S(x', y')\exp\left\{\frac{i\pi}{\lambda z}[(x-x')^2 + (y-y')^2]\right\}dx'dy' \quad (20)$$

where S(x',y') is the complex amplitude on the input aperture at the transverse plane z=0, $\lambda$ is the wavelength of the propagating light and (x',y'), (x,y) are the coordinates of the input and output planes, respectively. For 3D objects, contributions from the object points are accumulated to the following expression, $$O_z(x, y) = \quad (21)$$
$$\int\int\int S(x', y', z')\exp\left\{\frac{i\pi}{\lambda(z-z')}[(x-x')^2 + (y-y')^2]\right\}dx'dy'dz'$$

where (x',y',z') are the coordinates of the input space. In a conventional holography approach that produces a Fresnel hologram, the complex amplitude $O_z(x,y)$ may be interfered with a reference beam and the intensity of the resulting interference pattern is recorded on a photographic plate or a digital camera. However, according to the present invention, a convolution similar to Equation 21 may be performed differently using incoherent light, because the Fresnel propagation described in Equation 20 may be valid only for coherent illumination.

For a two-dimensional (2D) input intensity function $s(x,y)$ and an intensity point spread function (PSF) $|h(x,y)|^2$, a correlator output intensity (e.g., of a correlator such as shown in FIG. 3) distribution may be given by the following convolution, $$o(x,y) = s(x,y) * |h(x,y)|^2 = \iint s(x',y') |h(x-x',y-y')|^2 dx'dy' \quad (22)$$

where the asterisk denotes a 2D convolution, $h(x,y)$ is the amplitude PSF in the system, but under coherent illumination. $h(x,y)$ is related to the 2D inverse Fourier transform of the filter function $H(u,v)$ (304 in FIG. 3), as the following, $$h(x, y) = \iint H(u, v) \exp\left[\frac{i2\pi}{\lambda f_2}(xu + yv)\right] du\,dv \quad (23)$$

where $f_2$ is the focal length of the second lens in the correlator shown in FIG. 3. To solve for 3D objects rather 2D, a response of the incoherent correlator to a 3D input function may be determined. Further, although the input function is three-dimensional, the output and the convolution remain two-dimensional. In fact the correlator response for a 3D input is, $$o(x,y) = \int s(x,y,z) * |h(x,y,z)|^2 dz = \iiint s(x',y',z') |h(x-x',y-y',z')|^2 dx'dy'dz' \quad (24)$$

To calculate the general 3D amplitude PSF $h(x,y,z)$ of the system, a response to a single point located at some point $(x,y,z)$ in the vicinity of the rear focal point of the correlator may be determined. Such a calculation produces the 3D PSF of the system which may be used to calculate the system response to any possible 3D input. Since the system is known as space invariant it is correct to calculate the system response to a point on the optical axis at some point $(0,0,-z)$, and to generalize the response toward a general location at $(x,y,z)$. The input point is located a distance $f_1+z$ from the lens 302 at the point 308 (i.e., $0,0,-z$), as shown in FIG. 3.

The Fresnel integrals in Equations 20 and 21 can be used to calculate the light distribution because a single monochromatic point source is by definition a spatial coherent source. By substituting the representation of a single point source, represented by a delta function $\delta(0,0,-z)$, into Equation 21 as the input $S(x,y,z)$, the result on the plane of the first lens 302 is a diverging quadratic phase function as follows, $$O_{L_1}(x, y) = \quad (25)$$
$$\iiint \delta(x', y', z'+z) \exp\left[\frac{i\pi}{\lambda(f_1-z')}\{(x-x')^2 + (y-y')^2\}\right] dx'dy'dz' = \exp\left[\frac{i\pi}{\lambda(f_1+z)}(x^2+y^2)\right]$$

where $f_1$ is the focal length of the first lens in the correlator shown in FIG. 3. This quadratic phase function is known as the paraxial approximation of the spherical wave propagating in the z direction, and the paraxial approximation of a concave spherical lens transparency. This spherical wave propagates through the incoherent correlator and beyond the correlator the beam becomes a converging spherical wave. It may be shown that at the plane where the beam is focused one gets the Fourier transform of the transparency function of the mask $H(u,v)$. This Fourier transform is scaled according to the specific location of the focal plane and is multiplied by a quadratic phase function.

Assuming that the three optical thin elements $L_1$, $L_2$ and $H(u,v)$ of the incoherent correlator (e.g., elements 302, 306 and 304, respectively, in FIG. 3) are all located at the same plane, the diverging spherical wave and the two adjunct lenses $L_1$ and $L_2$ can be replaced by a single equivalent lens having a focal length $f_e$, as follows:

$$f_e = \left(\frac{1}{f_1} + \frac{1}{f_2} - \frac{1}{f_1+z}\right)^{-1} = \frac{f_1 f_2(f_1+z)}{f_1^2 + z(f_1+f_2)} \quad (26)$$

In a system having the equivalent lens in place of the correlator, once the system is illuminated by a plane wave, the complex amplitude on a back focal plane of equivalent lens $L_e$ is related to the 2D Fourier transform of the transparency function $H(u,v)$. This means that the complex amplitude on the back focal plane, at a distance $f_e$ from the equivalent lens $L_e$ is $$u(x, y, z) = \quad (27)$$
$$A \exp\left[\frac{i\pi}{\lambda f_e(z)}(x^2+y^2)\right] \iint H(u, v) \exp\left[\frac{-i2\pi}{\lambda f_e(z)}(xu+yv)\right] du\,dv$$

Note that the incoherent system is analyzed above according to the rules of coherent diffraction theory because the beams are considered to have been emitted from a single infinitesimal point. Since the output of the system is located a distance $f_2$ from the equivalent lens $L_e$, the output complex amplitude is obtained after a free propagation beyond the back focal plane of the equivalent lens $L_e$.

Free propagation of coherent light may be obtained, as mentioned above in Equation 20, as the result of convolution between the complex amplitude in the starting plane and a quadratic phase function. According to this, the output complex amplitude is, $$h(x, y, z) = u(x, y, z) * \exp\left[\frac{i\pi}{\lambda[f_2-f_e(z)]}(x^2+y^2)\right] = \quad (28)$$
$$\left\{\exp\left[\frac{i\pi}{\lambda f_e(z)}(x^2+y^2)\right] \iint H(u, v)\exp\left[\frac{-i2\pi}{\lambda f_e(z)}(xu+yv)\right]du\,dv\right\} *$$
$$\exp\left[\frac{i\pi}{\lambda[f_2-f_e(z)]}(x^2+y^2)\right]$$

Note that although the function in Equation 28 deals with three dimensions, the convolution is always in 2D. Equation 28 expresses the general 3D amplitude Point Spreading Function (PSF) of the system when it is illuminated by coherent light. Further, Equation 28 can be simplified by writing explicitly the convolution integral, switching the order of integration and using the well-known result of the Fourier transform of quadratic phase function. Such a simplification reduces the four integrals of Equation 28 to a double integral as follows:

$$h(x, y, z) = \qquad (29)$$
$$\exp\left[\frac{i\pi}{\lambda f_2}(x^2 + y^2)\right] \times \int\int H(u, v) \exp\left[\frac{-i\pi[f_2 - f_e(z)]}{\lambda f_2 f_e(z)}(u^2 + v^2)\right]$$
$$\exp\left[\frac{-i2\pi}{\lambda f_2}(xu + yv)\right] du dv$$

Another equation used to synthesize the filter in the system is the expression of the amplitude PSF for any point at the plane z=0, given by substituting $f_e(0)=f_2$ in Equation 29, as follows, $$h(x, y, 0) = \exp\left[\frac{i\pi}{\lambda f_2}(x^2 + y^2)\right]\int\int H(u, v)\exp\left[\frac{-i2\pi}{\lambda f_2}(xu + yv)\right] du dv. \qquad (30)$$

As described above, the intensity PSF for incoherent systems and for intensity distributions on the input and output planes is $|h(x,y,z)|^2$. The intensity PSF represents the impulse response of general incoherent systems. By taking the absolute square of Equation 29 one finds that the 3D intensity PSF is, $$|h(x, y, z)|^2 = \qquad (31)$$
$$\left|\int\int H(u, v)\exp\left[\frac{-i\pi[f_2 - f_e(z)]}{\lambda f_2 f_e(z)}(u^2 + v^2)\right]\exp\left[\frac{-i2\pi}{\lambda f_2}(xu + yv)\right] du dv\right|^2$$

The general expression of Equation 31 can be used to compute the PSF for a given filter or the required filter for a given PSF.

According to Equation 26 the expression in the exponent of Equation 31 is, $$\frac{[f_2 - f_e(z)]}{f_2 f_e(z)} = \frac{f_2 - \frac{f_1 f_2(f_1 + z)}{f_1^2 + z(f_1 + f_2)}}{\frac{f_1 f_2^2(f_1 + z)}{f_1^2 + z(f_1 + f_2)}} = \frac{z}{f_1(f_1 + z)} \qquad (32)$$

Substituting Equation 32 into Equation 31 yields $$|h(x, y, z)|^2 = \qquad (33)$$
$$\left|\int\int H(u, v)\exp\left[\frac{-i\pi z}{\lambda f_1(f_1 + z)}(u^2 + v^2)\right]\exp\left[\frac{-i2\pi}{\lambda f_2}(xu + yv)\right] du dv\right|^2$$

The general expression of Equation 33 can be used to compute the PSF for a given filter or the required filter for a given PSF.

To obtain a Fresnel hologram, which is a convolution between any object and a quadratic phase function, an incoherent intensity PSF in a shape of a quadratic phase function with a number of cycles (Fresnel number) dependent on the distance z is selected. This may not be achieved directly because $|h(x,y,z)|^2$ is a positive real function while a quadratic phase function has negative and imaginary values.

One method of selecting such a PSF is to compose the PSF $|h(x,y,z)|^2$ as a sum of three terms, one of them is the required quadratic phase function, and their sum maintains the condition that $|h(x,y,z)|^2$ is a positive real function. Thus, a PSF such as shown in Equation 34

$$|h(x, y, z)|^2 = \qquad (34)$$
$$p_z(x, y)\left\{1 + \frac{1}{2}\exp\left[\frac{i\pi}{\lambda\Delta(z)}(x^2 + y^2)\right] + \frac{1}{2}\exp\left[\frac{-i\pi}{\lambda\Delta(z)}(x^2 + y^2)\right]\right\}$$

satisfies this condition, where $\Delta(z)$ is a parameter linearly related to the distance z and $p_z(x,y)$ is a disk function with the diameter d(z), different for different values of z, that indicates the limiting aperture of a corresponding Fresnel Zone Pattern (FZP). The amplitude PSF for this choice is $$h(x, y, z) = \sqrt{p(x, y)\left\{1 + \cos\left[\frac{i\pi}{\lambda\Delta(z)}(x^2 + y^2)\right]\right\}} = \qquad (35)$$
$$\sqrt{2}\, p(x, y)\cos\left[\frac{i\pi}{2\lambda\Delta(z)}(x^2 + y^2)\right] =$$
$$p_z(x, y)\left\{\frac{1}{\sqrt{2}}\exp\left[\frac{i\pi(x^2 + y^2)}{2\lambda\Delta(z)}\right] + \frac{1}{\sqrt{2}}\exp\left[\frac{-i\pi(x^2 + y^2)}{2\lambda\Delta(z)}\right]\right\}$$

Note that a possible arbitrary pure phase term can multiply $h(x,y,z)$ without affecting the square magnitude of $h(x,y,z)$ given in Equation 34. However in order to get a Fresnel hologram of all the object's points, it is preferred that $h(x,y,z)$ remains as a sum of two quadratic phase terms along the propagation axis. Of the possible phase functions that can multiply $h(x,y,z)$, only a quadratic phase function may satisfy the condition that $h(x,y,z)$ is a sum of two quadratic phase terms after propagating a distance. Accordingly, it is appropriate to assume that $h(x,y,z)$ is a sum of two quadratic waves with the same magnitude of Fresnel number but with opposite signs, as given in Equation 35. Further, as described below, two quadratic waves with different Fresnel numbers may be used in an optimized solution.

Based on the desired $h(x,y,z)$, $H(u,v)$ may be calculated by inversing Equation 30, to produce the following filter function in Equation 36.

$$H(u, v) = \int\int h(x, y, 0)\exp\left[\frac{-i\pi}{\lambda f_2}(x^2 + y^2)\right]\exp\left[\frac{i2\pi}{\lambda f_2}(xu + yv)\right] dx dy \qquad (36)$$

Substituting Equation 35 into Equation 36 yields Equation 37

$$H(u, v) = \left\{\frac{1}{2}\exp\left[\frac{i\pi}{\lambda\gamma_1}(u^2 + v^2)\right] + \frac{1}{2}\exp\left[\frac{i\pi}{\lambda\gamma_2}(u^2 + v^2)\right]\right\} * P(u, v) \qquad (37)$$

where $P(u,v)$ is the Fourier transform of $p_o(x,y)$. Note that $H(u,v)$ is 2D function which determines the dependency of $h(x,y,z)$ along the transverse coordinates (x,y). The dependency of $h(x,y,z)$ along the z axis is dictated by the location of input source point.

The intensity PSF may be obtained by substituting the filter function of Equation 37 into Equation 31. Assuming that the filter function is $$H(u, v) = \left\{\frac{1}{2}\exp\left[\frac{i\pi}{\lambda\gamma}(u^2+v^2)\right] + \frac{1}{2}\exp\left[\frac{-i\pi}{\lambda\gamma}(u^2+v^2)\right]\right\} * P_o(u, v) \quad (38)$$

therefore, Equation 31 becomes, $$|h(x, y, z)|^2 = \tag{39}$$
$$\left|\int\int\left\{\frac{1}{2}\exp\left[\frac{i\pi}{\lambda\gamma}(u^2+v^2)\right] + \frac{1}{2}\exp\left[\frac{-i\pi}{\lambda\gamma}(u^2+v^2)\right]\right\} * P_o(u, v) \times$$
$$\exp\left[\frac{-i\pi}{\lambda}\frac{z}{f_1(f_1+z)}(u^2+v^2)\right]\exp\left[\frac{-i2\pi}{\lambda f_2}(xu+yv)\right]du\,dv\right|^2$$

After summation corresponding terms, the result is, $$|h(x, y, z)|^2 = \left|\int\int\left\{\frac{1}{2}\exp\left[\frac{i\pi(f_1^2+f_1z-\gamma z)(u^2+v^2)}{\lambda\gamma f_1(f_1+z)}\right] + \right.\right. \tag{40}$$
$$\left.\left.\frac{1}{2}\exp\left[\frac{-i\pi(f_1^2+f_1z-\gamma z)(u^2+v^2)}{\lambda\gamma f_1(f_1+z)}\right]\right\} *$$
$$P_o(u, v)\exp\left[\frac{-i2\pi}{\lambda f_2}(xu+yv)\right]du\,dv\right|^2$$

Calculating the Fourier transform, $$|h(x, y, z)|^2 = \tag{41}$$
$$\left|\left\{\frac{1}{2}\exp\left[\frac{-i\pi\gamma f_1(f_1+z)(x^2+y^2)}{\lambda f_2^2(f_1^2\gamma+f_1z-\gamma z)}\right] + \frac{1}{2}\exp\left[\frac{i\pi\gamma f_1(f_1+z)(x^2+y^2)}{\lambda f_2^2(f_1^2\gamma+f_1z+\gamma z)}\right]\right\}$$
$$p_o(x, y)\right|^2$$

Calculating the square magnitude yields, $$|h(x, y, z)|^2 = 1 + \frac{1}{4}\exp\left[\frac{i2\pi\gamma f_1^2(f_1+z)^2(x^2+y^2)}{\lambda f_2^2(f_1^2(f_1+z)^2-\gamma^2z^2)}\right] + \tag{42}$$
$$\frac{1}{4}\exp\left[\frac{-i2\pi\gamma f_1^2(f_1+z)^2(x^2+y^2)}{\lambda f_2^2(f_1^2(f_1+z)^2-\gamma^2z^2)}\right]$$

The parameter $\Delta(z)$ is, $$\Delta(z) = \frac{(f_1^2(f_1+z)^2-\gamma^2z^2)f_2^2}{2\gamma f_1^2(f_1+z)^2} \tag{43}$$

Equation 43 gives the value of $\Delta(z)$, the distance of a reconstructed image point as a function of the object point's location on the z axis, for the general choice of $\gamma_{1,2}=\pm\gamma$.

Equation 34 describes the intensity PSF captured by an image capture device according to the present invention. This PSF has three additive terms that are all concentrated in the center of the image capture plane. Therefore, convolution of the object function with such an intensity PSF yields three overlapped non-separated terms. However, it is desired to extract only a desired convolution term between the object and a single quadratic phase function among the three convolutions with three terms of the intensity PSF. A desired convolution between the object and a single quadratic phase function among the three convolutions with three terms of Equation 34 may be extracted using methods similar to those in digital holography, for example as described by I. Yamaguchi, and T. Zhang, "Phase-shifting digital holography," Opt. Lett. 22, 1268-1269 (1997), which is incorporated herein by reference.

The correlator may perform three operations of convolution between the object and three PSFs equipped with three different constant phase values. These PSFs may be synthesized by introducing three filter masks with three different constant phase values as follows, $$H_n(u, v) = \left\{\frac{1}{2}\exp\left[\frac{i\pi}{\lambda\gamma}(u^2+v^2) + \frac{i\theta_n}{2}\right] + \frac{1}{2}\exp\left[-\frac{i\pi}{\lambda\gamma}(u^2+v^2) - \frac{i\theta_n}{2}\right]\right\} * \tag{44}$$
$$P(u, v),$$

$$n = 1, 2, 3$$

By the relation of Equation 33, it can be shown that the three filters induce three intensity PSFs as follows, $$|h_n(x, y, z)|^2 = p_z(x, y) \times \tag{45}$$
$$\left(1 + \frac{1}{2}\exp\left[\frac{i\pi}{\lambda\Delta(z)}(x^2+y^2) + i\theta_n\right] + \frac{1}{2}\exp\left[\frac{-i\pi}{\lambda\Delta(z)}(x^2+y^2) - i\theta_n\right]\right)$$

Substituting the three PSFs of Equation 45 into Equation 24 yields the output intensity images that may be recorded by a camera or other suitable image capture device (e.g., CCD, CMOS, photographic film, etc. . . . ):

$$o_n(x, y) = \int s(x, y, z) * |h_n(x, y, z)|^2 dz = \int [s(x, y, z) * p_z(x, y)]dz + \tag{46}$$
$$\frac{1}{2}\exp(i\theta_n)\int s(x, y, z) * p_z(x, y)\exp\left[\frac{i\pi}{\lambda\Delta(z)}(x^2+y^2)\right]dz +$$
$$\frac{1}{2}\exp(-i\theta_n)\int s(x, y, z) * p_z(x, y)\exp\left[\frac{-i\pi}{\lambda\Delta(z)}(x^2+y^2)\right]dz,$$

$$n = 1, 2, 3$$

From these three images, a single term of convolution between the object s(x,y) and one of the quadratic phases may be extracted. A possible formula to isolate such a single convolution is $$O_F(x, y) = o_1(x, y)[\exp(-i\theta_3) - \exp(-i\theta_2)] + \tag{47}$$
$$o_2(x, y)[\exp(-i\theta_1) - \exp(-i\theta_3)] + o_3(x, y)[\exp(-i\theta_2) - \exp(-i\theta_1)]$$

$O_F(x,y)$ is a final complex valued hologram which satisfies the relation, $$O_F(x, y) = \int s(x, y, z) * p(x, y)\exp\left[\frac{i\pi}{\lambda\Delta(z)}(x^2+y^2)\right]dz \tag{48}$$

The function $O_F(x,y)$ is the final hologram which contains information on the one 3D image only. Such an image s (x,y,z) can be reconstructed from $O_F(x,y)$ by calculating the inverse operation to Equation 48, as follows, $$s(x, y; z) = O_F(x, y) * \exp\left[\frac{-i\pi}{\lambda\Delta(z)}(x^2 + y^2)\right] \quad (49)$$

Subsequently, the process of obtaining a single hologram with good separation between the three terms will be described. However, practical aspects of performing the convolution with three different PSFs are described first. There are several ways in which the filters may be multiplexed to produce the three partial images. For example, a time multiplexing system, such as the embodiment shown in FIG. 14, multiplexes the filters over time. Alternatively, the multiplexing may be done in the output plane of a single channel, for example as in the embodiment shown in FIG. 4. When a single point source is introduced at the point (0,0,0) the system's PSF is a pattern of 3 FZP with 3 different phases, distributed at 3 separated locations on the output plane. This 2D amplitude PSF is given by, $$h(x, y, 0) = \quad (50)$$
$$\sum_{n=1}^{3}\left(\frac{1}{\sqrt{2}}\exp\left\{\frac{i\pi}{2\lambda\Delta(0)}[(x-x_n)^2 + (y-y_n)^2] + \frac{i\theta_n}{2}\right\} + \frac{1}{\sqrt{2}}\exp\right.$$
$$\left.\left\{\frac{-i\pi}{2\lambda\Delta(0)}[(x-x_n)^2 + (y-y_n)^2] - \frac{i\theta_n}{2}\right\}\right)p_0(x-y_n, y-y_n),$$

where $(x_n,y_n)$ is the center point of the nth FZP. $h(x,y,0)$ of Equation 50 may be used to synthesize the filter $H(u,v)$ by Fourier transform of $h(x,y,0)$. For synthesizing the diffractive optical element (DOE) in a lensless system, for example the embodiment shown in FIGS. 1 and 20C, one may multiply the filter function by the transmission function of the two spherical lenses, to identify the overall transmission function of the DOE as follows, $$H(u, v) = \exp\left[\frac{-i\pi(f_1 + f_2)}{\lambda f_1 f_2}(u^2 + v^2)\right] \quad (51)$$
$$\int\int h(x, y, 0)\exp\left[\frac{-i\pi}{\lambda f_2}(x^2 + y^2)\right]\exp\left[\frac{i2\pi}{\lambda f_2}(xu + vy)\right]dxdy,$$

where $h(x,y,0)$ is given in Equation 50.

So far we have dealt with holograms of 3D scenes. Holograms when viewed by humans create an authentic illusion of viewing a realistic 3D scene. However, reconstructing the same hologram by a computer creates a virtual 3D space in which it may be difficult to determine where the image is in-focus, and what is the exact distance of each object from the camera. The hologram by its nature is only a 2D matrix and as so it may not adequately represent all the information contained in the 3D scene.

To overcome this drawback we suggest here a new design for the spatial filter of the same incoherent correlator described before. With the new filter the correlator can function as an image sectioning system that can image every transverse section of the 3D space separately. Instead of including information regarding the entire 3D scene, a hologram recorded according to this embodiment contains only the information regarding one single transverse cross-section of the 3D scene, and excludes information regarding other transverse planes. In order to image the entire 3D scene, one may record plural single cross-section holograms for different transverse cross-sections of the 3D scene. A method of capturing plural single cross-section holograms, each including information regarding a single cross-section of a 3D scene, and combining the information together to obtain complete 3D information regarding the 3D scene may be referred to as Sectioning Holographic Imaging (SHI). In the above described embodiment we propose several possible setups aimed to capture multiple holograms of the entire 3D space, cross-section by cross-section. Some of these setups capture the holograms by multiple shots, and others even suggest doing it by a single snap shot.

Numerous modifications and variations of the present invention are possible in light of the above teachings. It is therefore to be understood that within the scope of the appended claims, the invention may be practiced otherwise than as specifically described herein.

The invention claimed is:

1. An apparatus configured to produce holograms of plural cross sections of an object that emits an emitted electromagnetic radiation, said apparatus comprising:
    an electromagnetic radiation assembly different from the object configured to receive the emitted electromagnetic radiation from the object, diffract the received electromagnetic radiation, and transmit a diffracted electromagnetic radiation;
    an image capture assembly configured to capture at least one image of the diffracted electromagnetic radiation, and produce holograms of plural cross-sections of the object from the at least one captured image, each of the holograms including information regarding a single cross sections of the object, and
    a distance varying device configured to vary a distance to the object for each of the single cross sections of the object, wherein
    the electromagnetic radiation assembly is between the object and the image capture assembly.

2. An apparatus configured to produce holograms of plural cross-sections of an object that emits an emitted electromagnetic radiation, said apparatus comprising:
    an electromagnetic radiation assembly different from the object configured to receive the emitted electromagnetic radiation from the object, diffract the received electromagnetic radiation, and transmit a diffracted electromagnetic radiation;
    an image capture assembly configured to capture at least one image of the diffracted electromagnetic radiation, and produce holograms of plural cross-sections of the object from the at least one captured image, each of the holograms including information regarding a single cross-section of the object; and
    an object focal plane varying device configured to vary an object focal plane location for each of the single cross sections of the object, wherein the electromagnetic radiation assembly is between the object and the image capture assembly.

3. The apparatus of claim 2, wherein
    the object focal plane varying device varies the object focal plane by varying a diffracting capability of a portion of the electromagnetic radiation assembly.

* * * * *